United States Patent [19]

Kah, Jr.

[11] 3,747,620
[45] July 24, 1973

[54] IRRIGATION SPRINKLER SYSTEM CONTROL EMPLOYING PILOT OPERATED, PRESSURE ACTUATED AND SEQUENCED VALVE ASSEMBLIES

[76] Inventor: Carl L. C. Kah, Jr., 778 Lakeside Drive, North Palm Beach, Fla. 33408

[22] Filed: Feb. 1, 1972

[21] Appl. No.: 222,600

Related U.S. Application Data

[63] Continuation of Ser. No. 90,732, Nov. 18, 1970, abandoned.

[52] U.S. Cl........ 137/119, 137/624.12, 137/624.18, 137/624.20, 239/66, 251/230, 307/41, 307/141
[51] Int. Cl. ... G05d 11/00, A01g 25/02, F17d 3/00
[58] Field of Search....................... 137/119, 624.12, 137/624.13, 624.14, 624.15, 624.18, 624.19, 624.20; 239/66

[56] References Cited
UNITED STATES PATENTS

| 2,372,324 | 3/1945 | Hauser............................ 137/624.2 |
| 2,793,908 | 5/1957 | Carver........................ 137/624.14 X |
| 2,857,964 | 10/1958 | Vore................................ 137/624.2 |
| 3,145,736 | 8/1964 | Gheen............................ 239/66 X |
| 3,147,770 | 9/1964 | Perlis............................. 239/66 X |
| 3,241,569 | 3/1966 | Sully et al..................... 137/624.13 |
| 3,345,915 | 10/1967 | Dotto......................... 137/624.14 X |
| 3,420,270 | 1/1969 | Neyer........................... 137/624.18 |
| 3,478,780 | 11/1969 | Gheen........................... 137/624.18 |
| 3,480,034 | 11/1969 | Jerome............................. 137/119 |
| 3,519,016 | 7/1970 | Kah et al..................... 137/624.18 |

Primary Examiner—Martin P. Schwadron
Assistant Examiner—David J. Zobkiw
Attorney—Jack N. McCarthy

[57] ABSTRACT

The disclosure introduces a number of new concepts in the operation and control of pressure actuated and sequenced valve assemblies which include pressure cycling, selective reset, tracking of sprinkler section operation and cyclic pressure level control. Each of the pressure actuated and sequenced valve assemblies herein disclosed includes pressure cycling and/or reset capabilities operable as a direct function of line pressure changes and as an indirect function of a remote electrical control system which may be selectively employed to control such pressure changes. Alternatively, the direct function control may be based on time.

One aspect of the invention is concerned with the constructional details of various pressure actuated and sequenced valve assembly configurations employing pilot valves and sequencing control elements for controlling the opening and closing movement of a main flow control valve while a second aspect of the invention relates to the control of those line pressure variations to which the pilot valves and sequencing control elements are responsive.

The sequencing control elements in each of the line connected valve assemblies may be pressure cycled without opening the main valve by varying inlet line pressure at a level below that required to open the main valves and the sequencing control elements may be reset to a predetermined position by a further selective reduction in line pressure level.

The remote electrical control system has a primary function of insuring that each cyclic line pressure change is of such magnitude and/or duration as to insure that each line connected valve assembly will be sequenced. The electrical control system further includes the capability of an automatic selection of a manually chosen one of the plurality of line connected sprinkler sections for individual and/or prolonged sprinkling as well as the additional features of pressure cycling and reset of all the line connected sequencing control elements which latter two functions may also be performed by a conventional hydraulic control adjacent the line pressure source when valve assemblies of the type herein disclosed, possessing these capabilities, are used.

87 Claims, 60 Drawing Figures

United States Patent [19]
Kah, Jr.
[11] 3,747,620
[45] July 24, 1973
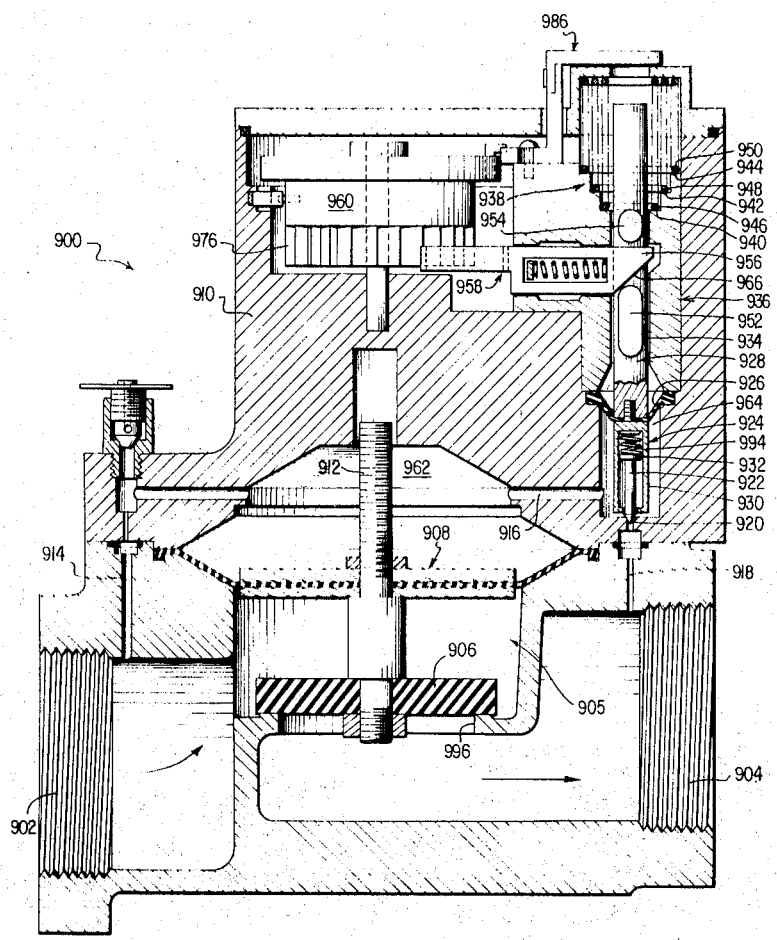

Patented July 24, 1973
3,747,620
29 Sheets-Sheet 1
FIG. 1
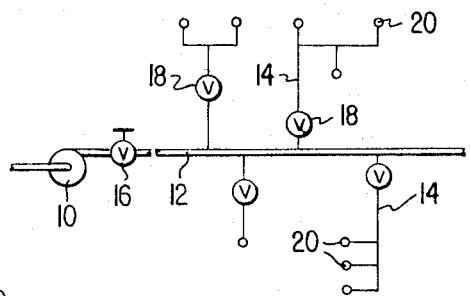
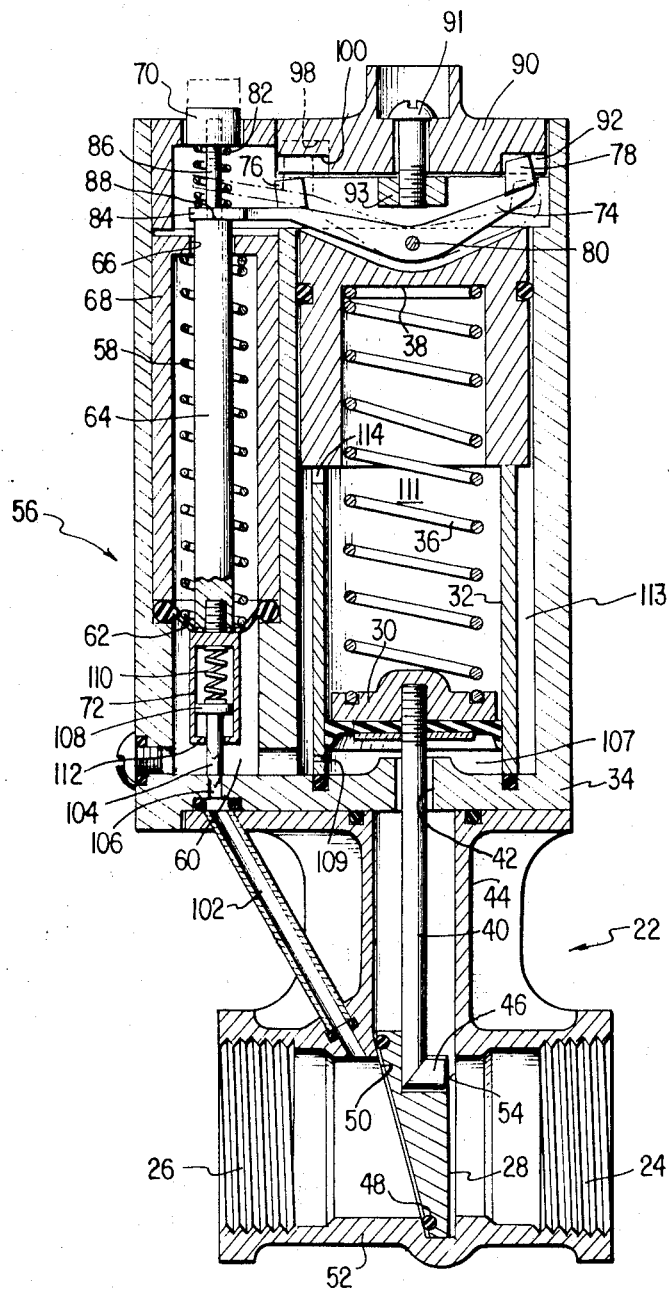
FIG. 2
INVENTOR
CARL L. C. KAH, JR.
BY Colton + Stone
ATTORNEYS.

Patented July 24, 1973

INVENTOR
CARL L. C. KAH, JR.

BY Colton & Stone

ATTORNEYS.

INVENTOR
CARL L. C. KAH, JR.

BY Colten & Stone

ATTORNEYS.

Patented July 24, 1973

INVENTOR
CARL L. C. KAH, JR.

BY Colton + Stone

ATTORNEYS

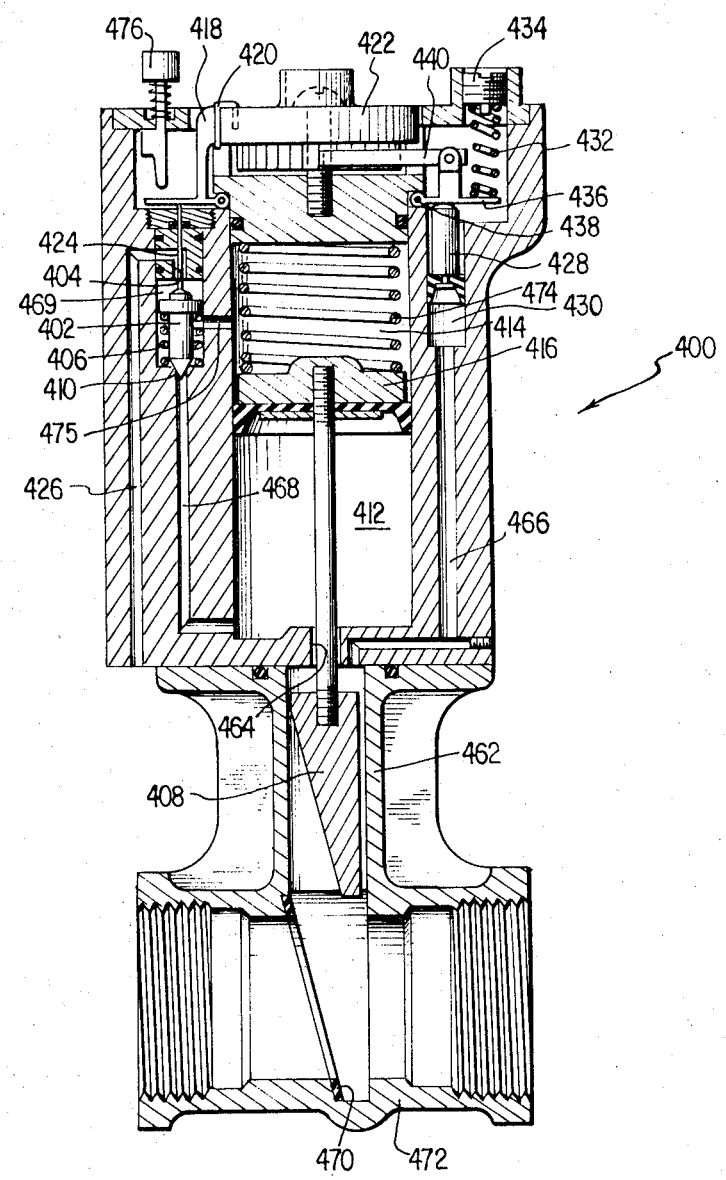

Patented July 24, 1973

INVENTOR
CARL L. C. KAH, JR.

BY Colton + Stone

ATTORNEYS.

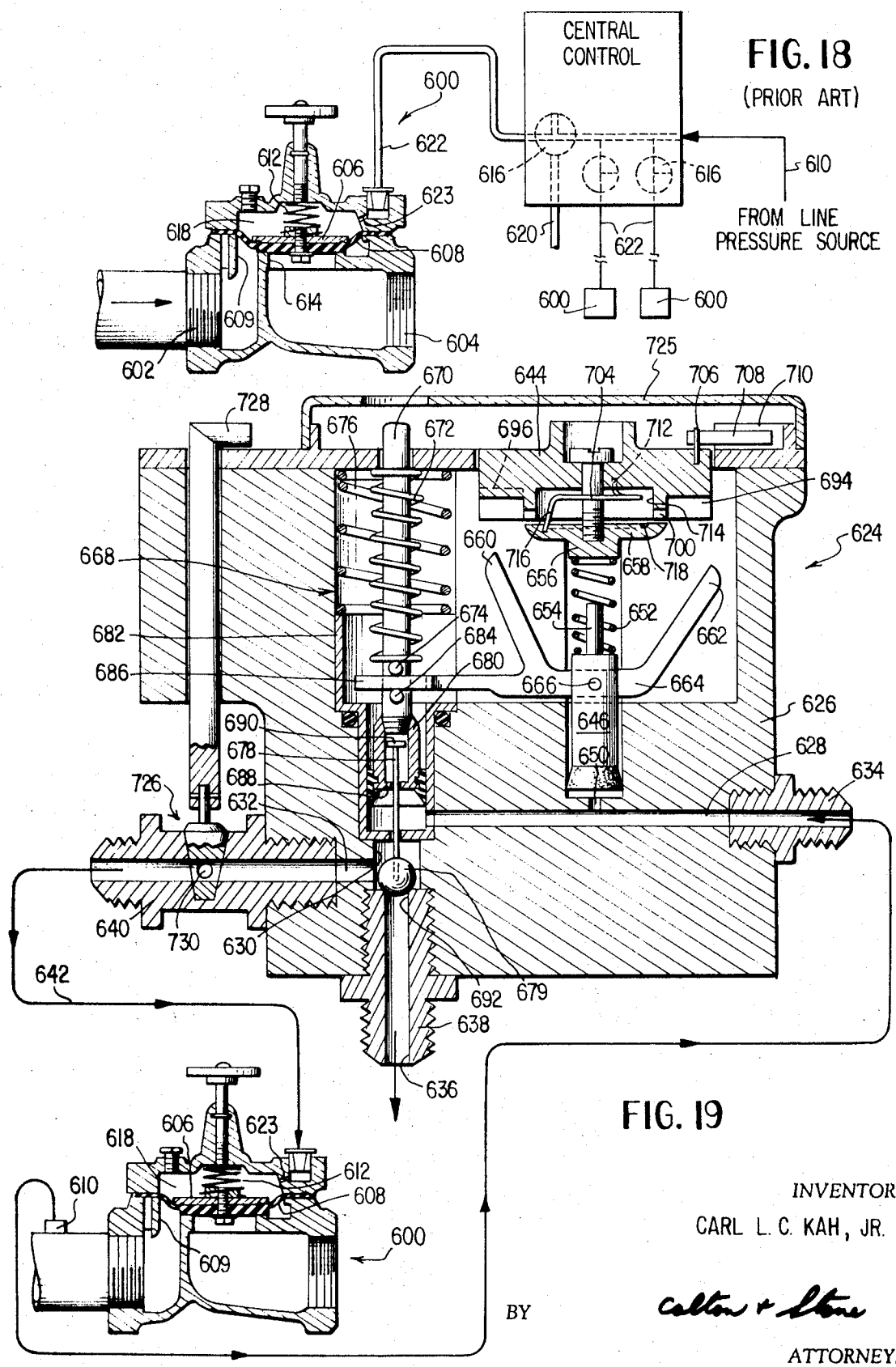

Patented July 24, 1973

INVENTOR
CARL L. C. KAH, JR.

BY Colten + Stone

ATTORNEYS.

Patented July 24, 1973

INVENTOR
CARL L. C. KAH, JR.

BY *Colton + Stone*

ATTORNEYS.

Patented July 24, 1973
3,747,620
29 Sheets-Sheet 11
FIG. 24
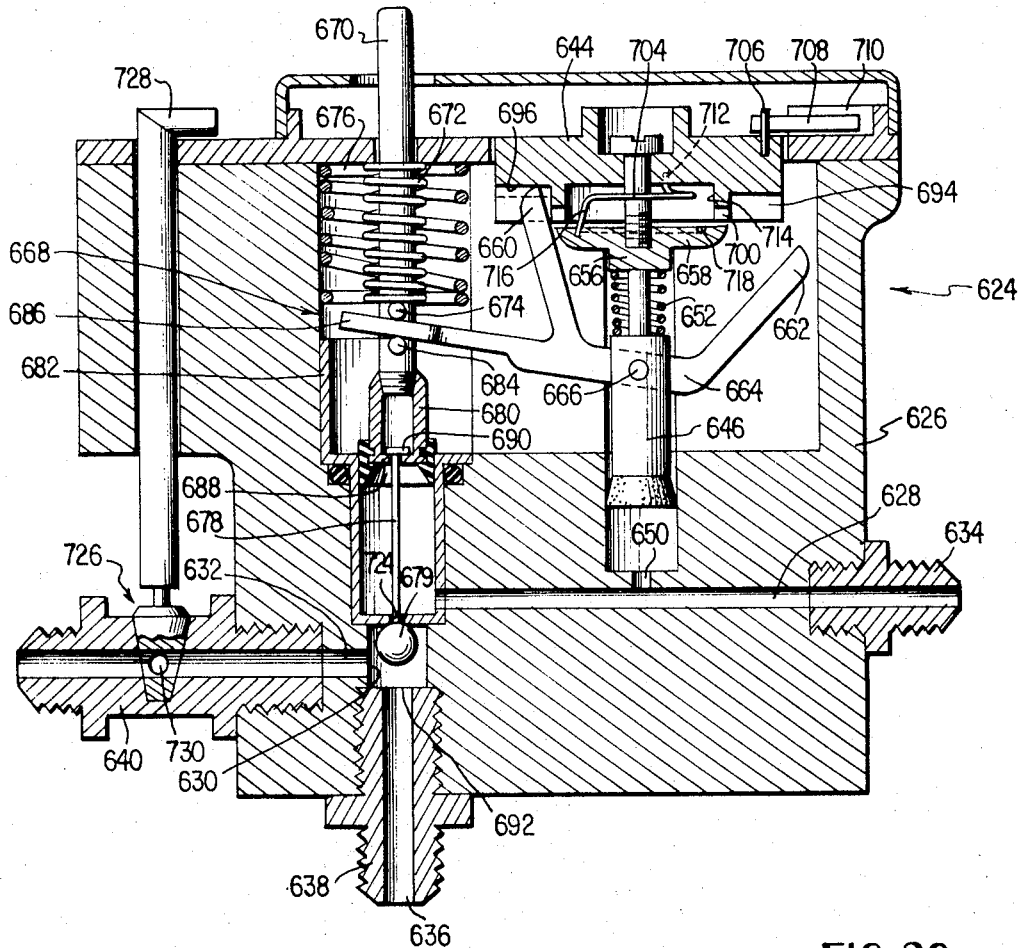
FIG. 25
FIG. 26
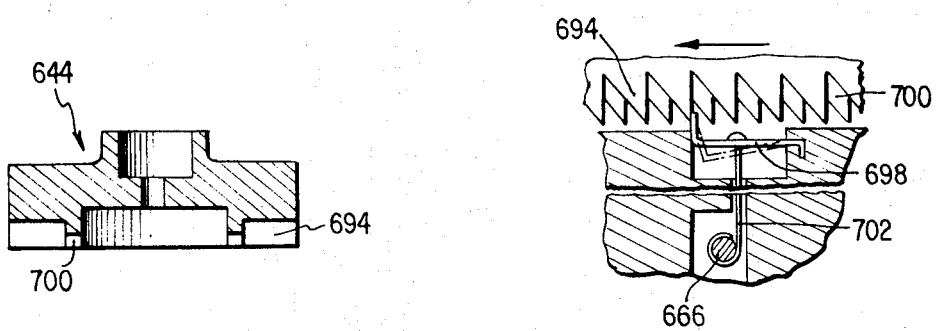
INVENTOR
CARL L. C. KAH, JR.
BY Colton + Stone
ATTORNEYS.

Patented July 24, 1973

INVENTOR
CARL L. C. KAH, JR.

BY
Colton + Stone
ATTORNEYS.

Patented July 24, 1973

INVENTOR
CARL L. C. KAH, JR.

BY *Colton + Stone*

ATTORNEYS

INVENTOR
CARL L. C. KAH, JR.

BY *Calton + Stone*

ATTORNEYS.

Patented July 24, 1973

INVENTOR
CARL L. C. KAH, JR.

BY Calton + Stone

ATTORNEYS.

Patented July 24, 1973

INVENTOR

CARL L. C. KAH, JR.

BY

ATTORNEYS.

INVENTOR
CARL L. C. KAH, JR.

BY Colton + Stone
ATTORNEYS.

INVENTOR
CARL L. C. KAH, JR.

BY Colton + Stone

ATTORNEYS.

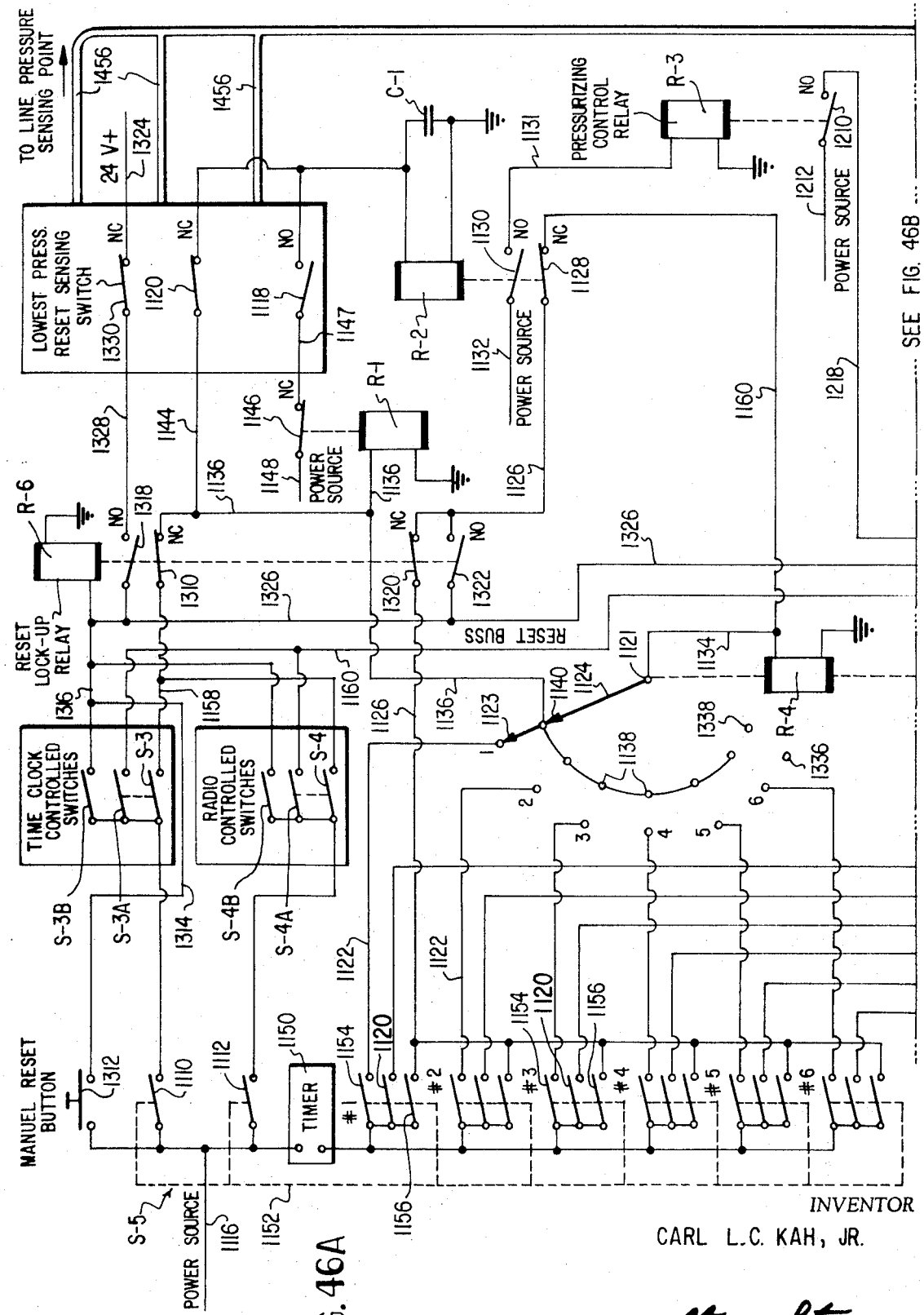

INVENTOR
CARL L.C. KAH, JR.

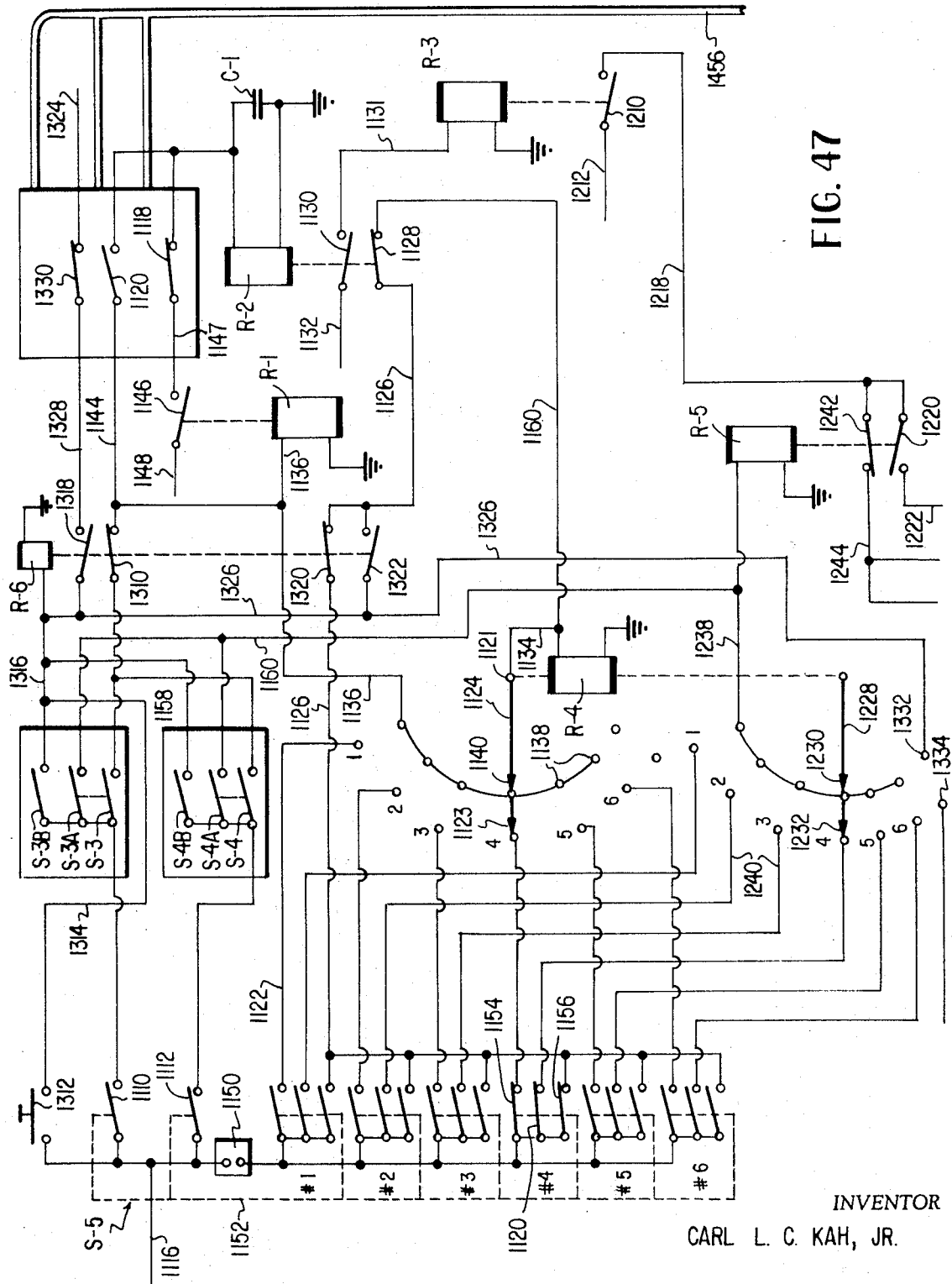

INVENTOR
CARL L. C. KAH, JR.

BY Colton & Stone

ATTORNEYS.

INVENTOR
CARL L. C. KAH, JR.

BY Colton + Stone

ATTORNEYS.

Patented July 24, 1973

INVENTOR
CARL L. C. KAH, JR.
BY
Calton + Stone
ATTORNEYS.

Patented July 24, 1973

INVENTOR

CARL L. C. KAH, JR.

BY Colton & Stone

ATTORNEYS

INVENTOR
CARL L. C. KAH, JR.

BY

ATTORNEYS.

IRRIGATION SPRINKLER SYSTEM CONTROL EMPLOYING PILOT OPERATED, PRESSURE ACTUATED AND SEQUENCED VALVE ASSEMBLIES

RELATED APPLICATION

This application is a continuation of copending Application Ser. No. 90,732, filed Nov. 18, 1970, to Carl L. C. Kah Jr, and now abandoned.

BACKGROUND OF THE INVENTION

Pressure actuated and sequenced valve assemblies are commonly employed for the cyclic actuation of distinct sprinkler sections supplied by a common line. Each of the several valve assemblies, associated with a separate sprinkler section, is responsive to line pressure changes to index a sequencing control member in the form of a rotary indexable element. The position of the sequencing control element, in turn, determines whether the main line flow control valve associated therewith will be open or closed. The sequencing control elements are all subject to the same line pressure variations and, if each is out of phase with the others, may be used to insure that only one sprinkler section is turned on in response to each cyclic pressure change. Valve assemblies of this type are well known as exemplified by the disclosure in U. S. Pat. No. 3,519,016. Essentially a plurality of such valve assemblies are connected in a flow line in such manner that each assembly controls one or more fluid distributors which may constitute a single sprinkling section of a multiple section commercial irrigation system and cyclically controls fluid flow to the associated distributor or distributors as a function of line pressure changes so that only those number of distributors for which the flow line can provide adequate pressure and flow are turned on at any one time.

The foregoing is conventionally accomplished by the use of line pressure changes to index the aforementioned sequencing control element through a plurality of main valve controlling positions, which positions are out of phase as among the various valve assemblies. The sequencing control element is typically a rotary indexable cam which, at certain selected positions, will permit the main flow control valve to open while positively precluding main valve opening in all other positions while the main flow valve of others of the line connected valve assemblies are permitted to open. The cam is normally indexed by a mechanical actuator stroked in one direction by increasing line pressure and in the other direction by a return spring as line pressure falls.

Although various sequencing control elements have been used for the aforementioned cyclic control function, the most desirable type from the standpoint of simplicity, reliability and economy of manufacture, particularly as regards the ready interchangeability of separate sequencing control elements to vary sprinkling cycles, is the rotary indexable cam. In U. S. Pat. No. 3,519,016, the rotary cam is directly indexed by the main flow valve actuator stem and limits or permits full reciprocating travel of the same under the influence of line pressure increases as a function of the particular cam configuration which has been indexed into position above the main valve actuator stem. Such constructions require the use of relatively heavy duty sequencing cams since they are subject to the main valve opening forces and, additionally, they are not subject to pressure cycling by pressure changes which are less than those required to lift the main valve actuator. Although in some individual system installations it may not be particularly desirable to incorporate a pressure cycling capability, as in a relatively small irrigation system on a level terrain, it is of great importance in others such as large systems including substantial elevational differences as exemplified by a rugged golf course irrigation system, for example, where residual line pressures at certain of the valve assemblies may be quite high requiring large return springs for the main valve actuators. Another capability which is obviously desirable in large irrigation systems is a reset feature wherein the sequencing control elements for all of the valve assemblies may be automatically recycled to a desired position in their operation control cycle.

The pressure cycling feature has not been previously available in a pressure operated and sequenced valve assembly of the type which may be controlled by a pilot valve as contrasted with the main actuator stem control described in connection with the aforesaid patent and the reset feature has not been previously applied to any valve assemblies of the pressure actuated and sequenced type. Although pilot valve controls for pressure actuated and sequenced valve assemblies have been previously used to control a main valve actuator, as in U. S. Pat. Nos. 2,372,324 and 3,478,780, they have lacked a pressure cycling and reset capability for the reason that the pilot valve operating mechanism has been limited to an all-or-none operation as regards its opening and closing movement and the pilot valve control element has not been susceptible of an automatic reset.

In the further interests of manufacturing economy, it is obviously desirable that the valve assembly control elements not only be of light weight, preferably plastic, construction but also that the various control elements be interchangeable as among the various valve assemblies whether or not they may include the pressure cycling and/or reset feature.

An even more important limitation inherent in the prior art pilot operated valve assemblies is their substantial complexity, as in U. S. Pat. No. 2,372,324, and the higher recycling pressures required to sequence the valves due to the use of pilot controlled pressurizing forces to open the main valve as in U. S. Pat. No. 3,478,780. This latter feature is in sharp contrast with the venting of one side of a main valve actuator which is constantly biased by inlet line pressure in the main valve opening direction. These two relatively simple concepts, i.e., the use of a simple sequencing element which may be made from a single casting or the like and the venting of a constantly pressurized actuator makes possible the fabrication of a pressure actuated and sequenced valve assembly requiring only a single actuator element for opening and closing the main valve which is quite important from the standpoint of manufacturing costs.

Inasmuch as pressure actuated and sequenced valve assemblies depend upon line pressure variations for their cyclic mode of operation it is apparent that if the magnitude or duration of a line pressure increase is insufficient to fully stroke the actuator for the sequencing control element of each line connected valve assembly, the sequencing control will be erratic since some or all of the sequence control elements may not be indexed. The problem is more acute where substantial elevational differences among the various valve assemblies are involved, such as is commonly found in golf course irrigation systems wherein the application of a greater magnitude or duration of line pressure increase will be required to sequence a valve assembly at a high elevational level than a similar valve assembly at a low elevational level. Similarly, one or more of the valve assemblies may fail to sequence under return spring bias if the magnitude or duration of the line pressure drop is insufficient as by a line pressure increase being initiated too rapidly.

SUMMARY OF THE INVENTION

The pressure actuated and sequenced valve assemblies, per se, herein disclosed are designed to exhibit their improved pilot operated, pressure cycling and reset capabilities as a selective function of conventional line pressure control systems and, when used in conjunction with the electrical control system herein described, cooperate therewith to insure that each sequencing control element will be indexed by each programmed pressure variation. Although the electrical control system may be used to insure that programmed pressure changes will be of sufficient magnitude and duration to index the sequencing control elements of conventional line connected pressure actuated and sequenced valve assemblies such as those shown in U. S. Pat. No. 3,460,560, it has particular utility with the valve assemblies herein disclosed since its control capability is expanded to include pressure cycling and automatic reset.

The pressure actuated and sequenced valve assemblies rely upon the use of a pilot valve control for selectively venting one side of the main valve actuator as a function of the position of a rotary sequencing element including a plurality of ratchet teeth and/or camming faces whose driving engagement and counter-rotative restraint are derived from inlet line pressure which may be applied either in parallel or in series with that applied to the main valve actuator.

The main valve is opened by venting one side of a main valve actuator which has previously been pressurized on both sides by increasing inlet line pressure. Accordingly, the sequencing control elements need only control the opening movement of a small pilot valve in the vent line. The particular rotary sequencing element employed coacts with a novel pilot valve actuating assembly to permit the sequencing element to be cycled by reduced line pressure variations without opening the main valve and, also, to be automatically reset to a desired position upon a sufficient reduction in residual line pressure.

The electrical control system, in a preferred embodiment, senses line pressure in order to control the magnitude and duration of line pressure changes and, in another embodiment, relies upon a timer whose programmed operational cycle is calibrated with known data respecting the minimum time requirements for all valve assemblies to be sequenced under the influence of known pressure variations. A convenient arrangement for the remote control of the pressure cycling and reset valve assembly functions as well as the other conventional pump and valve controls for a pressure actuated and sequenced valve assembly controlled irrigation system is provided by the integration of these control circuits with either of the aforementioned line pressure sensing or time controlled circuits.

DESCRIPTION OF THE DRAWINGS

FIG. 1 is a schematic illustration of one irrigation system in which the pressure actuated and sequenced valve assemblies of this invention find application;

FIG. 2 is a sectional elevation of one pressure actuated and sequenced valve assembly constructed in accordance with the present invention employing a single pilot valve and sequencing actuator and illustrating the valve closed position;

FIG. 11 is a sectional elevation of a third valve assembly embodiment incorporating a double acting pilot valve and illustrating the valve open position;

FIG. 12 is a detail view of the pilot valve in the main valve closed position;

FIG. 18 is a typical prior art valve and control assembly therefor;

FIG. 19 is a sectional elevation of a further embodiment of the invention incorporating a unit-handled controller which may be used to convert a main valve of the type shown in FIG. 18 into a pressure actuated and sequenced valve assembly having pressure cycling and reset capabilities;

FIG. 24 is a similar view wherein the same has been cycled to a main valve open position;

FIG. 25 is a sectional detail of the sequencing element employed with the valve assembly of FIG. 19;

FIG. 26 is a schematic representation of the counter-rotative holding and reset mechanism employed with the sequencing element of FIG. 25;

FIG. 46, comprising FIGS. 46A and 46B, is a diagrammatic illustration of a complete irrigation system employing electrical control circuits which include that of FIG. 40 and additional circuitry for controlling pressure cycling and reset operations;

FIGS. 47-49 are partial schematics of the circuitry shown in FIG. 46 illustrating various circuit conditions in the control of a complete irrigation system;

DESCRIPTION OF THE PREFERRED EMBODIMENTS

Figure 3:
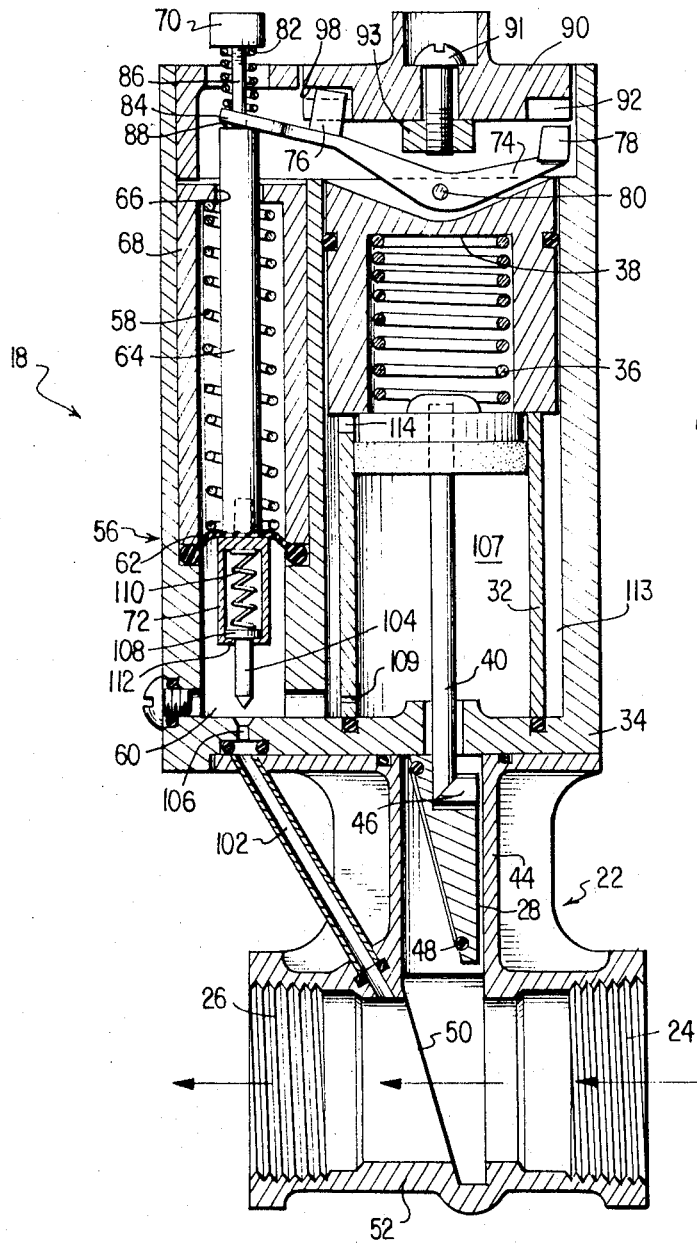
FIG. 3 illustrates the valve of FIG. 2 in the open position.
Figure 5:
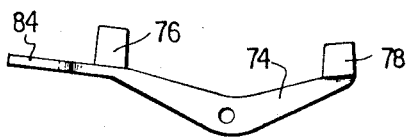
FIG. 5 is an elevational view of the sequencing ratchet arm employed with the valve assembly of FIGS. 2 and 3.
Figure 6:
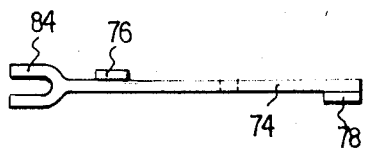
FIG. 6 is a plan view thereof.
Figure 4:
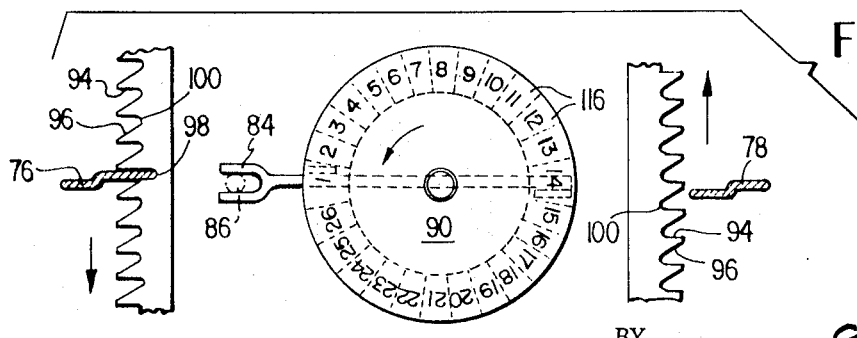
FIG. 4 is a schematic representation of the sequencing mechanism employed with the valve assembly of FIGS. 2 and 3.

The various aspects of the invention will be described in the following order:

I. Pressure actuated and sequenced valve assemblies, per se
 1. Employing unitary pilot valve and sequencing actuator
 2. Employing separate pilot valve and sequencing actuator
 3. Employing double acting pilot valve
 4. Employing unit handled pilot valve controller
 5. Unitary pilot valve and sequencing actuator employing mechanical escapement.

II. Control System for pressure actuated and sequenced valve assemblies
 1. Line pressure variation as a function of sensed pressure condition.
 2. Line pressure variation as a function of time.
 3. Automatic tracking of sprinkler section operation.
 4. Selective reduction of normal sequencing and actuating pressure levels
   a. pressure cycling
   b. collective reset A schematic representation of one irrigation system in which the pressure actuated and sequenced valve assemblies of this invention find application is depicted in FIG. 1 wherein pump 10 supplies main conduit 12 and branch lines 14 through a control valve 16. Pressure actuated and sequenced valve assemblies 18 may be interposed between main line 12 and branch lines 14 or between the branch lines and sprinklers 20, as desired. Cyclic pressure variations may be induced in main line 12 by controlling the operation of pump 10 or control valve 16 in any desired manner such as by a single switch time clock arrangement. The overall system arrangement of FIG. 1 is entirely conventional in that it does not employ the novel control system herein disclosed but, rather, depicts a system arrangement exhibiting both new and improved capabilities made possible by the use of the herein disclosed pressure actuated and sequenced valve assemblies.

PRESSURE ACTUATED AND SEQUENCED VALVE ASSEMBLY EMPLOYING UNITARY PILOT VALVE AND SEQUENCING ACTUATOR

One embodiment of a pressure actuated and sequenced valve assembly 18, according to the invention, is depicted in FIGS. 2-6 and includes a valve housing 22 having aligned inlet and outlet ports 24, 26 adapted for threaded interpositionment in branch lines 14 for controlling fluid flow therethrough by the cyclic operation of gate valve 28. Gate valve 28 is reciprocated between the open and closed positions of FIGS. 2 and 3 by a main valve actuator in the form of a piston member 30 received within cylinder sleeve 32 supported in control housing 34, for reciprocal movement under the combined influence of fluid pressure variations thereacross and a return spring 36 reacting between the upper side of piston 30 and a fixed spring seat 38. Control rod 40 is rigidly secured to piston 30 and extends through an oversize opening 42 in control housing 34 and a control rod housing 44 to terminate in a flanged lower end 46 forming a slotted-T connection with gate valve 28. The gate valve has an inclined seating face, including an O-ring 48, adapted for sealing engagement with a similarly inclined seat 50 formed in the wall of conduit section 52 intermediate the inlet and outlet ports 24, 26. The purpose and advantages of the inclined seating arrangement are more fully set out in U. S. Pat. No. 3,519,016 and reference may be had thereto for a more detailed description. The lower internal dimension of control rod housing 44 exceeds the largest dimension of gate valve 28 so that, even in the closed position of FIG. 2, inlet line pressure is in constant communication with the interior of control rod housing 44 via passage 54 defined by the oversize lower end of the housing and the upper end of gate valve 28.

A sequencing actuator assembly 56 is mounted within housing 34 for reciprocation under the combined influence of a return spring 58 and fluid control pressure in chamber 60 underlying a diaphragm 62 separating the spring and fluid pressure chambers. The sequencing actuator assembly includes, in addition to diaphragm 62, a sequencing control rod 64 extending upwardly through flanged opening 66 in surrounding sleeve 68 to terminate in a manual control button 70 which is accessible from the exterior of the valve 18 and a pilot valve control in the form of a flanged sleeve 72 secured to diaphragm 62.

A ratchet arm 74, including upstanding camming elements 76, 78 offset to either side of the ratchet arm, is pivoted intermediate the camming elements for limited oscillatory movement about fixed pivot 80 under the combined influences of the sequencing control rod 64 and a ratchet arm control spring 82. One end of ratchet arm 74 is formed with a yoke 84 through which a reduced upper end 86 of rod 64 extends and spring 82 reacts between button 70 and the upper side of yoke 84 to bias the same against shoulder 88 defined by the upper reduced end of rod 64.

A plate-like sequencing member 90 is mounted on the upper end of valve 18 by a fastener 91 engaging a spider extension 93 of housing 34 for rotary indexing movement about the axis thereof as an incident of the oscillatory movement of ratchet arm 74. The undersurface of plate 90 is formed with a circular array of stepping cams 92 adapted to coact with the camming elements 76, 78 on ratchet arm 74 in a manner that will be apparent from an inspection of the schematic illustration of these coacting elements in FIG. 4. Each stepping cam includes a generally vertical surface 94 and a convergent inclined camming surface 96 which surfaces merge in control rod stroke limiting abutment areas. The stroke limiting abutment areas of certain of the stepping cams are vertically elongated as indicated at 98 relative to the remaining abutment areas 100.

A dump line 102 is interconnected between chamber 60 and a suitable low pressure area, such as conduit 52, downstream of gate valve 28. Alternatively, dump line 102 could comprise an overboard dump if the conditions of usage are such that the same is not objectionable. A pilot valve 104 controls port 106 in control housing 34 to which the dump line is connected; port 106 being opened and closed by pilot valve 104 in response to the vertical positionment of sequencing control rod 64 which control rod positionment is, in turn, controlled by the particular stepping cam abutment area 98, 100 which overlies the ratchet arm cam element 76. An enlarged head 108 on pilot valve 104 is slidably received in sleeve 72 and biased in the valve closing direction by spring 110. The lower flanged end 112 of sleeve 72 coacts with valve head 108 to define a lost motion connection therebetween which lost motion is not taken up by movement of sequencing control rod 64 to the upper limit defined by the engagement of cam element 76 with an abutment area 100 as indicated by the phantom line position of ratchet arm 74 in FIG. 2. Further upward movement of control rod 64 to the position of FIG. 3, as permitted by the vertical alignment of an elongated abutment area 98 with cam element 76, takes up the lost motion connection and opens port 106.

Pressure chamber 60 is in open fluid communication with a pressure chamber area 107 below piston 30 via a bleed orifice 109 whose flow passage area is small in comparison to that of passage 54, dump port 106 and the annular passage about control rod 40 defined by the oversize opening 42. Pressure chamber 60 is also in open communication with spring chamber 111 overlying piston 30 via annular passageway 113 and opening 114.

In operation, assuming the gate valve closed position of FIG. 2, an increase in line pressure initiated at pump 10 or control valve 16 is transmitted, via inlet 24, to chamber 107 through passage 54, the interior of control rod housing 44 and oversize opening 42. From chamber 107 pressure is transmitted through bleed orifice 109 to the undersurface of diaphragm 62 and to the upper surface of piston 30 via annular passage 113 and opening 114. It will be appreciated that the fluid chambers in valve 18 are normally substantially filled with water and the communication of inlet line pressure to both the upper and lower surfaces of piston 30 does not permit the development of a sufficient pressure drop to overcome the bias of spring 36 and the piston 30 remains in the lower position of FIG. 2 holding gate valve 28 closed. The application of inlet line pressure to the undersurface of diaphragm 62 imparts an upward stroke to the sequencing actuator assembly, the extent of which is determined by the position of indexable plate 90, i.e., whether a cam face adjacent an abutment area 98 or 100 overlies cam element 76. The upward movement of diaphragm 62 and its interconnected rod 64 compresses spring 58 to rock ratchet arm 74 clockwise about pivot 80 through the engagement of shoulder 88 with ratchet arm yoke 84. This results in an upward movement of cam element 76 to engage a cam surface 96 on the indexable plate to rotate the same in the direction indicated by the arrows in FIG. 4 through one indexing step. This upward stroke is terminated at the dotted line position of FIG. 2 when cam 76 engages abutment area 100; the lost motion connection between sleeve 72 and pilot valve 104 taking up the stroke of rod 64 and permitting the pilot valve to remain seated, under the bias of spring 110, and gate valve 28 remains closed. Upon reduction in inlet line pressure, spring 58 returns the sequencing actuator assembly to the lower solid line position of FIG. 2 and spring 82 rocks ratchet arm 74 counterclockwise to impart an additional indexing step to plate 90 by the camming engagement of cam element 78 with a camming surface 96 which then positions another camming surface, approximately 180° removed therefrom, into position to be engaged by the next upstroke of cam element 76.

The aforedescribed cyclic operation is repeated for each cyclic pressure change until a cam surface 96 adjacent an elongated abutment 98 overlies cam element 76. At this time an increase in line pressure acting on diaphragm 62 results in a further upward movement of the sequencing actuator assembly as cam element 76 indexes plate 90 and moves to its maximum upper position against a vertically elongated abutment area 98 as shown in FIG. 3 and schematically indicated in FIG. 4. The extent of this movement is greater than the allowable lost motion connection between sleeve 72 and pilot valve head 108 resulting in the opening of dump port 106. The flow path from chamber 111 through opening 114, annulus 113 and port 106 to dump line 102 is large in comparison to bleed orifice 109 thus resulting in the development of a pressure drop across piston 30 which is sufficient to overcome the bias of spring 36 and open gate valve 28. Upon a drop in line pressure, pilot valve 104 is closed by the downward movement of sequencing actuator assembly 56 under the influence of spring 58 and plate 90 is indexed one step by the concomitant upward movement of cam element 78 under the bias of spring 82 which, again, positions an abutment surface area 100 to limit the next upward stroke of rod 64 to the dotted line position of FIG. 2 allowing the pilot and gate valve to remain closed during the next line pressure increase.

A desired number of gate valve opening movements may be chosen as a function of a given number of cyclic pressure changes appearing at inlet 24 by the relative spacing of the elongated abutment areas 98 in indexable plate 90 relative to the abutment areas 100. A change in the sequencing cycle may be effected by simply removing fastener 91 and substituting another plate having a different indexing pattern.

It is frequently desirable to know the position of a particular valve in its indexing cycle and to be able to manually override the normal sequencing pattern. This is facilitated by the presence of indicia 116 on the upper surface of plate 90 which indicia may overlie respective stepping cams 92 while the appropriate ones are either known or marked to indicate the locations of the elongated abutment areas permitting the gate valve to open. Plate 90 may be manually rotated about fastener 92 whereby the ratchet arm would simply undergo a ratcheting oscillation. Similarly, the valve may be manually indexed by manipulation of button 70.

In an application of the invention such as that exemplified by the embodiment of FIGS. 2–6 where the same actuator (diaphragm 62) serves the combined functions of indexing plate 90 and actuating pilot valve 104, it is not possible to rely on as small a pressure change at inlet 24 to properly sequence the valve as is the case with those valves utilizing separate actuators to index the plate and control the pilot valve. This for the reason that during those cycles where the pilot valve is opened the pressure in chamber 60, which keeps the pilot valve open, is less than during those cycles when the pilot valve is closed. When the pilot valve first opens there is a greater pressure drop across port 106 before gate valve 28 opens than is present after valve 28 is open and downstream pressure builds up. Accordingly, unless the magnitude of the pressure change cycles is substantial, such as in the range of 10 p.s.i. or greater, there is a tendency for the pilot valve to close under the bias of spring 58 immediately after the pilot valve is first opened and before the gate valve opens. On the one hand, port 106 must be sufficiently large in comparison to bleed orifice 109 that a pressure differential sufficient to overcome spring 36 may develop across piston 30 to open the gate valve, and on the other, port 106 must be sufficiently small to resist the pilot valve closing movement exerted by spring 58. Desirably, this problem is overcome by causing the pilot valve to self-adjust the discharge through port 106 so as to maintain the required pressure differential across piston 30 while yet maintaining sufficient pressure in chamber 60 to keep the pilot valve open. This is effected by the choice of a sequencing actuator assembly spring 58 whose bias may be overcome by an applied pressure in chamber 60 which is smaller than the valve inlet pressure by an amount at least equal to the required opening pressure drop across piston 30. For example, assuming a normal line pressure of 60 p.s.i. and a normal cyclic line pressure increase to 80 p.s.i., the bias of spring 58 should be selected to permit opening of the pilot valve, providing plate 90 is at a proper position to permit the same to open, at 70 p.s.i.

The sequencing valve assembly 200 illustrated in FIGS. 7–10 differs from that previously described primarily in the separation of the sequencing and pilot valve actuators, the specific indexing mechanism and the use of a venturi section to increase the pressure drop across the dump line whereby the main valve actuator may be made smaller.

PRESSURE ACTUATED AND SEQUENCED VALVE ASSEMBLY EMPLOYING SEPARATE PILOT AND SEQUENCING VALVE ACTUATORS AND INCLUDING PRESSURE CYCLING FEATURE

Valve assembly 200 includes a valve housing 202 having aligned inlet and outlet ports 204, 206 adapted for connection in branch lines 14 to control fluid flow therethrough by the cyclic operation of gate valve 208 whose vertical positionment is controlled by a main valve actuator piston 210. Piston 210 is interconnected with gate valve 208 by a control rod 212 which extends through an oversize opening 214 in control housing 216 and the hollow interior of control rod housing 218. Inlet line pressure is communicated to a chamber 220 defined by the lower surface of piston 210, the surrounding cylinder sleeve 222 and a portion of housing 216 via passage 224 at the upstream side of gate valve 208, the hollow interior of housing 218 and oversize control rod opening 214. A bleed orifice 226, having a flow passage area which is small in comparison to the flow passage area into chamber 220, communicates pressure from chamber 220 with the upper surface of piston 210 via annular passage 228 and opening 230 concomitantly with a pressure communication to chamber 232 and the undersurface of a pilot valve actuator diaphragm 234 via passage 236. An indexable plate 238 has a lower portion thereof formed with peripherally facing ratchet teeth 240 while the upper surface thereof includes a plurality of annularly arranged apertures 242 for the selective positionment of removable pins 244. Plate 238 may be indexed about the axis of fastener 246 by a spring steel ratchet arm 248 which is reciprocated relative thereto by the opposed influences of a spring 250 and fluid pressure in a chamber 252 acting on opposite sides of a diaphragm 254. A ball 256 rests on top of diaphragm 254 to transmit the upward motion thereof to one arm of bell crank 258 whose counter-clockwise motion is resisted by spring 250. The bias of spring 250 may be altered by adjustment of set screw 260 to change the required pressure level in chamber 252 to reciprocate ratchet arm 248 which is pivoted to the other arm of bell crank 258. A pawl 262 (FIGS. 9 and 10), in the form of a spring steel arm, is mounted within a recess 264 formed in housing 216 for back and forth movement as indicated by the double headed arrow 266 in FIG. 9. Unlike the embodiment shown in FIGS. 2-6, the chamber 252 for sequencing actuator diaphragm 254 is in open communication with inlet line pressure via a passageway 268. The pilot valve actuator diaphragm 234 is, on the other hand, subject to that pressure communicated to chamber 232 via bleed orifice 226. The separation of the sequencing and pilot valve actuators and their subjection to different pressure chambers provides several advantages among which is the ability to sequence the valve with much lower cyclic pressure changes since the opening of the pilot valve does not affect the sequencing actuator pressure in chamber 252; and the capability of pressure cycling the system, i.e., all line connected valve assemblies, without opening the main gate valve. This latter feature would be accomplished by adjusting the bias of spring 250 so that plate 238 would be indexed by relatively low pressure variations which are insufficient to unseat pilot valve 270 even when plate 238 is in position to allow the pilot valve to open. The manner in which this is accomplished will become apparent from the later described mode of operation.

Pilot valve 270 is normally biased to close port 272 by a spring 274 reacting between a ball 276 engaging diaphragm 234 and a spring adjustment screw 278 threadedly engaged with a surrounding spring chamber wall 280 formed integrally with a pilot valve control assembly 282. In addition to the chamber wall 280, the pilot valve control assembly includes cam arm 283 integral with pivot arm 284 having a spherical enlargement 286 interfitted with similarly formed coacting recesses in separable housing members 288, 290 whereby the control assembly 282 may undergo limited pivotal movement between the solid and dotted line positions of FIG. 7 about the axis of pivot pin 291 when a pin 244 is moved into upwardly camming engagement with cam arm 283. The assembly is normally biased to the solid line position of FIG. 7 by spring 292.

Pilot valve 270 controls fluid flow through port 272 and dump line 294 terminating in a restricted passageway 296 communicating with a venturi throat 298 which restricted passageway and venturi are formed within an integral diametral extension of conduit section 300 downstream of gate valve 208. The purpose of this construction is to provide a low pressure sink for dump line 294 assuring a more rapid gate valve response throughout its total range of movement as well as increased sensitivity to lower cyclic pressure changes. There is, of course, no flow through the venturi section when the gate valve is closed; however, at this time total inlet line pressure is available at the underside of main piston actuator 210 to initiate the gate valve opening movement. As soon as the gate valve starts to open thus reducing inlet pressure on piston 210, flow through venturi throat 298 becomes effective to further reduce pressure in dump line 294 and on the upper surface of piston 210 to maintain an adequate pressure differential for the gate opening movement.

Figure 7:
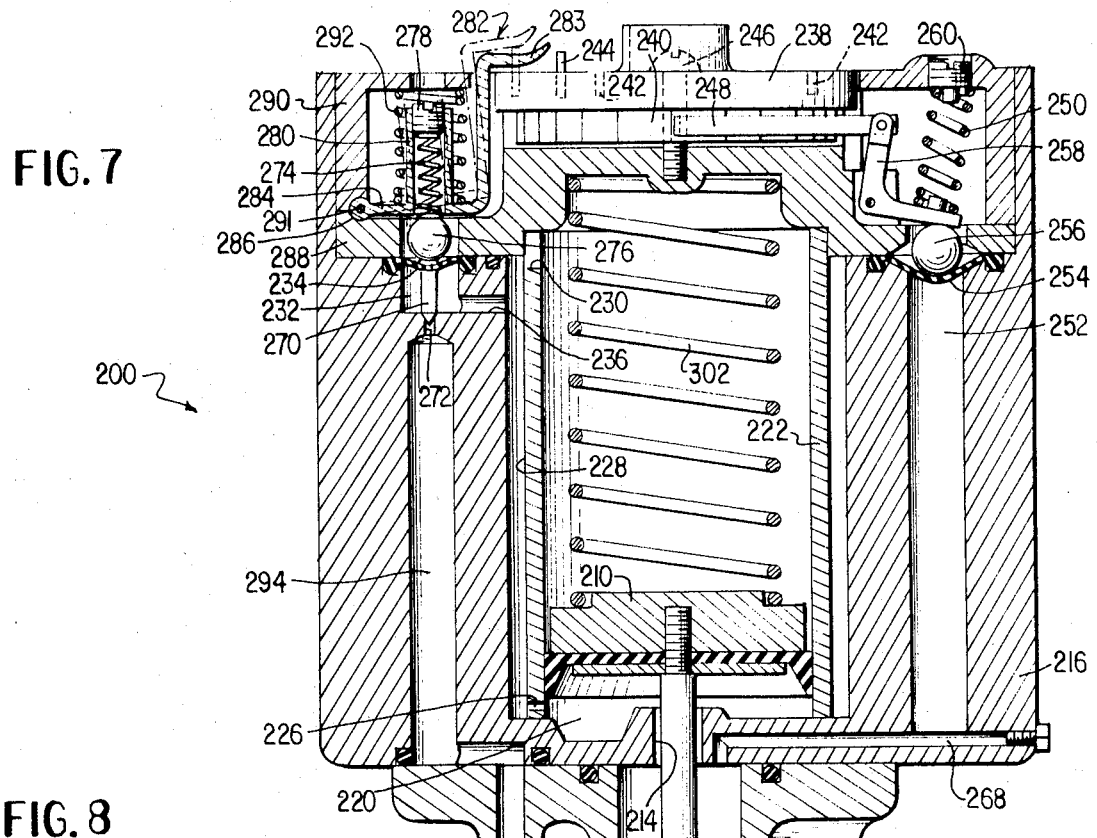
FIG. 7 is a sectional elevation of a second valve assembly embodiment of the invention employing separate sequencing and pilot valve actuators.
Figure 8:
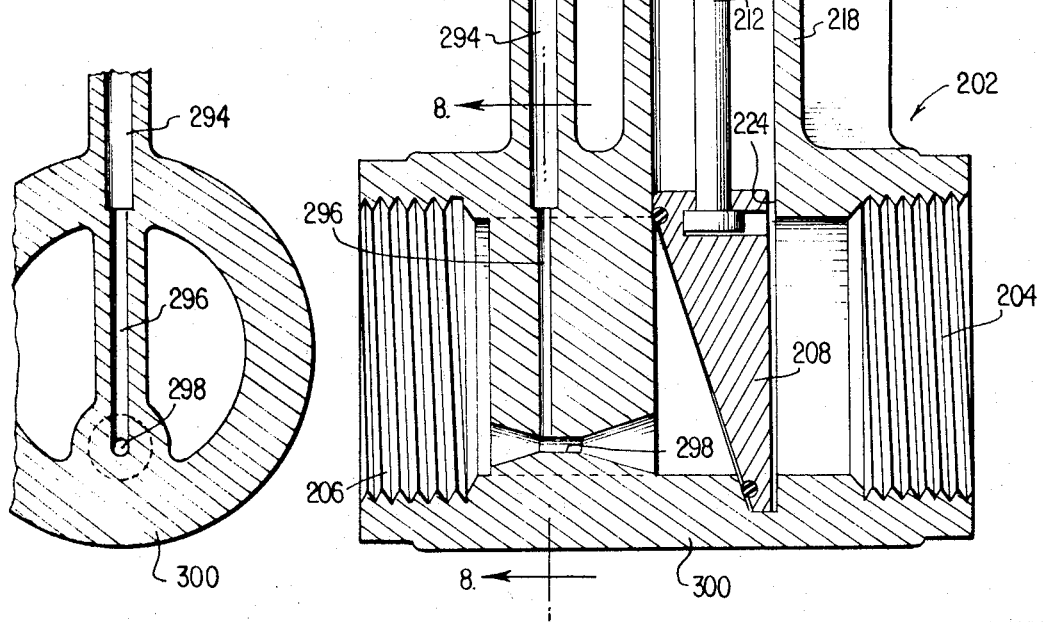
FIG. 8 is a sectional view taken along line 8—8 of FIG. 7.
Figure 9:
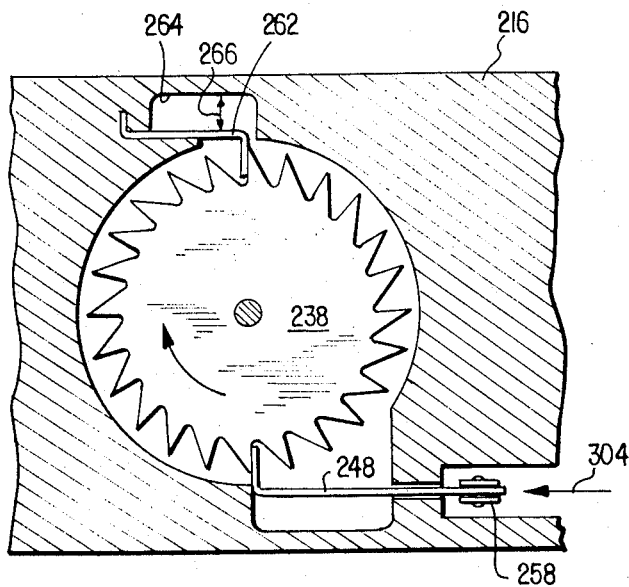
FIG. 9 is a schematic detail of a portion of the sequencing mechanism of FIG. 7 and illustrating the manner in which the sequencing element may be indexed.
Figure 10:
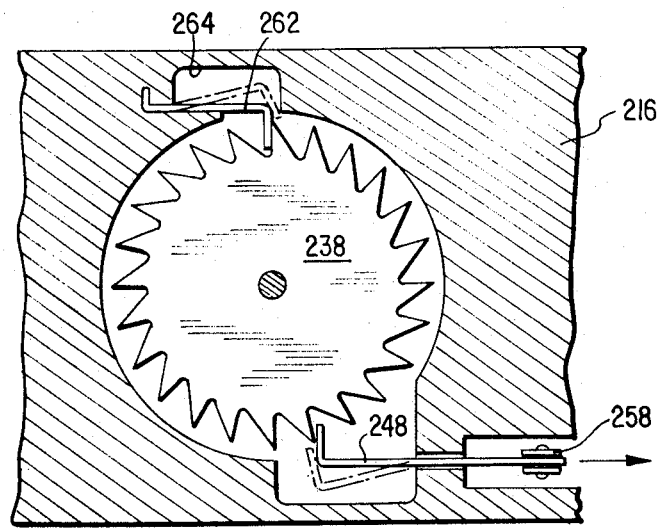
FIG. 10 is a similar schematic detail illustrating the withdrawal of the ratchet arm under reduced line pressure conditions.

In operation, assuming the low pressure gate valve closed position of FIG. 7, an increase in inlet pressure is transmitted via passage 224 through parallel flow paths to the main piston actuating chamber 220 and the undersurface of sequencing actuator diaphragm 254 via oversize opening 214 and passages 268, 252, respectively. The increased line pressure is simultaneously transmitted to pilot valve actuating chamber 232 and the upper surface of main piston actuator 210 via bleed orifice 226, and passages 228, 236, 230. The flow passage area of bleed orifice 226 is small as compared with the flow passage area of dump port 272. With pilot valve 270 closed and the valve substantially filled with water, the bias of main piston return spring 302 is sufficient to maintain piston 210 in the lower position while the increased inlet line pressure indexes plate 238 through one indexing step as ratchet arm 248 is moved to the left, as viewed in FIG. 7, by the upward movement of diaphragm 254 and ball 256 acting through bell crank 258. This particular portion of the indexing cycle is best illustrated in FIG. 9 wherein the direction of leftward movement of arm 248 as viewed in FIG. 7 is indicated by the arrow 304 to impart the indicated clockwise stepping rotation to plate 238 as pawl 262 is cammed outwardly by teeth 240. In the event that a pin 244 is not positioned to effect a camming engagement with cam arm 283, pilot valve 270 remains closed under the bias of spring 274 and the gate valve remains closed. When a pin 244 is in position to engage arm 283 as plate 238 undergoes a particular indexing step, the pilot valve control assembly 282 is tilted upwardly about the axis of pin 291 to the dotted line position of FIG. 7 against the bias of spring 292. This action, of course, automatically decreases the bias of compression spring 274 as its upper spring seat is moved away from ball 276. Assuming that the bias on spring 274 had been adjusted to permit pilot valve 270 to open under these conditions, spring 274 would yield to the inlet line pressure in chamber 232 and pilot valve 270 would open to communicate the upper surface of piston 210 with a reduced pressure area downstream of gate valve 208. The bias of spring 302 may now be overcome by inlet line pressure and the gate valve begins to open. As it does so, flow through venturi throat 298 provides a low pressure sink so that dump line pressure does not build up as the gate valve opens, such as is the case with the embodiment of FIGS. 2-6. When line pressure falls, spring 274 reseats pilot valve 270 while return springs 302 and 250 returnpiston 210 and diaphragm 254 to the low pressure condition of FIG. 7. Pawl 262 precludes counterrotation of plate 238 as the ratchet arm returns to the right as viewed in FIGS. 7 and 10. Inasmuch as the opening of pilot valve 270 does not affect the line pressure applied to the sequencing actuator diaphragm 254 the valve may be cycled by very small pressure changes.

As was previously mentioned, it is possible to provide for the pressure cycling of the valve shown in FIGS. 7-10 merely by adjusting the bias on springs 250, 274 so that a pressure increase which is less than the normal pressure increase used to cycle the valve in the manner just described will be sufficient to index plate 248 but insufficient to overcome the bias of spring 274 even when assembly 282 is tilted upwardly by engagement with a pin 244. This is the situation indicated by phantom lines in FIG. 7. As an example, assume the installation of these valves as comprising a golf course irrigation system and in which the various sprinklers associated with each of the 18 greens are to be controlled by a sequentially activated valve assembly adjacent each green. Under the usual first described mode of operation, a valve assembly 200 controlling the sprinklers for the first green would open while all other valves are closed under the influence of a 20 p.s.i. pressure increase, for example. Each of the 18 greens would subsequently be sequentially sprinkled as the cyclic pressure changes occur. If it be assumed that the 14th and 15th greens are being played, it is obviously desirable that an operational mode selection may be made to skip the sprinkling of these greens until a later time. Thus, if the adjustments on springs 274 and 250 had been so established that a 10 p.s.i. pressure rise would be sufficient to overcome the bias of spring 250 but insufficient to overcome the pilot valve closing bias exerted by spring 274 on pilot valve 270 even when assembly 282 is in the upper dotted line position of FIG. 7 (which would be its normal position to allow the pilot valve to open) then by manual control at the pump station the next two pressure increases after the 13th green had been sprinkled could be reduced from 20 p.s.i. to 10 p.s.i. which would sequence plates 238 of the various valve assemblies to the position to sprinkle the sixteenth green without permitting the pilot valves of the fourteenth and 15th sprinkler sections and, consequently, their main gate valves to open as they were cycled through their normally open positions under the reduced pressure levels.

PRESSURE ACTUATED AND SEQUENCED VALVE ASSEMBLY EMPLOYING DOUBLE ACTING PILOT VALVE

Figure 13:
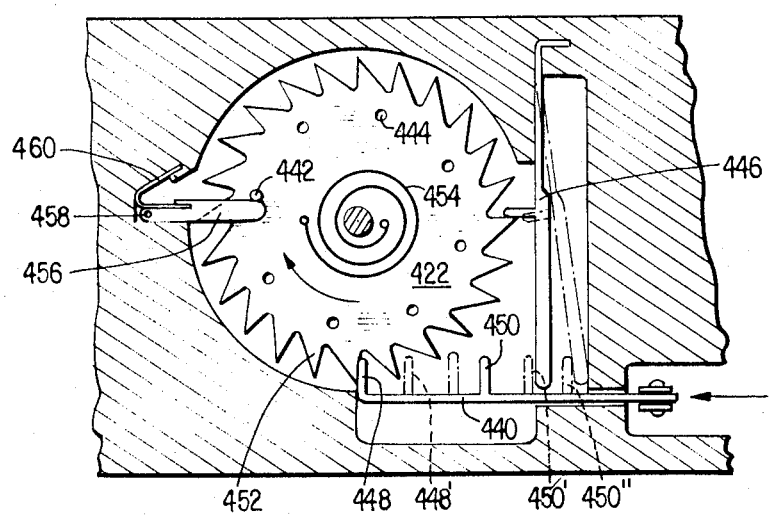
FIG. 13 is a schematic detail of the sequencing and reset mechanism used in the valve assembly of FIG. 11.

The valve configuration shown in FIGS. 11-13 retains the separation of sequencing and pilot valve actuators and distinguishes over the embodiment of FIGS. 7-10 primarily in the details of these two actuator systems.

The pressure actuated and sequenced valve assembly 400 includes a double acting pilot valve 402 which is normally biased to close dump line port 404 by spring 406 as indicated in FIG. 12. The gate open position is illustrated in FIG. 11 wherein pilot valve 402 has been forced downwardly into seating relationship with port 410 thus blocking communication between main piston actuator chamber 412 and spring chamber 414 overlying main piston 416. As will be apparent from FIG. 11, the dump line unseating movement is achieved by a direct linkage connection including an L-shaped arm 418 pivotally mounted on the valve housing for limited pivotal movement under the respective influences of one or more sequence selection pins 420 carried on the periphery of indexable plate 422 and the spring 406 acting through pilot valve 402 and push rod 424. In this embodiment no particular pressure levels are required to insure that the pilot valve will open at the proper time beyond that necessary to actuate the sequencing actuator because of the direct link connection for opening the dump line. One of the primary advantages of the double acting pilot valve is that it positively stops all bleed flow, except for that volume overlying main piston 416, so that exterior dumping is feasible as through dump line 426.

The sequencing actuator assembly includes a sealed piston 428 reciprocable in chamber 430 under the opposed influences of inlet line pressure and an adjustably biased spring 432 reacting between adjusting screw 434 and a generally T-shaped pivoted link 436 overlying piston 428. One arm of link 436 is mounted on a fixed pivot 438 while the leg thereof is pivotally connected to a ratchet arm 440 which ratchets plate 422 through one clockwise indexing step in response to each pressure cycle. The sequencing actuator assembly includes an automatic reset feature which is operable upon a substantial drop in line pressure to reset the sequencing cycle to any desired point as determined by the placement of a reset stop pin 442 (FIG. 13) in an appropriate one of an annular array of openings 444 provided in plate 422. The manner in which this is accomplished will be described with reference to FIG. 13 illustrating the relative positions of a spring steel pawl 446 and two projecting abutment arms 448, 450 on ratchet arm 440. These abutment arms are adapted to engage the ratchet teeth 452 on plate 422 and pawl 446, respectively. The solid line position of FIG. 13 corresponds to the maximum indexing stroke of sequencing actuator piston 428 under maximal increasing line pressure whereupon pawl 446 is cammed away, to the dotted line position, upon each clockwise indexing movement imparted to plate 422 by a leftward stroke of ratchet arm 440, as viewed in FIG. 13. Under normal line pressure cycles, upon a decrease in line pressure piston 428 is moved downwardly to an intermediate position corresponding to the dotted line positions 448' and 450' of the ratchet arm abutments as shown in FIG. 13. This is the normal cyclic mode of operation with movement of ratchet arm abutment 448 between the solid line position and the dotted line position denoted 448' in FIG. 13. It will be seen that pawl 446 is not depressed to its dotted line position by abutment 450 in the position of 450' but that the spring steel ratchet arm 440 has yielded to permit abutment 448 to slip past a ratchet tooth 452 while plate 422 is precluded from undergoing counterclockwise rotation by pawl 446. Upon the next pressure increase, plate 422 is again indexed in a clockwise direction as ratchet arm 440 reassumes the solid line position of FIG. 13. A conventional rewind spring schematically indicated at 454 and having a conventional overwind clutch clip control (not shown) imparts a counter-clockwise rotational bias to indexable plate 422. A reset stop arm 456 is mounted at one end on a fixed pivot 458 and has the other end thereof biased to a position intersecting the annular path of travel described by a reset stop pin 442 inserted in an opening 444. Reset arm 456 is mounted to yield against the bias of a clip spring 460 upon engagement by a pin 442 moving in a clockwise direction. In the event that system pressure should fall below the normal pressure cycling level, such as by terminating pump operation for example, plate 422 will be recycled to a desired position as previously selected by the positionment of reset stop pin 442. When line pressure falls below the normal low pressure portion of the pressure cycle, piston 428 moves to its extreme lower position under the influence of spring 432 and pawl 446 is depressed to the dotted line position of FIG. 13 by ratchet arm abutment 450 as it moves to the dotted line position indicated at 450''. Pawl 446 is then released from holding engagement and plate 422 is rotated counter-clockwise by reset spring 454 until reset stop pin 442 engages reset arm 456. Thus, upon shutting down the irrigation system all valve assemblies are recycled to their original start positions which will normally be different for each valve assembly. This provides a convenient method of insuring that the same sequential sprinkling pattern will be followed during subsequent system operation periods. For example, in a golf course irrigation system, it may be desirable to commence irrigation at an early hour before the first players arrive and if sprinkling is to be completed at each hole prior to the time they are played, the sprinkling operation should progress from the first hole. This result may be automatically achieved upon shut down of the system each evening when all valves are recycled upon loss of line pressure.

The overall operation of the valve assembly shown in FIGS. 11–13 will be described commencing with the gate open, high pressure condition illustrated in FIGS. 11 and 13. Thus, increased system pressure has been communicated through control rod housing 462 and oversize opening 464 to main piston pressure chamber 412 simultaneously with inlet line pressure transmission to the undersurface of actuator piston 428 via passageway 466 and to the pilot valve controlled port 410 by passageway 468. Ratchet arm 440 has been fully stroked to the solid line position of FIG. dump to bring a sequence selection pin 420 into camming engagement with arm 418 to unseat pilot valve 402 from dump port 404 thus communicating fluid in chamber 414 with the open atmospheric dump line via pilot valve chamber 469 and port 404. Following the opening of the dump line, piston 416 moved upwardly to the solid line position of FIG. 11 lifting gate valve 408 from its resilient seat 470 carried in conduit 472. Upon a decrease in inlet line pressure, piston return spring 474 restores piston 416 to the lower position closing gate 408. At this point the pump line is still open and the pilot valve remains unseated from dump port 404 since push rod 424 is depressed by arm 418 which remains cammed outwardly by pin 420 as shown in FIG. 11. Decreasing line pressure also permits the sequencing actuator return spring 432 to return piston 428 to the intermediate position thus withdrawing ratchet arm 440 to the position indicated by the dotted abutment members 448', 450' in FIG. 13 while pawl 446 prevents counter-clockwise rotation of plate 422 maintaining sequencing pin 420 in the position of FIG. 11 to keep dump line port 404 open. Upon the next pressure increase, ratchet arm 440 is stroked by the upward movement of sequencing actuator piston 428 before the main piston 416 can start its upward movement, even though the dump line is open, because the flow passage area into piston chamber 412 through opening 464 is small compared to the area of flow passage 466 to the sequencing piston 428. Following the ratchet arm stroke, plate 422 is indexed to remove pin 420 from camming engagement with arm 418 and spring 406 returns pilot valve 402 to the position of FIG. 12 closing dump line 426. Incoming line pressure through oversize opening 464 is now transmitted to the upper surface of piston 416 via passage 468 and open port 475 as well as to the undersurface thereof and the bias of spring 474 is sufficient to retain the main piston in the lower gate closed position. This sequence of events is repeated, with the pilot valve remaining seated on dump line port 404, for every cyclic pressure change until another sequence selection pin 420 engages arm 418. Thus incoming line pressure strokes plate 422 to bring a pin 420 into camming engagement with arm 418 which pivots counter-clockwise to depress push rod 424 and unseat pilot valve 402 from dump port 404 while seating the same on port 410 closing passage 468. Incoming line pressure may now overcome the bias of spring 474 to move piston 416 to the upper solid line position of FIG. 11 opening the gate valve. A plunger 476 may be used to manually open the valve by depression of the same to forcibly open the dump port and close the pressure port 410.

Figure 14:
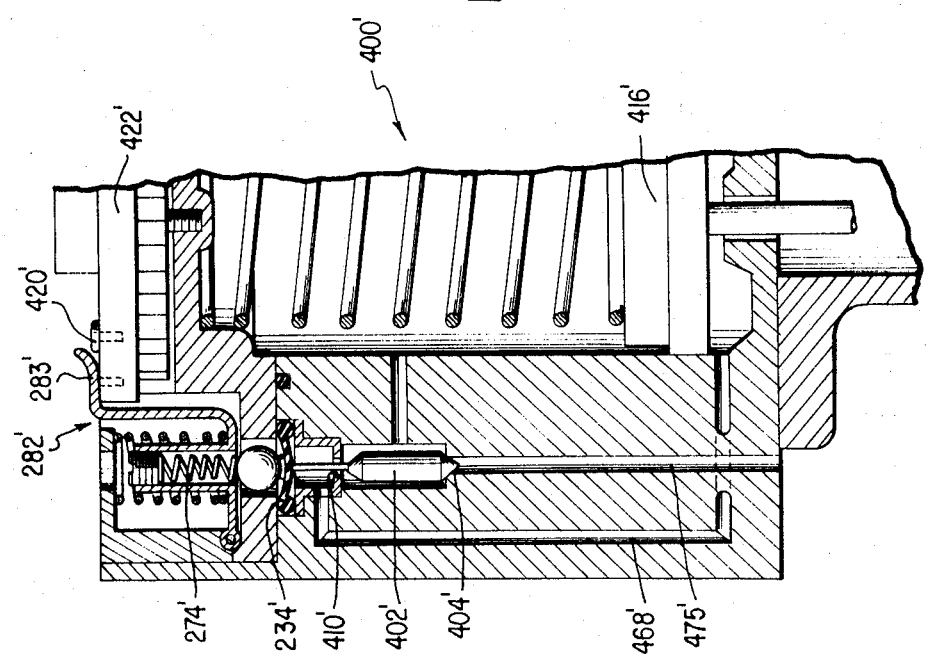
FIG. 14 is a fragmentary sectional elevation of a valve assembly incorporating features of the embodiments shown in FIGS. 7 and 11.
Figure 20:
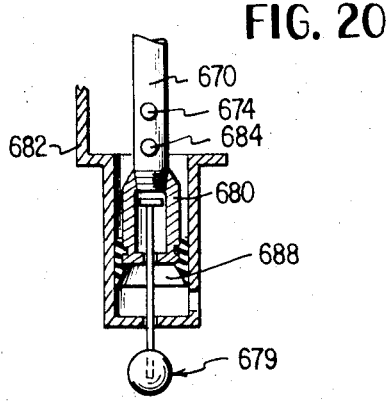
FIG. 20 is a detail view of the double acting pilot valve of FIG. 19.

It will be recalled that the pressure level responsive pilot valve control assembly 282 (FIG. 7) was described in connection with an internal dump scheme via dump line 294 to the downstream side of conduit 300 thus obviating any concern with bleed flow through the dump line. Where an external dumping valve assembly is to be utilized, as in FIG. 11, and it is desired to combine the pressure level responsive pilot valve control feature (as in FIG. 7) with a double acting pilot valve to positively stop bleed flow in excess of that volume overlying the main piston actuator; the pressure actuated and sequenced valve assembly 400 may be modified as illustrated in FIG. 14. Thus double acting pilot valve 402', interconnected with diaphragm 234', is normally biased to close dump port 404' by pilot valve control assembly 282' which is substantially identical with that of FIG. 7. As indexable plate 422' is indexed into position whereby pin 420' cams arm 283' counter-clockwise, the bias on actuator diaphragm 234' imposed by spring 274' is reduced. As incoming line pressure through passage 468' increases sufficiently to overcome the reduced bias of spring 274', the double acting pilot valve is moved upwardly to close pressure port 410' and open dump port 404' thus venting the upper side of piston 416' to atmosphere via passage 475'. The remainder of the operational cycle of valve assembly 400' is the same as that described in connection with FIG. 11.

Figure 16:
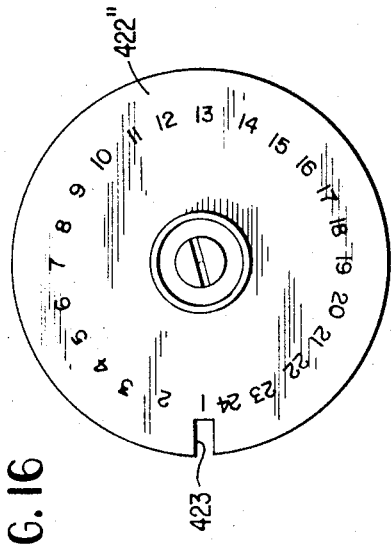
FIG. 16 is a plan view of the sequencing element employed with the valve assembly of FIG. 15.
Figure 15:
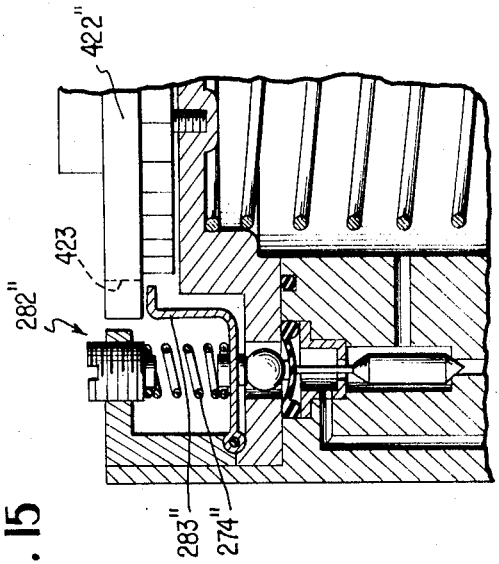
FIG. 15 is a fragmentary sectional elevational of a valve assembly similar to that shown in FIG. 14 but employing a modified pilot valve control assembly and sequencing element.

A modification of the previously described pressure level responsive pilot valve control assembly and sequencing control element that may be used with either of the valve assemblies in FIGS. 7 and 14 is shown in FIGS. 15 and 16. It will be recalled, with reference to FIG. 7 for example, that a preset bias of spring 274 is maintained by a concentric spring 292 which yieldably maintains a previously determined spring seat position for biasing spring 274 until the pilot valve control assembly 282 is cammed upwardly by a pin 244 selectively positioned on plate 238. A similar arrangement is depicted in FIG. 14. The modified arrangement shown in FIGS. 15 and 16 includes a pilot valve control assembly 282'' which is identical to that shown in FIG. 14 except that the control arm 283'' underlies plate 422'' and the outer concentric spring and surrounding biasing spring housing are eliminated. Plate 422'' includes one or more cutout portions 423 which serve to restrain or permit counterrotative movement of arm 283'' of the pilot valve control assembly. It will be apparent that unless sequencing plate 422'' has been indexed to such a position that a cutout portion 423 overlies arm 283'', incoming line pressure will be unable to open the pilot valve by the counter-rotative movement of arm 283''. When a cutout overlies arm 283'', the same is free to move upwardly as incoming line pressure overcomes the bias of spring 274'' as described in connection with FIG. 14. The primary advantage in the modified arrangement shown in FIGS. 15 and 16 is the elimination of drag forces during reset as necessarily occur with the arrangements shown in FIGS. 7 and 14. The offsetting disadvantage is the fact that sequence element 422'' must be substituted when it is desired to alter a sprinkling pattern as opposed to the mere substitution of sequence pins in the FIGS. 7 and 14 embodiments.

Figure 17:
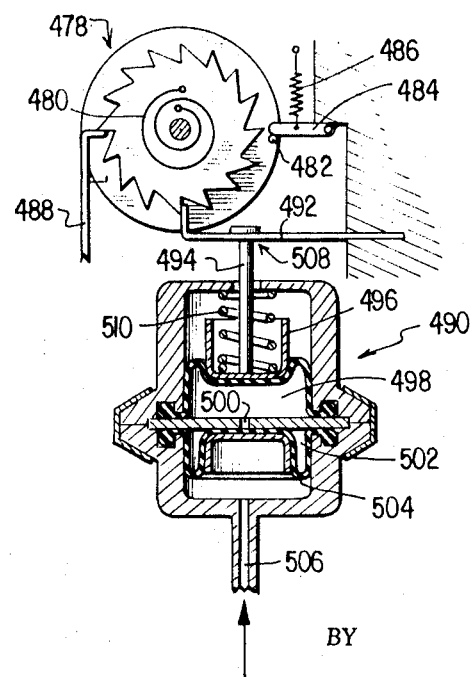
FIG. 17 is a schematic detail of an alternate sequencing and reset mechanism that may be used with the valve assembly of FIG. 11.

In FIG. 17 is schematically illustrated a modified reset mechanism that becomes operable as a function of time and pressure level rather than pressure level, alone, which may be used in place of that illustrated in FIG. 13. The indexable plate 478 having a reset spring 480, reset stop pin 482 and reset stop arm 484 biased by a spring 486 to permit clockwise movement of a reset stop pin therepast while precluding counterclockwise movement past the position shown in FIG. 17 is indexed, clockwise, by the stroke of ratchet arm 488. A pawl control assembly 490 in the form of a combined actuator and dashpot controls the position of pawl 492 as a combined function of time and pressure level. The purpose being to reset plate 478 if a pressure decrease is maintained for an extended period of time. Thus, this system would allow line pressure to be temporarily lowered or turned off at one or all of the valve assemblies for a desired period of time without the same being reset. This is achieved by interconnecting the output piston arm 494 of a diaphragm actuated piston 496 with the pawl and intercommunicating the piston diaphragm chamber 498 through a restricted orifice 500 with a second diaphragm chamber 502. Entry of the relatively viscous liquid normally present in chamber 498 into chamber 502 is resisted by line system pressure on the other side of diaphragm 504 as by a direct connection thereto at port 506. Normally, line pressure maintains the parts in the relative positions shown in FIG. 17 whereby pawl 492 is effective to prevent recycling of the valve and sufficient clearance is of course maintained, in the form of a loose connection 508, to permit the pawl to flex downwardly as plate 478 is indexed clockwise by ratchet arm 488. When line pressure at port 506 falls below the normal low pressure portion of the cycle, the viscous liquid contained in chamber 498 is slowly forced through restricted orifice 500 by spring 510 acting on piston 496. The orifice may be so sized as to permit the lapse of any desired period of time, under a known reduced pressure condition, before sufficient liquid bleeds into chamber 502 to permit pawl 492 to be withdrawn from engagement with plate 478, allowing the same to reset under the bias of reset spring 480. A similar effect may be achieved by the substitution of a porous plate for the solid plate having the restricted orifice 500.

The time delay system just described is more advantageous in certain situations than is the system shown in FIG. 13 such as where substantial elevational differences exist as among the various line connected valve assemblies and it is desired to terminate line pressure temporarily for inspection or repair. Additionally, the time delay system may be used in small installations wherein the reset capability will provide an economical method for starting a sequential sprinkling operation in a predetermined order each time without the necessity of a double pressure source to permit pressure cycling.

UNIT HANDLED CONTROLLER FOR PRESSURE SEQUENCED AND OPERATED VALVE

In FIG. 19 is illustrated a unit-handled, line pressure actuated and sequenced pilot valve controller which may be used in conjunction with the gate valve and main piston actuator therefor shown in FIGS. 2, 7 and 11 in substitution for the sequencing mechanisms and pilot valve constructions previously described in connection therewith. This unit-handled controller utilizes a sequencing mechanism much like that of FIG. 2 while employing a double acting pilot valve functioning in a manner analogous to that of FIG. 11 and having a pilot valve biasing mechanism permitting automatic pressure cycling similar to that described in connection with FIG. 7. This unit-handled feature is an important aspect of the invention since the same may be utilized not only for the control of gate valve type operators, as previously described, but also with existing sequencing valves. In this latter connection, many commercially available valves are remotely sequenced by hydraulic or electrical controls which necessitate the presence of control lines (either electrical or hydraulic) running to each sequencing valve. The unit-handled controller works directly from line pressure to sequence the valves and need only be connected adjacent each sequencing valve by two short conduits into the valve body and main line conduit, respectively, to provide the same sequencing functions in the absence of long control conduits. When thus modified, these known commercially available sequencing valves then acquire most of the previously discussed advantages inhering to pressure operated and sequenced valve assemblies including a reset feature. Although, the unit-handled controller may be used with any of the other sequencing valve assembly modifications herein described its usage with a typical prior art sequencing valve, previously requiring separate control lines running to each valve, will be described as an aid to understanding the broader implications of the invention.

In FIG. 18 is illustrated a conventional sequencing valve 600 having an inlet 602 and an outlet 604 for transmitting fluid flow to the one or more sprinklers connected therewith and comprising a sprinkler section. Flow through valve 600 is controlled by a diaphragm plate valve actuator assembly 606 which has a small cross-sectional area 608 exposed to inlet line pressure though valve housing passage 609 and a larger opposed surface area thereof exposed to bleed flow from an inlet pressure tap 610. An adjustable biasing spring 612 augments bleed pressure application to close port 614. Inlet line pressure is transmitted through tap 610 to a conventional central hydraulic controller which may employ electrically or hydraulically operated rotary valves 616 to selectively communicate chamber 618 overlying diaphragm valve 606 with either inlet pressure tap 610 or a dump line 620 via conduit 622 and restricted orifice 623. It will be understood that the central controller includes a separate rotary valve 616 and conduit 622 for each valve 600 controlled thereby and the two valves 600 schematically illustrated in FIG. 18 are merely representative of a much larger number of valves of the type illustrated in detail in FIG. 18. When all the rotary valves 616 are positioned to supply line pressure to all of the associated valves 600, as in FIG. 18, line pressure is transmitted to chamber 618 of each valve and all diaphragm valves 606 remain closed. When the leftmost rotary valve 616 shown in FIG. 18 is rotated counter-clockwise, 90°; pressure to the associated conduit 622 is terminated and the associated chamber 618 is vented via dump line 620 thus allowing inlet line pressure applied at diaphragm valve area 608 to open the same against the bias of spring 612 and open flow communication from inlet 602 to the associated sprinkler section. Upon return of the valve 616 to the position of FIG. 18, inlet line pressure, again, augments the bias of spring 612 to close port 614 stopping flow to the associated sprinkler section. It will be seen that the sequencing control of these valves 600 is effected by the selective positionment of rotary valves 616 as a function of their communicating chamber 618, alternately, with line pressure inlet tap 610 and dump line 620. In the conventional configuration shown in FIG. 18. Each valve 600 is remotely controlled by a control line 622 extending to the central control. The unit-handled structure shown in FIGS. 19-28 is designed to replace the remotely positioned central control of FIG. 18 to control communication between chamber 618 with either the inlet pressure tap or dump line as a function of inlet line pressure changes thus eliminating control lines 622. The similarity of control function as compared with the main valve controllers described in connection with FIGS. 2, 7 and 11 will be readily apparent wherein the venting of the chamber overlying the gate valve main piston corresponds to the venting of chamber 618 in FIG. 18.

The details of the unit-handled pilot valve controller 624 which will convert a conventional valve 600 into a pressure actuated and sequenced valve assembly is shown in FIGS. 19-29. Controller 624 includes a valve body 626 having intersecting flow passages 628, 630, 632 respectively interconnected with inlet line pressure tap 610 via fitting 634; a dump line 636 in fitting 638; and chamber 618 via fitting 640, line 642 and restricted orifice 623. A pilot valve operating at the confluence of passageways 628, 630, 632 selectively communicates chamber 618 with either of the pressure tap or dump line as a function of inlet pressure changes and the position of indexable plate 644 which is similar to that described in connection with FIG. 2. A reset piston 646 is reciprocably mounted in chamber 648 for reciprocal movement between the reset, low inlet pressure condition of FIG. 19 and the upper, higher pressure condition of FIG. 22 under the opposed influences of inlet pressure communicated to the undersurface of piston 646 by a passage 650 and a spring 652. An upward extension 654 of piston 646 limits the upper movement of the piston by engagement with a boss 656 formed on a spider plate extension 658 integral with housing 626 and being appropriately configured to permit the upward movement of ratchet feet 660, 662. Ratchet arm 664 is mounted for oscillatory movement about pivot pin 666 carried by piston 646 whereby the vertical position of the ratchet arm pivot axis is varied by the vertical movement of reset piston 646.

A combined pilot valve and sequencing actuator assembly 668 includes a rod 670 biased toward the lower position of FIG. 19 by an encircling compression spring 672 reacting between a pin 674 extending through rod 670 and an upper wall of housing 626. Pin 674 has an axial length sufficient to pick up an outer spring 676, concentric with the inner spring 672, when rod 670 has moved upwardly a distance equal to the lost motion travel permitted between a headed pilot valve stem 678 of pilot valve 679 and an encircling sleeve member 680 secured to rod 670. Outer spring 676, in the low pressure condition of FIG. 19, is statically disposed between an upper wall of housing 626 and an abutment defined by the upper end of a fixed sleeve 682. A second pin 684 extends through rod 670 below the level of pin 674 and cooperates therewith to straddle a yoke 686 integral with ratchet arm 664 whereby reciprocal movement of rod 670 oscillates the ratchet arm about pivot pin 666. A piston head 688 formed at the lower end of sleeve 680 is in open communication with inlet line pressure communicated to passage 628 from tap 610 and it will be apparent that the lost motion connection between the enlarged upper head 690 of pilot valve 679 and the sleeve 680 permits the pilot valve to remain seated on dump port 692 during that limit of upward travel until pin 674 engages outer spring 676. Camming surfaces 694 formed on the lower surface of indexable plate 644 are similar to those described in connection with the indexable plate of FIG. 2 and include, at selected positions about the plate periphery, elongated notches 696 extending upwardly from certain of the cam surfaces. In the sequencing control cam or plate 644 shown in FIGS. 19, 25 and 26 the spring steel pawl 698 (FIG. 26), precluding counter-rotation, coacts with separately formed ratchet teeth 700 concentrically arranged inwardly of camming surfaces 694 (FIG. 25). There are twice as many ratchet teeth 700 as camming surfaces 694 so that the pawl may prevent counter-rotation on each half camming cycle of the sequencing indexer or ratchet arm 664. Pawl 698 is interconnected with an extension of pin 666 extending through reset piston 646 via a connecting rod 702 so that in the low pressure, reset condition shown in FIG. 19; the pawl is held down to the lower dotted line position of FIG. 26 which permits plate 644 to reset under the bias of return spring 704 to an initial position as determined by the engagement of a reset pin 706 (FIG. 27) with a spring steel stop arm 708 which is mounted in housing 626 for flexing movement away from pin 706 as the cam plate is rotated in the sequencing direction. Upon reverse rotation, stop arm 708 abuts wall 710 of the housing member thus precluding passage of pin 706 as will be apparent from an inspection of FIG. 27.

Reset spring 704 is coiled in the nature of a watch spring and has the radially inner end thereof turned upwardly as at 712 for anchorage in an opening formed in the undersurface of cam plate 644; a recess 714 formed centrally of ratchet teeth 700 acting as a spring housing for the same. The other downturned end 716 of reset spring 704 is removably anchored in an opening on the upper surface of platelike extension 658 which opening merges with a generally spiral shaped groove 718. This construction provides a spring overwind relief and the method of operation will be obvious from an inspection of FIG. 19. As cam plate 644 continues to rotate in the sequencing direction, reset spring 704 is wound tighter and, consequently, compresses radially. Ultimately the inclined outer end 716 thereof will be pulled from its anchorage point in plate 658 by virtue of the increased radial force component at which time the spring will unwind to, again, expand radially. The outer spring end will then engage the spiral groove 718 which guides the end 716 back into its anchorage opening as the spring continues its unwinding action.

Figure 21:
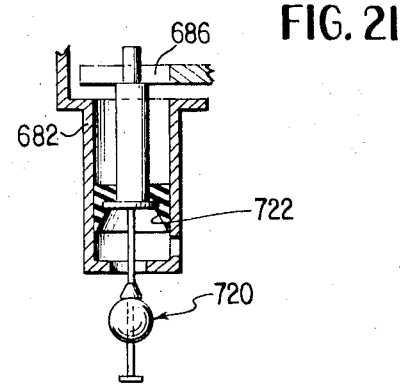
FIG. 21 is a similar view of an alternate pilot valve construction that may be used with the valve assembly of FIG. 19.

In FIG. 21 is illustrated a modified form of lost motion connection between a pilot valve 720 and its actuating piston 722 which may be substituted for that of FIG. 19, if desired.

Figure 22:
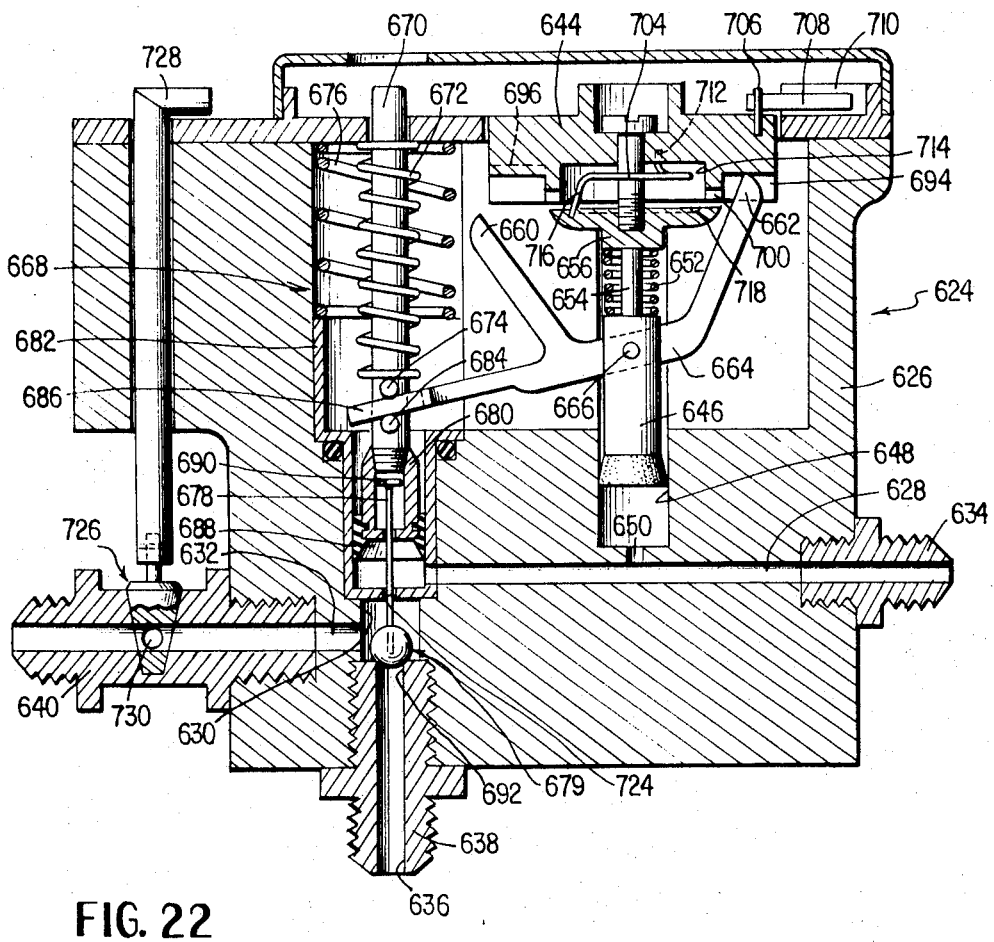
FIG. 22 is a sectional elevation of the controller shown in FIG. 19 in the position it would assume under low, residual pressure conditions.
Figure 23:
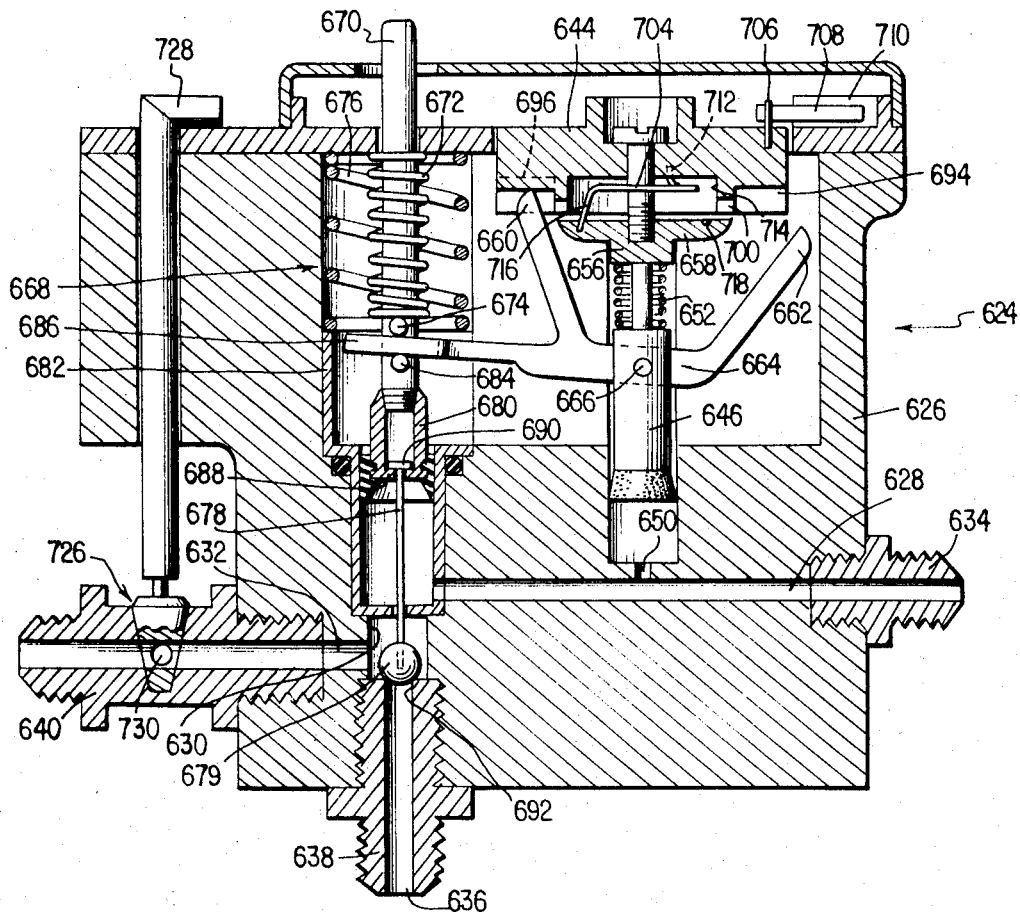
FIG. 23 is a similar view showing the relationship of parts as inlet line pressure increases but the same has not been cycled to a main valve open position.
Figure 27:
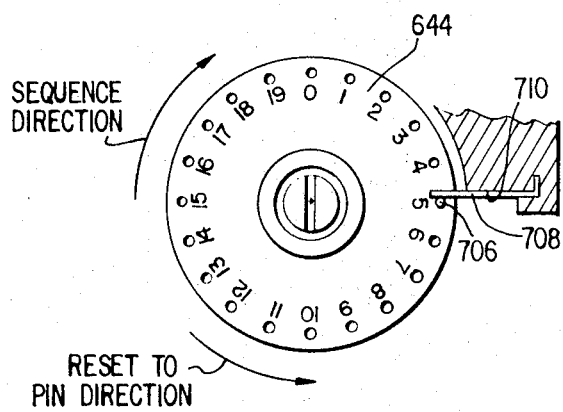
FIG. 27 schematically illustrates the reset stop mechanism of FIG. 19.
Figure 28:
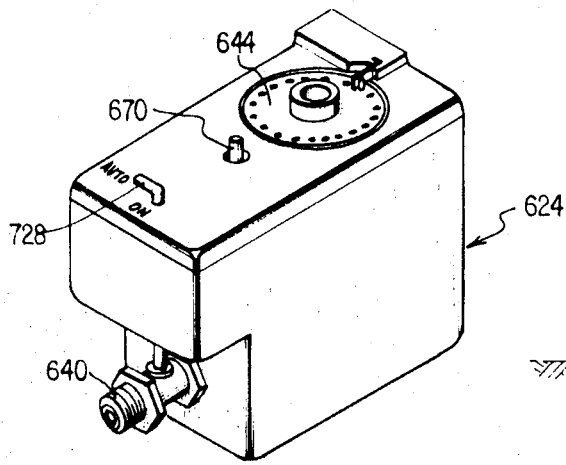
FIG. 28 is a perspective view of the FIG. 19 controller.
Figure 29:
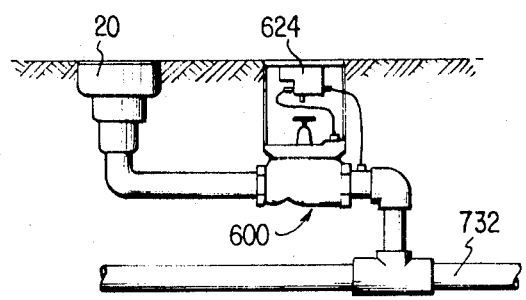
FIG. 29 is an elevational view of the valve assembly shown in FIG. 19 connected in a pressure line.

A complete cyclic operation of the controller 624 and associated main valve 600 will now be described. Assuming the low pressure main valve closed condition of FIG. 19 wherein pawl 698 is withdrawn from engagement with ratchet teeth 700, the indexable plate has been reset by spring 704 and the pilot valve is seated on dump port 692; a restoration of the normal sequencing line pressure (corresponding to the low pressure condition of the sequencing cycle) is transmitted via tap 610 to reset piston cylinder 648 and to main valve chamber 618 via controller passages 628, 632 and line 642. Main valve plate 606 remains closed because inlet line pressure is communicated to chamber 618 and, simultaneously, reset piston 646 is elevated to the position of FIG. 22 against stop boss 656 thus indexing plate 644 one step as ratchet foot 662 is moved upwardly into engagement with a cam face 694 by virtue of the upward movement of pivot 666 while the yoke end 686 of ratchet arm 664 is maintained in the position of FIG. 19. As previously stated, the restoration of normal cyclic valve operating pressure conditions following the much lower line pressure associated with the valve reset condition illustrated in FIG. 19 corresponds to the low pressure portion of the normal cyclic pressure changes which are required to cycle the valve assemblies. FIG. 22 illustrates this low pressure portion of the sequencing cycle which is insufficient to elevate pilot valve actuator piston 688. Thus, the yoke end of ratchet arm 664 remains fixed since it can not move upwardly relative to overlying pin 674 and ratchet arm 664 acts as a third class lever for this initial indexing of plate 644. Upon a further increase in line pressure, corresponding to the high pressure portion of the normal operating cycle, pilot valve actuator piston 688 is moved upwardly thus pivoting ratchet arm 664 clockwise. The upward movement of the pilot valve actuator piston is terminated prior to the time pin 674 compresses spring 676 by the abutment of ratchet foot 660 with the upper terminus of a normal cam face 694 as shown in FIG. 23 after indexing the plate 644 one additional step. It will be noted that the lost motion connection between piston sleeve 680 and the pilot valve stem 678 allows pilot valve 679 to remain seated on dump port 692 and inlet line pressure remains in communication with main valve chamber 618 via passages 628 and 632. Upon a decrease in line pressure to the normal low pressure portion of the operating cycle, but above that necessary to reset the valves; pilot valve piston 688 moves downwardly to the FIG. 19 position thus pivoting ratchet arm 664 counter-clockwise about pivot 666 to again engage ratchet foot 662 with a cam surface to further index plate 644. It will be recalled that during the normal low pressure portion of the operating cycle, reset piston 646 remains in the upper position of FIG. 22 and maintains pawl 698 in the ratchet tooth engaging position of FIG. 26.

Assuming, now, that a camming surface having an elongated notch 696 has come to overlie ratchet foot 660; the next pressure increase raises the pilot valve piston while indexing plate 644 until such time as pin 674 engages outer spring 676. If the high pressure portion of the cycle is of sufficient magnitude, as may be preselected by controlling pump pressure and/or the bias of spring 676, spring 676 will be compressed as rod 670 moves further upwardly to unseat pilot valve 679 from the dump port and seat the same on line pressure port 724. This interrupts inlet pressure to main valve chamber 618 and, simultaneously, vents the same to dump line 636 whereupon inlet line pressure at the upstream surface 608 overcomes spring 612 to open main valve plate 606 (FIG. 24). Upon the next normal line pressure decrease, the condition of FIG. 22 is restored and plate 644 is indexed one additional step by ratchet foot 662. As previously intimated, it is only necessary to so select the bias of spring 676 in relation to a known pressure level sufficient to elevate the pilot valve piston but insufficient to unseat the pilot valve to accomplish pressure cycling of the valve in a manner analogous to that described in connection with the valve of FIG. 7.

All of the controllers 624 associated with a particular flow line may be simultaneously reset merely by reducing inlet pressure below the low pressure portion of the normal operating cycle as by stopping pump operation or venting the main flow line. Upon such a decrease in pressure, reset piston 646 returns to the position of FIG. 19 and withdraws pawl 698 from engagement with ratchet teeth 700 through connecting rod 702 and pin 666. Thereupon, reset spring 704 rotates plate 644 counter-clockwise until its movement is arrested by the engagement of a reset pin 706 with reset stop arm 708. An exemplary reset condition is shown in FIG. 19.

The valves may be manually cycled by reciprocating the end of control rod 670 extending above housing 626. The exposed end of control rod 670 as well as the indexable plate is normally enclosed by a removable cover 725.

A manually operated petcock 726 of the type shown at 616 in FIG. 18 includes a manual control lever 728 whereby any desired sprinkler section may be turned on by manipulating the same. In FIG. 19, petcock 726 establishes open communication between passage 630 and line 642 which is its normal condition for the automatic pressure sequencing operation just described. Manual rotation of lever 728 through 90° blocks flow from passage 632 through fitting 640 and opens line 642 to a vent line, not shown, through petcock valve port 730 exiting to the rear of fitting 640 as viewed in FIG. 19.

A perspective view of the controller 624, with the cover removed (FIG. 28), illustrates the unit-handled feature and the ready accessibility of the manual controls. The sequencing cycle may, of course, be changed by substitution of cam plates 644.

The overall relationship of a main line 732, main valve 600, controller 624 and sprinkler 20 is depicted in FIG. 26.

Figure 30:
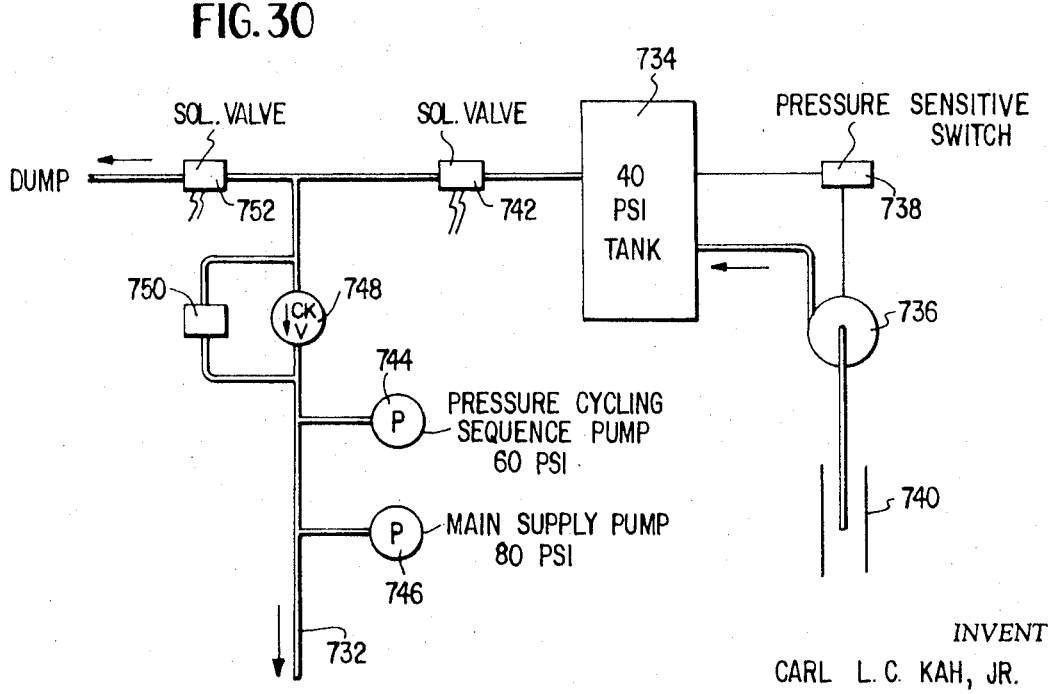
FIG. 30 is a schematic representation of the system pressure controls that may be employed with the valve assemblies herein described to expand their range of capabilities beyond that afforded by the simpler system of FIG. 1.

Basically, each of the previously discussed valve assemblies may be used in the simple system arrangement shown in FIG. 1 however a more usual arrangement which does not require the use of the electrical control system, discussed infra, in order to make possible the full range of expanded capabilities inhereing in the previously discussed valve assemblies is illustrated in FIG. 30. In FIG. 30 is schematically illustrated an exemplary supply and control system for main line 732 whereby main valve 600 may be operated in the manner previously described for use in the irrigation of a golf course, for example. Although typical operating figures have been chosen for purposes of illustration it should be understood that these may be varied greatly merely by the choice of appropriate spring constants for the various spring biased mechanisms previously described.

Residual system pressure of 40 p.s.i. is maintained in a line connected storage tank 734 by a well pump 736 whose operation is controlled by a pressure sensitive switch 738 to pressurize the tank from a well 740. This provides sufficient system pressure to manually operate one of the sprinkler sections by rotating petcock 726 90° from the position of FIG. 19 and, additionally, provides system pressure for other uses such as by desired hose connections to line 732. The 40 p.s.i. in tank 734 is sufficient to raise reset piston 646 from the position of FIG. 19 to that of FIG. 22 and thus index plate 644 by one step but is insufficient to raise the pilot valve actuator piston 688 against the bias of spring 672. A solenoid valve 742 downstream of tank 734 may be actuated to interrupt the residual system pressure source to permit the valves to reset as spring 652 moves reset piston 646 to the FIG. 19 position.

A pump 744 having a maximum head characteristic of 60 p.s.i. may be brought on line for pressure cycling the controllers, i.e., for indexing all of plates 644 without opening the main valves 600, when desired. Thus the fluctuation of line pressure between the residual pressure of 40 p.s.i. and the 60 p.s.i. obtained by the intermittent operation of pump 744 is sufficient to raise piston 688 against spring 672 but insufficient to overcome the bias of spring 676 even when an elongated abutment 696 is aligned above ratchet foot 660.

A main supply pump 746 operating at 80 p.s.i. or higher is intermittently operated to provide the pressure fluctuations necessary to pressure sequence and actuate the main valves. Thus the 80 p.s.i. is sufficient to move pilot valve piston 688 to the full upper position of FIG. 24 against the bias of springs 672 and 676 when an elongated abutment 696 is appropriately positioned.

A parallel connected check valve 748 and system bleed solenoid 750 are provided upstream of pumps 744, 746 as is an auxiliary solenoid operated dump line 752 which completes the pressure system control mechanisms necessary to operate any of the valve assemblies herein described.

PRESSURE ACTUATED AND SEQUENCED VALVE ASSEMBLY EMPLOYING UNITARY PILOT VALVE, SEQUENCING AND RESET ACTUATOR

An unusually compact pressure actuated and sequenced valve assembly which makes possible the achievement of the aforementioned pressure cycling and reset functions is illustrated in FIGS. 31–39 and is primarily characterized by the use of a single pilot valve, sequencing and reset actuator. The grouping of those mechanisms responsible for the three functions of pilot valve actuation, pressure cycling and reset makes it possible to provide simultaneous access to the adjusting mechanisms for each of the three functions and, in the valve assembly configuration shown in FIGS. 31–39, to arrange this grouping immediately adjacent the rotary sequencing element to also provide simultaneous access to the sprinkling section selection pins carried thereon.

Figure 31:
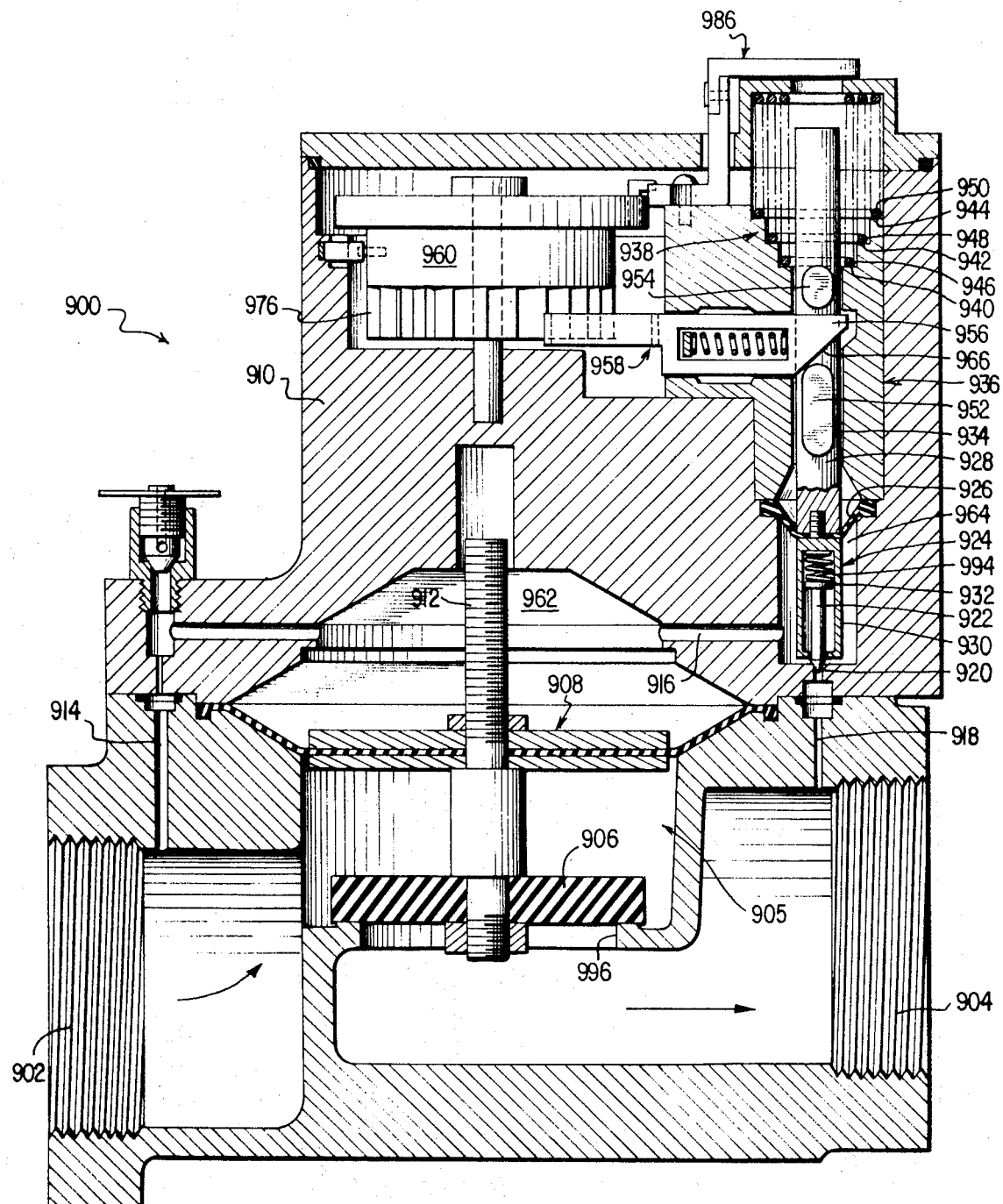
FIG. 31 is a sectional elevation of a pressure actuated and sequenced valve assembly under reset pressure conditions which employs a single pilot valve and sequencing actuator, as in FIG. 2, but including a reset capability and mechanical escapement feature in the sequencing mechanism.

In FIG. 31 is illustrated a pressure actuated and sequenced valve assembly 900 having inlet and outlet ports 902, 904 adapted for threaded interpositionment in branch flow lines for controlling fluid flow therethrough by the cyclic operation of a main flow control valve actuator assembly 905 which includes a main valve 906 and an actuator 908 in the form of a diaphragm actuator whose outer periphery is clamped between separable sections of housing 910 and is centrally connected to the main valve actuator stem 912. The upper surface of actuator 908 is in open communication with inlet line pressure via passage 914 and may be vented to the downstream side of main valve 906 by a passage 916 and vent line 918 whose dump port 920 is normally closed by pilot valve 922 having a lost motion connection with actuator assembly 924. The lower surface of actuator 908 is, also, in open communication with inlet line pressure as is the upper surface of main valve 906 whose cross-sectional area is less than that of the undersurface of actuator 908.

Actuator assembly 924 includes a diaphragm actuator 926 having secured thereto an upwardly extending actuator rod 928 and a downwardly depending sleeve member 930 whose inturned lower end coacts with the enlarged head 932 of the pilot valve in the same manner as described in connection with FIG. 2. Actuator rod 928 extends upwardly from diaphragm 926 through a lower rod receiving passageway 934 formed in the lower end of housing section 936 and into a multiple counterbored upper spring housing portion 938 generally concentric with lower passageway 934. The three concentric shoulders 940, 942, 944 defined by the counterbored lower end of spring housing 938 provide spring seats for concentric compression springs 946, 948, 950 which, respectively, control the reset, pressure cycling and pilot valve opening movements of the valve assembly. Lower and upper cross rods 952, 954 are integrally carried by actuator rod 928 for reciprocal movement therewith to, respectively, cam the abutment end 956 of a ratchet arm 958 into driving engagement with rotary sequencing element 960 and compress one or all of springs 946, 948, 950 as the actuator rod moves upwardly from the position of FIG. 31 under the influence of line pressure communicated from chamber 962 overlying main actuator 908 to diaphragm chamber 964 via passageway 916. The upper spring compressing cross rod has an axial length exceeding the diameter of the outer concentric spring 950 so that as the rod is progressively raised through the positions indicated in FIGS. 31, 34 and 36, additional ones of the springs 946, 948, 950 will be "picked up," i.e., their respective biases will resist the upward movement of rod 928 in an additive manner at those discrete areas of upward rod travel where an additional one of the concentric springs comes to bear on upper cross rod 954. This additional resistance to further upward movement of rod 928 at discrete points along its path of upward movement creates what might be regarded as "resistance steps" the degree of which resistance may be easily selected by an appropriate choice of spring constants as will be made clear in the ensuing operational description and may typically comprise an inlet pressure of 40 p.s.i. to compress reset spring 946 to the position of FIG. 34, 60 p.s.i. to compress spring 948 to the position of FIG. 36 and 80 p.s.i. to compress all three springs to the position of FIG. 38.

Figure 33:
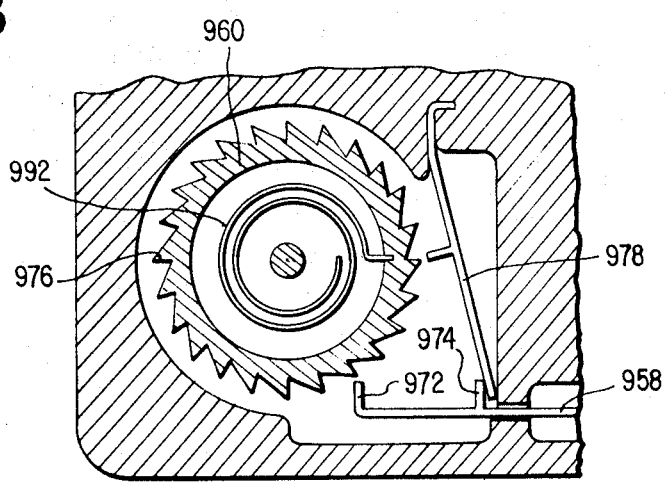
FIG. 33 is a schematic detail of the sequencing and reset mechanism corresponding to the valve assembly position of FIG. 31.
Figure 34:
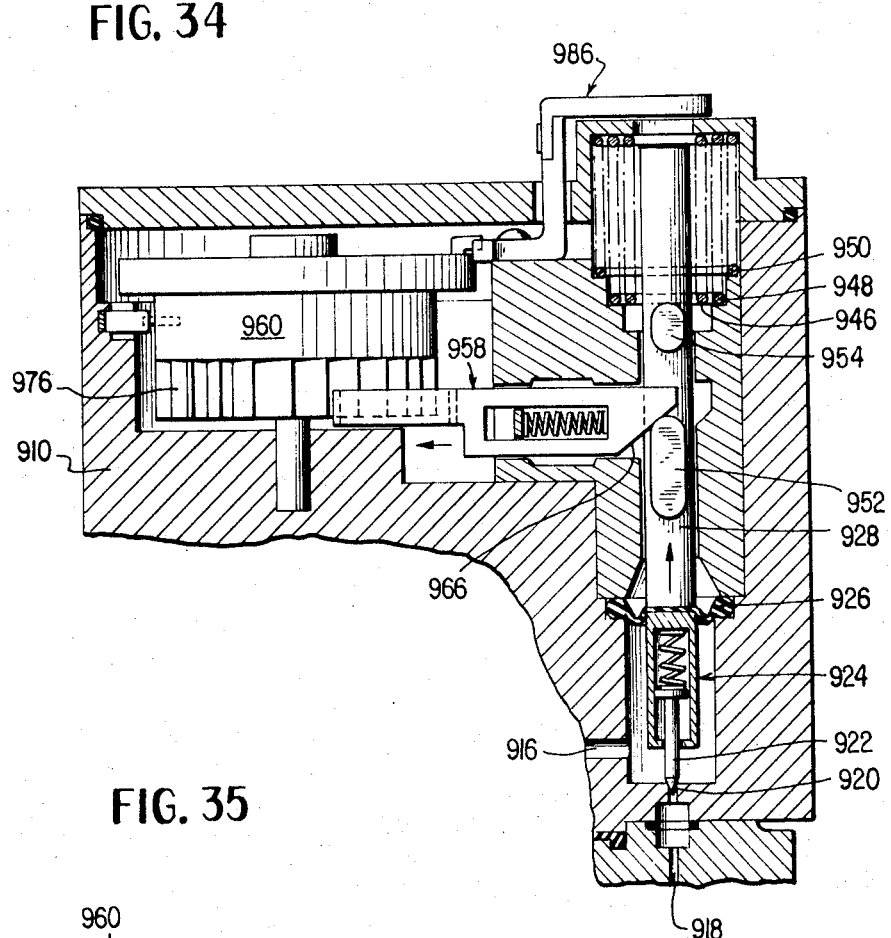
FIG. 34 is a fragmentary sectional elevation of the FIG. 31 assembly under residual line pressure conditions.
Figure 35:
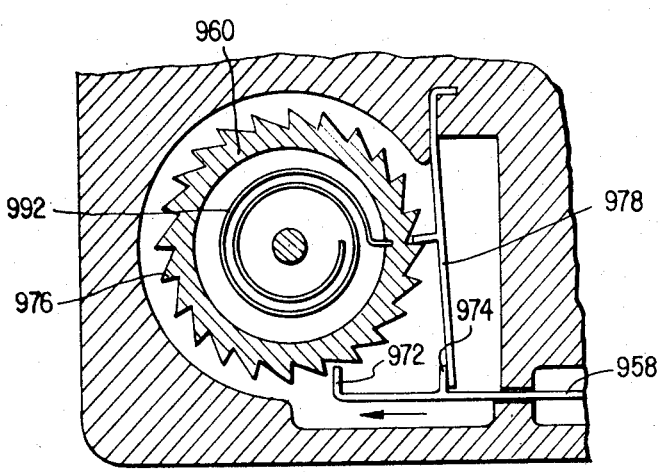
FIG. 35 is a view similar to FIG. 33 and illustrating the sequencing and reset mechanism corresponding in position to the valve assembly position of FIG. 34.
Figure 36:
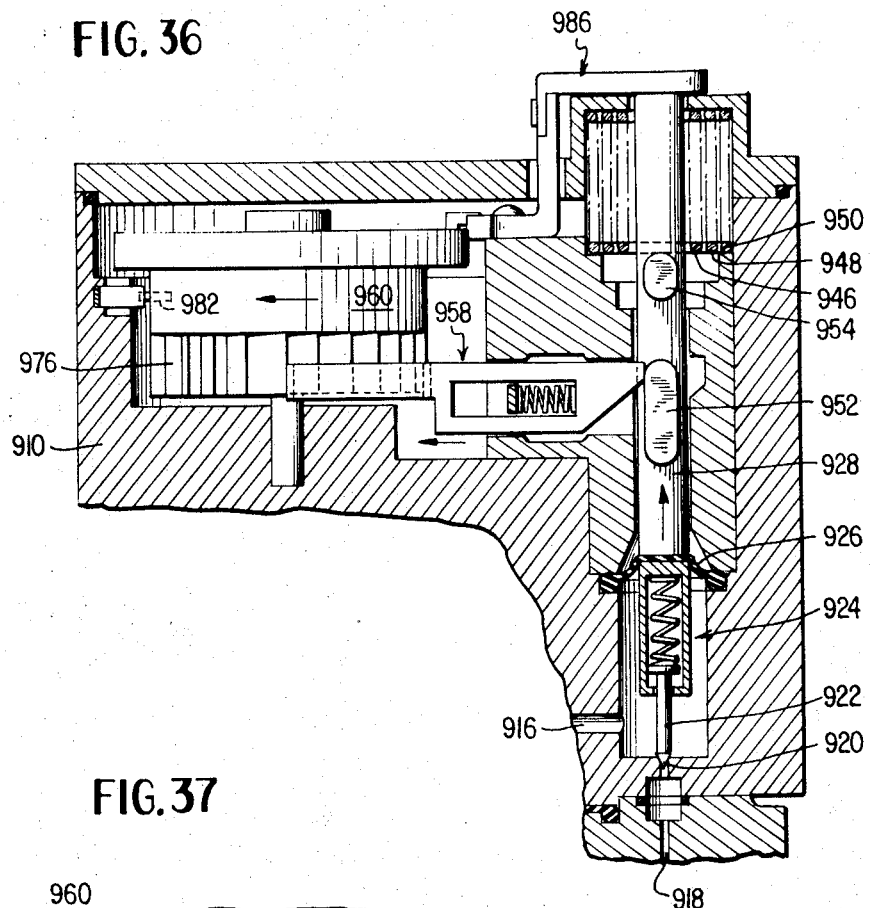
FIG. 36 illustrates the position of the FIG. 31 assembly as the same is subjected either to high main valve opening pressure conditions with further upward movement of the sequencing and pilot valve actuator blocked by the sequencing element positionment or an intermediate pressure condition sufficient to pressure cycle the valve assembly but insufficient to open the main valve without regard to the sequencing element positionment.
Figure 37:
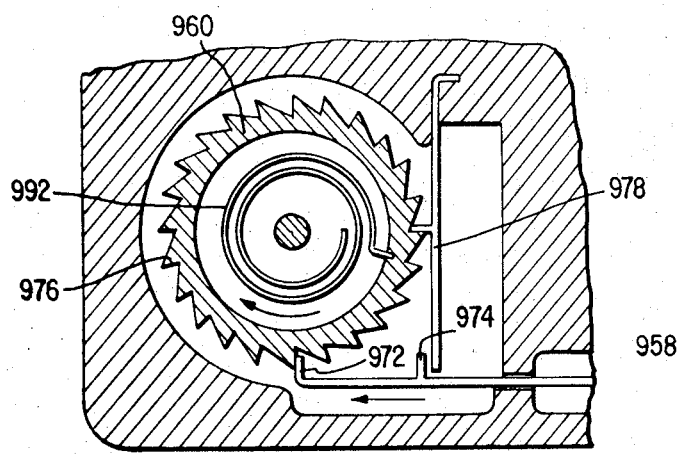
FIG. 37 is a view similar to that of FIG. 33 and corresponding with the valve assembly position of FIG. 36.
Figure 38:
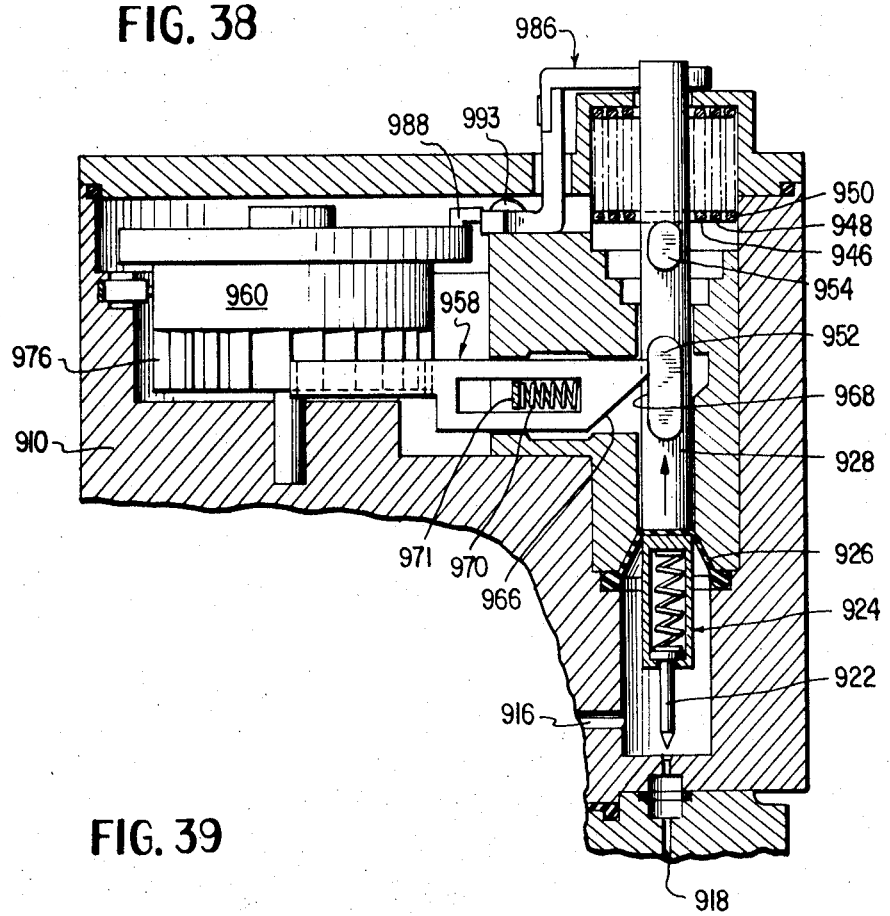
FIG. 38 illustrates the main valve open position.
Figure 39:
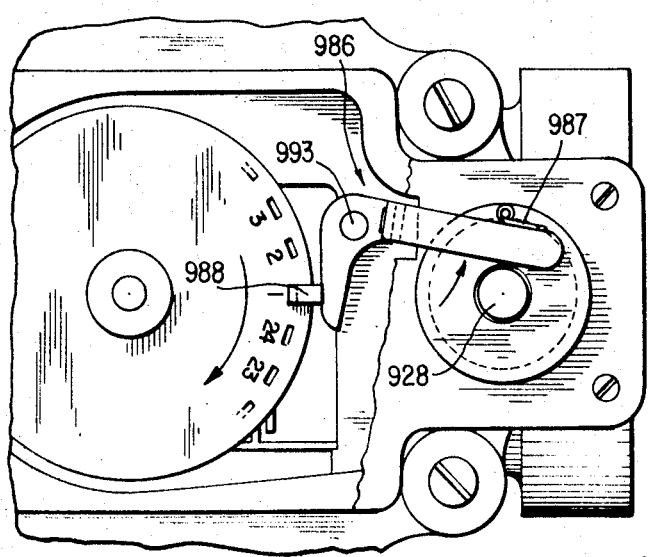
FIG. 39 is a view similar to FIG. 32 showing the relationship of parts corresponding with the FIG. 38 main valve open position.

Concomitantly with the positionment of upper cross rod 954 in engagement with successive ones of the concentric springs as illustrated in FIGS. 31, 34 and 36, ratchet arm 958 assumes the respective positions shown in FIGS. 33, 35 and 37 which correspond to the reset, low pressure condition of the pressure cycling mode and take-up of the lost motion connection between the sequencing control assembly and the pilot valve, respectively. FIG. 38 represents the maximum upward movement of control rod 928 which opens pilot valve 922 when the sequencing element 960 is positioned to permit this further upward movement from the position of FIG. 36. It will be noted that there is a direct relationship between the upward movement of actuator rod 928 and the transverse movement of ratchet arm 958 due to the camming engagement between lower cross arm 952 and cam face 966 of the ratchet arm until the position of FIG. 36 is reached at which time a mechanical escapement comes into play and further upward movement of rod 928 to the position of FIG. 38 produces no further movement of the ratchet arm which is now biased against side face 968 of lower cross rod 952 by compression spring 970 reacting between the ratchet arm and an integral extension 971 of the valve housing.

The ratchet arm abutments 972, 974 cooperate with ratchet teeth 976 on sequencing element 960 and with pawl 978 in the same manner as described in connection with FIG. 13. The reset stop mechanism is quite similar to that described in connection with FIG. 13 wherein a reset stop pin 980 may be selectively positioned in any one of a plurality of radially opening pin receiving openings 982 which are positioned below the level of sprinkling section selection pin receiving openings 984 so that the reset stop pins do not interfere with a pivotal bipartite L-shaped abutment member 986 which is mounted for pivotal movement into and out of interesecting relationship with the path of reciprocating travel undergone by actuator rod 928 under the camming influence of one or more sequence selection pins 988 positioned in openings 984. The spring steel reset stop member 990 flexes to allow passage of pin 980 in the clockwise direction, as viewed in FIG. 32, and acts as a rigid abutment to restrain the passage of pin 980 therepast in the opposite direction. A reset spring mechanism which may correspond to any of those shown and described in connection with the earlier reset features is indicated at 992.

Figure 32:
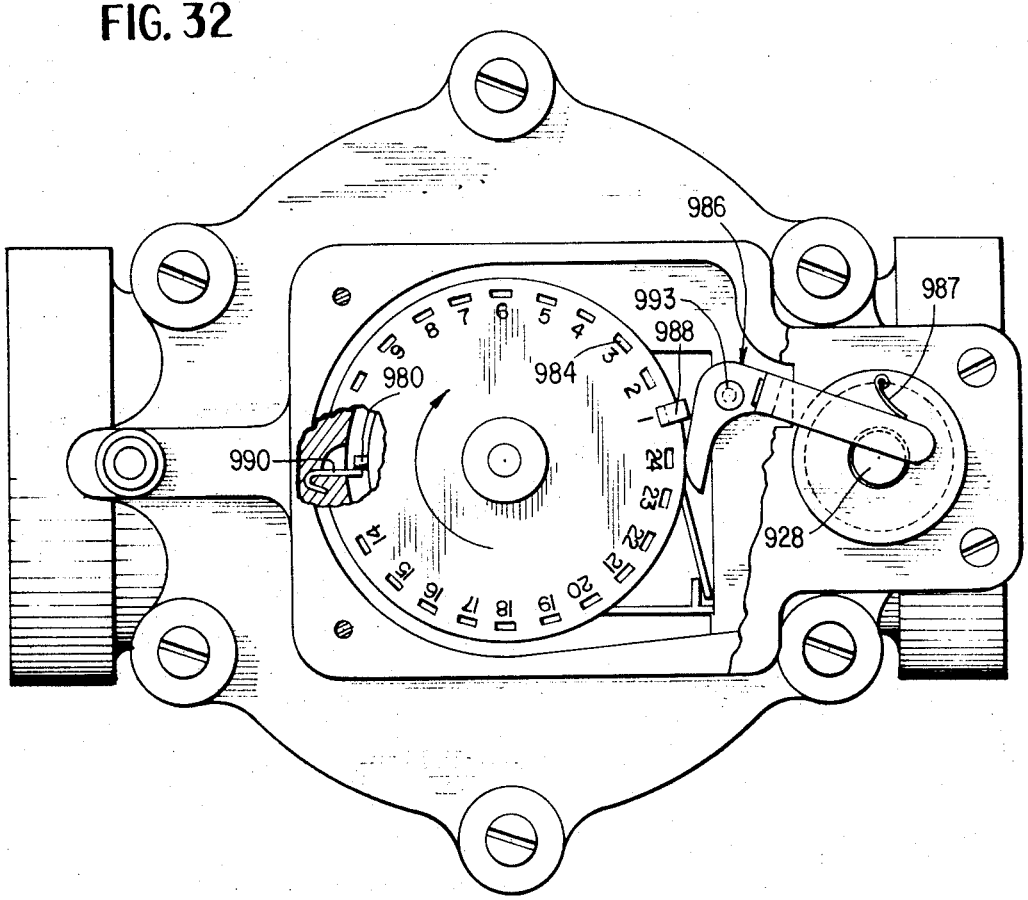
FIG. 32 is a plan view of the FIG. 31 assembly with parts broken away for clarity of illustration.

The following operational description assumes an initial low reset pressure condition such as that indicated in FIG. 31 with main valve 906 closed, the actuator assembly 924 in its lowermost position under the influence of reset control spring 946, the pilot valve seated on dump port 920 under the influence of spring 994 and the L-shaped abutment member 986 biased to the position of FIG. 32 overlying actuator rod 928 by a leaf spring 987. The sprinkler section selection pin is assumed to be in the position of FIG. 32 so that the next indexing step will cam abutment 986 counterclockwise about pivot 993 to the position of FIG. 39 wherein the distal offset end thereof is swung clear of the path of actuator rod movement.

If main valve opening pressure, on the order of 80 p.s.i. for example, be applied at inlet 902 this same pressure is applied to both surfaces of actuator 908 and to the upper surface of main valve 906; thus, the main valve would remain closed so long as vent line 918 is blocked. Main valve opening pressure is, however, transmitted to diaphragm pressure chamber 964 to raise actuator rod 928 throughout its full range of permissible upward movement since the main valve opening pressure is sufficient to compress all three springs 946, 948, 950. As rod 928 moves upwardly ratchet arm 958 is moved to its extreme leftmost position as viewed in FIGS. 36 and 38 whereupon, as shown in FIG. 37, the sequencing element 960 is indexed clockwise by the forward ratchet abutment 972 as the flexible pawl yields to permit one ratchet tooth to move therepast. This indexing step brings sequence selection pin 988 into the position of FIG. 39 camming abutment 986 to the position of FIG. 39 and out of overlying relation to rod 928. As the upper end of rod 928 moves upwardly past the level of abutment 986 the lost motion connection between sleeve 930 and pilot valve 922 is taken up and dump port 920 is opened to bleed main valve actuator chamber 962 whereupon the inlet line pressure applied to the undersurface of actuator 908 opens the main valve.

This condition obtains with flow through valve assembly 900 to its associated sprinkler section so long as inlet line pressure communicated to diaphragm pressure chamber 964 via passage 914, the upper portion of chamber 962 and passageway 916 is sufficient to maintain all three of the concentric springs compressed. In the assumed example of a typical 80 p.s.i. main valve opening pressure, residual line pressure would be maintained at approximately 40 p.s.i. which is that pressure level sufficient to compress the inner concentric reset control spring 946 but insufficient to compress the middle concentric spring 948. Accordingly, for normal pressure actuated and sequenced operation to sequentially operate the various line connected sprinkler sections, line pressure will be varied between 40 p.s.i. and 80 p.s.i.. Thus, as line pressure falls to 40 p.s.i., actuator rod 928 is moved downwardly to the position of FIG. 34 under the additive biases of springs 946 and 948 and ratchet arm 958 returns to the intermediate position shown in FIGS. 34 and 35 under the return bias of spring 970. Further rightward movement of ratchet arm 958 as viewed in FIG. 34, is blocked by the engagement of cam face 966 with the lower cross rod 952. The downward movement of actuator rod 928 permits pilot valve 922 to seat on dump port 920 and chamber 962 is, again, brought up to line pressure and main valve 906 closes as static pressure builds up in chamber 962. A compression spring encircling rod 912 could, of course, be used to provide a faster valve closing response time, if desired. Upon the next line pressure increase, ratchet arm 958 indexes pin 988 out of camming engagement with abutment 986 and spring 987 biases the same to the position of FIG. 32 blocking upward movement of actuator rod 928 past the position of FIG. 36 which upward movement of the actuator rod is taken up in the lost motion connection with the pilot valve so that the pilot valve remains seated and the main valve does not open. This cyclic operation is repeated for each pressure fluctuation between the assumed values of 40 p.s.i. and 80 p.s.i. with a different one of the line connected valve assemblies 900 being opened upon each pressure increase and with the valve assembly 900 shown in FIGS. 31–39 remaining closed until sprinkling section selection pin 988 has again been indexed to the position of FIG. 39 whereupon the next pressure increase will open main valve 906 in the manner just explained.

When it is desired to pressure cycle all of the line connected valve assemblies, line pressure may be fluctuated between 40 p.s.i. and 60 p.s.i. which will result in the cyclic movement of actuator rod 928 between the positions of FIGS. 34 and 36 which is sufficient to cycle rotary sequencing element 960 but in which the upper 60 p.s.i. pressure level is insufficient to compress all three of the concentric springs to move the actuator rod to the full upper position of FIG. 38 even when abutment 986 is cammed aside. It will be noted that on the lower 40 p.s.i. side of the pressure cycling mode, the actuator rod does not move below the position of FIG. 34 so that pawl 978 is never retracted from holding engagement with ratchet teeth 976 by ratchet abutment 974.

When line pressure is reduced to such an extent, such as below 40 p.s.i. for example, that the pressure application to diaphragm 926 cannot resist the bias of reset spring 946; actuator rod 928 is driven to its full downward position of FIG. 31 withdrawing lower cross rod 952 from camming engagement with ratchet arm cam face 966 and the ratchet arm is driven fully to the right, as viewed in FIGS. 31 and 33, by ratchet return spring 970. The full rightward movement of ratchet arm 958 results in the disengagement of holding pawl 978 from the rotary sequencing element as the same is flexed outwardly therefrom by ratchet abutment 974 (see FIG. 33).

From a design and maintenance standpoint, the grouping of all three control springs in a single housing, which may be a separable sub-housing received within a suitable valve assembly housing bore or formed integrally therewith, is particularly attractive as regards calibration, maintenance and repair. Even more important is the increased flexibility made possible by an irrigation system employing valve assemblies embodying discrete pressure increments between the various functions of reset, pressure cycling and pilot valve opening. In the absence of such discrete pressure increments, such as a reliance upon the progressive compression of a single spring, the sequencing actuator assembly would be continuously responsive to line pressure differences at different locations as exemplified by substantial elevational differences in terrain. The preloads on the three concentric springs separating their functions in terms of pressure differences is preset to require a greater pressure to move from one function to the next than any of the pressure differences due to terrain elevational differences.

It will be noted that a wide range of applicability as between the smallest residential and the largest commercial installation is afforded by the same valve assembly 900. Thus a large commercial system may employ 20 or more sprinkler sections while a small residential system may require only two or three, for example. The reset feature just described makes it possible to utilize the same valve assembly with equal convenience for either application since a sequencing cam may be employed having sufficient indexable positions to be used commercially and yet the same may be reset after only a few pressure actuated and sequenced cycles if a limited number of indexable positions are required. Valve assembly 900 is illustrated with 24 indexable positions, but if only four were required for a small system, the four line connected valves 900 would simply be reset to their initial starting positions after the required four sprinkling sections had been operated.

As in the case of the previously described pressure actuated and sequenced valve assemblies, the line connected valve assemblies 900 may be connected in a main line 732 and controlled in the manner described in connection with FIG. 30 although their control is more advantageously effected and their range of functional capabilities expanded by the electrical control system herein disclosed.

PILOT VALVE CONFIGURATIONS

As would be suspected from the foregoing discussion of the various valve assemblies many of the concepts illustrated and described in connection with one valve assembly are equally applicable, with obvious modifications, to others of the valve assemblies dependent upon particular system requirements. Exemplary is the particular choice of a single acting or double acting pilot valve since it is contemplated that either type pilot valve may be used with any of the herein described valve assemblies.

In addition to the one obvious advantage inhering in the double acting pilot valve of precluding bleed flow, as described in connection with the FIG. 11 embodiment, the use of a double acting pilot valve of the type shown in FIG. 19 insures that the inlet pressure transmitted to the sequencing actuator will be unaffected by the reduced pressure levels associated with the upper side of the main valve actuator when the dump line is open. This for the reason that the double acting pilot valve, in the dump open position, blocks communication between the sequencing actuator and the upper surface of the main valve actuator. The offsetting disadvantage in the double acting pilot valve is its somewhat greater complexity.

As an illustration of one obvious manner in which a valve assembly employing a single acting pilot valve may be modified to accept a double acting pilot valve; reference is had to valve assembly 900 shown in FIG. 31 and the double acting pilot valve assembly shown in its entirety in FIG. 21. If the assembly shown in FIG. 21 be substituted for the pilot valve actuator assembly 924 of FIG. 31 and a separate inlet pressure line above the level of passage 916 be provided to communicate inlet line pressure to the undersurface of piston 722 while pilot valve 720 is relied upon to control dump port 920; valve assembly 900 will have been modified to include a double acting pilot valve which is an important feature where greater sensitivity is required.

LINE PRESSURE VARIATION CONTROL SYSTEM FOR PRESSURE ACTUATED AND SEQUENCED VALVES OPERABLE AS A FUNCTION OF SENSED PRESSURE CONDITION

It is the purpose of this aspect of the invention to sense line pressure conditions and control the same as a function of the sensed condition so that once a line pressure rising sequence is initiated it will be continued until all valves in the system have been subjected to a sufficient pressure increase over an adequate period of time to sequence their indexing members before the pressure level is permitted to decrease. Similarly, once the pressure decrease portion of the cycle is commenced it is continued until that phase of the sequencing cycle is completed. This particular control system is only concerned with the control of those pressure fluctuations which would normally be sufficient to sequentially operate the sprinkler sections and includes an automatic tracking capability to indicate the relative position of each valve assembly in their operational cycle.

Figure 40:
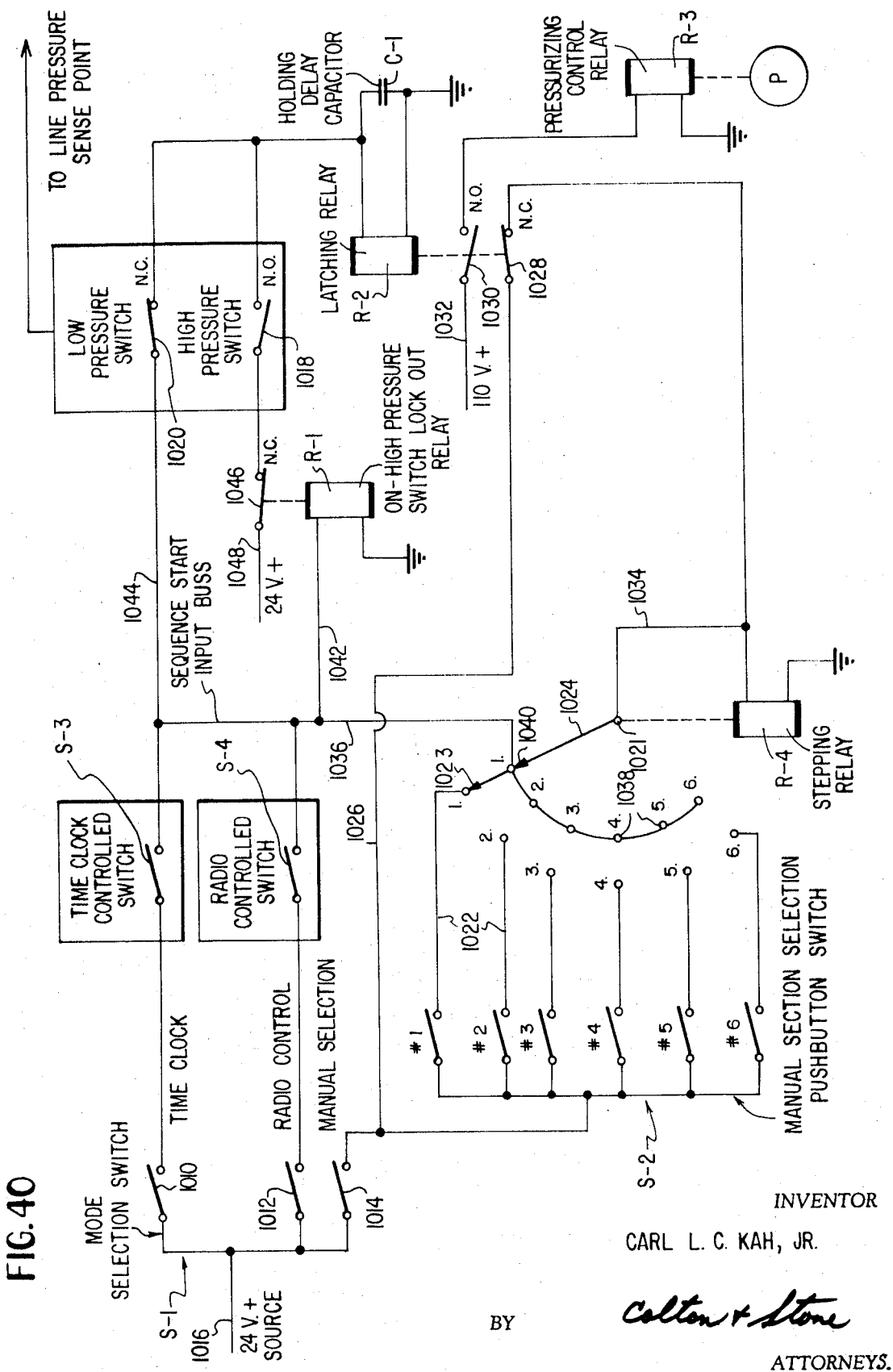
FIG. 40 is a circuit diagram of a pressure responsive control system for pressure actuated and sequenced valve assemblies.

The system is illustrated in FIG. 40, as controlling a pressurizing control relay R-3 which may be either the pump motor start relay for the pump 10 of FIG. 1 or a relay for valve 16. For simplicity of description, relay R-3 will be described as controlling a pump motor start relay for starting and stopping a conventional pump connected in a typical irrigation system, such as that shown in FIG. 1 employing a plurality of conventional pressure actuated and sequenced valve assemblies. All of these valve assemblies are sequenced by line pressure changes induced by the pump, and their indexing cams are so related that various ones or groups of these valve assemblies, comprising sprinkling section control valve assemblies, are adapted to be turned on while the remainder of the valve assemblies are closed. Conventionally, time clock and/or radio control switches S-3, S-4 have been used to directly control pump motor relay R-3. It is the interpositionment of control circuitry for insuring that a new cycle may not be initiated until the rise or fall of line pressure is sufficient to sequence all of the valve assemblies that constitutes one aspect of the invention. Secondly, a stepping relay R-4 is provided to track the cyclic pressure changes and bring a desired sprinkler section on line for extended operation. A mode selection switch bank S-1 includes manual switches 1010, 1012, 1014 for selectively interconnecting switches S-3, S-4 or manual selection switch array S-2 with a 24 volt source 1016. High and low pressure switches 1018, 1020 are subject to the same line pressure changes as are the valves as by being line connected at any desired point in the system. The stepping relay R-4 is a conventional ratchet type relay in which each subsequent energization of the coil indexes an associated wiper arm about its conductive pivot axis 1021 and it will be understood that the arrangement of the six contact points associated therewith as illustrated in the drawings and extending approximately 180° about pivot axis 1021 is merely for the purpose of clarity in schematic illustration. In actuality, the contacts associated with the wiper arm will be equally spaced throughout 360°.

The control circuit will first be described in connection with the control of a six section sprinkler system wherein it is desired to select the fourth sprinkling section for sprinkling. Manual selection switch array S-2 includes six normally open switches for selectively interconnecting manual switch 1014 with any one of six parallel conductors 1022 terminating in contact points adapted to be brought into circuit with the outer contact point 1023 of a wiper arm 1024 as the same is sequentially actuated by stepping relay R-4. Assuming the pump relay R-3 to be deenergized, wiper arm 1024 in circuit with the 1 conductor 1022 and all manual switches 1010, 1012, 1014, S-2 to be open as in FIG. 40; then if the No. 4 manual selection switch and the manual control switch 1014 be closed; the first three sprinkler sections will be bypassed with the second and third being sequentially actuated and deactuated and, thereafter, the fourth sprinkler section will remain on until the control system is manually overridden by opening switch 1014 or selecting another of the section selection switches S-2. The sequential actuation and deactuation of the second and third sprinkler sections amounts to nothing more than a momentary pressurization of the same since, as will become subsequently apparent, each of the first two line pressure increases is maintained only for that period of time required to sequence each line connected pressure actuated and sequenced valve assembly following which time a pressure decrease is automatically initiated.

Figure 41:
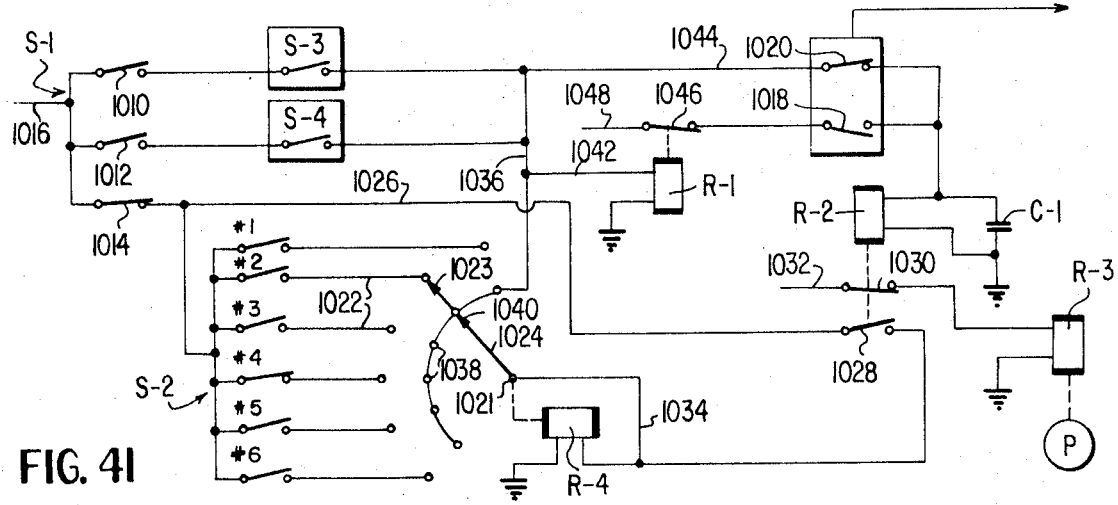
FIGS. 41-44 illustrate successive stages in the circuit of FIG. 40 as the valve assemblies are pressure cycled to bring a preselected sprinkling section on line for extended operation.

Following the closure of switch 1014 and the No. 4 section selection switch, relay R-4 is energized via conductor 1026 and a normally closed switch 1028 which is ganged with a normally open switch 1030 controlling a 110v power supply 1032 to pump relay R-3. Simultaneously, wiper arm 1024 is energized through a parallel circuit 1034 as is an input sequence start buss 1036 having interconnected wiper contacts 1038, one of which maintains a completed circuit with conductor 1034 at the various stepped positions of wiper arm 1024 through an intermediate wiper arm contact 1040. Energization of relay R-4 results in the wiper arm 1024 being advanced to the No. 2 buss line contact 1038. It will be recalled that the No. 2 section selection switch is open and the only current flow through circuit 1034, wiper arm 1024 and its two wiping contacts is via input buss line 1036 and its parallel circuits 1042 (to relay R-1) and 1044 through normally closed low pressure switch 1020 and to latching relay R-2. Relay R-1 is the high pressure switch lock-out relay which, upon being energized, opens a normally closed switch 1046 controlling an auxiliary 24 volt source 1048 in circuit with the normally open high pressure switch 1018. Relay R-2 is a latching relay of conventional design designated as a type 48 Aemco relay by the Aemco Company, Mankato, Minnesota and its ganged contacts 1028, 1030 will change their position only upon each subsequent energization of the relay coil. A parallel connected holding capacitor C-1 is charged simultaneously with the energization of the latching relay coil. Upon this initial energization of latching relay R-2 from the low pressure, pump-off condition, normally closed switch 1028 is opened and switch 1030 is closed supplying line current to pump relay R-3 and starting the pump to increase line pressure whereby the various valve assemblies will be sequenced. The simultaneous opening of switch 1028 opens the circuit between power source 1016 and all of relays R-1, R-2 and R-4. The purpose of the capacitor C-1 is to provide a sufficient energy level for latching relay R-2 to complete its mechanical actuation upon opening of its energizing circuit by its own contacts 1028. This is the circuit condition depicted in FIG. 41 with the pump running and system line pressure rising.

Figure 42:
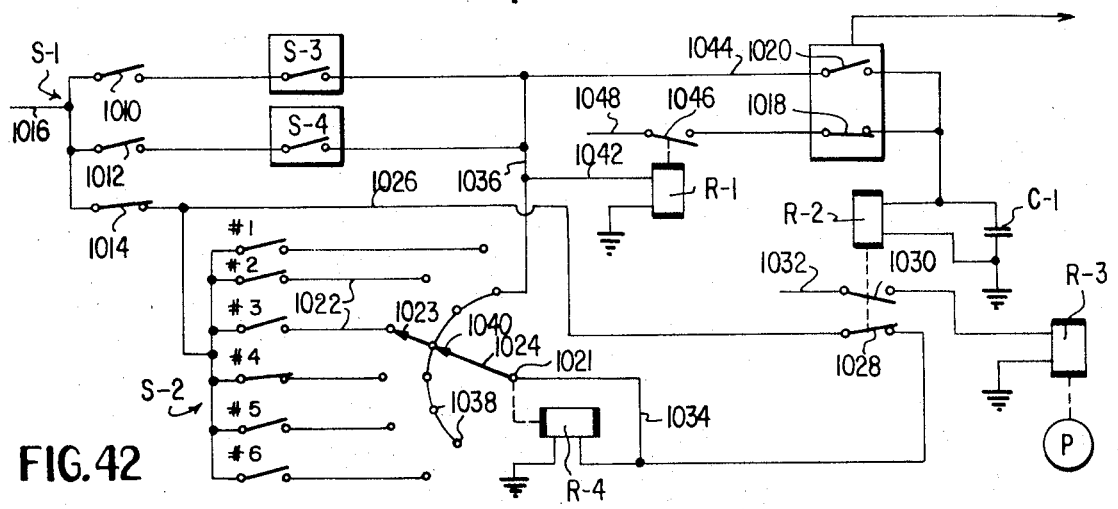

When line system pressure reaches a desired level for which the high pressure switch 1018 has been set to insure that all valves will be able to complete their sequencing cycle, switch 1020 opens and switch 1018 closes completing the circuit from auxiliary source 1048 through the deenergized relay switch 1046 to the latching relay again. This second energization of latching relay R-2 restores its original condition as depicted in FIG. 40 with switch 1030 open, deenergizing the pump relay, and switch 1028 closed again interconnecting source 1016 with relays R-4 and R-1. Energization of relay R-4 moves wiper arm 1024 to the No. 3 position, which is still an open circuit at S-2, while relay R-1 opens switch 1046 to shut off current to latching relay R-2 from source 1048. It will be recalled that low pressure switch 1020 is now open and the latching relay is, accordingly, not in circuit with power source 1016 so that it remains in its normal condition shown in FIG. 40 inasmuch as it has been energized and deenergized twice. This is the circuit condition illustrated in FIG. 42.

With the pump off, system pressure falls until it reaches that level for which pressure switches 1018, 1020 are set to respond at which time the low pressure switch 1020 closes and the high pressure switch opens. This again completes a circuit from source 1016 to the latching relay R-2 via conductor 1026, switch 1028, wiper arm 1024, input buss 1036 and low pressure switch 1020. This third energization of the latching relay closes switch 1030, to start the pump, and opens switch 1028 to terminate power to itself (R-2) as well as relays R-1 and R-4. Deenergization of relay R-1 allows switch 1046 to close again bringing auxiliary source 1048 into circuit with open high pressure switch 1018. When system pressure rises sufficiently to close the high pressure switch 1018, source 1048 again energizes latching relay R-2 for the fourth time which opens pump relay switch 1030, stopping the pump, and closes switch 1028 again energizing relay R-4 (to advance wiper arm 1024 to the No. 4 position) and relay R-1 to open switch 1046. This is the circuit condition shown in FIG. 43. When system pressure again falls, high pressure switch 1018 opens and low pressure switch 1020 closes again energizing latching relay R-2 for the fifth time to close switch 1030 and start the pump. Switch 1028 is simultaneously opened but this time the R-4 stepping relay is not deenergized since it is now in circuit with source 1016 through the closed No. 4 section selection switch, conductor 1022, wiper arm 1024 and branch 1034. Similarly, R-1 remains energized from source 1016 keeping switch 1046 open. As the pressure again rises, high pressure switch 1018 closes and low pressure switch 1020 opens to break the circuit to latching relay R-2 which maintains the switch 1030 closed position and the pump continues to run. The closing of high pressure switch 1018 is ineffective to energize relay R-2 since switch 1046 is open. This is the circuit condition of FIG. 44 which will be maintained with the section four sprinklers in operation until manual switch 1014 is opened or another section selection is made at switch array S-2. In the latter event, relay R-1 would be deenergized to bring source 1048 into circuit with the latching relay through closed high pressure switch 1018 to, again, initiate the same cyclic control.

Figure 45:
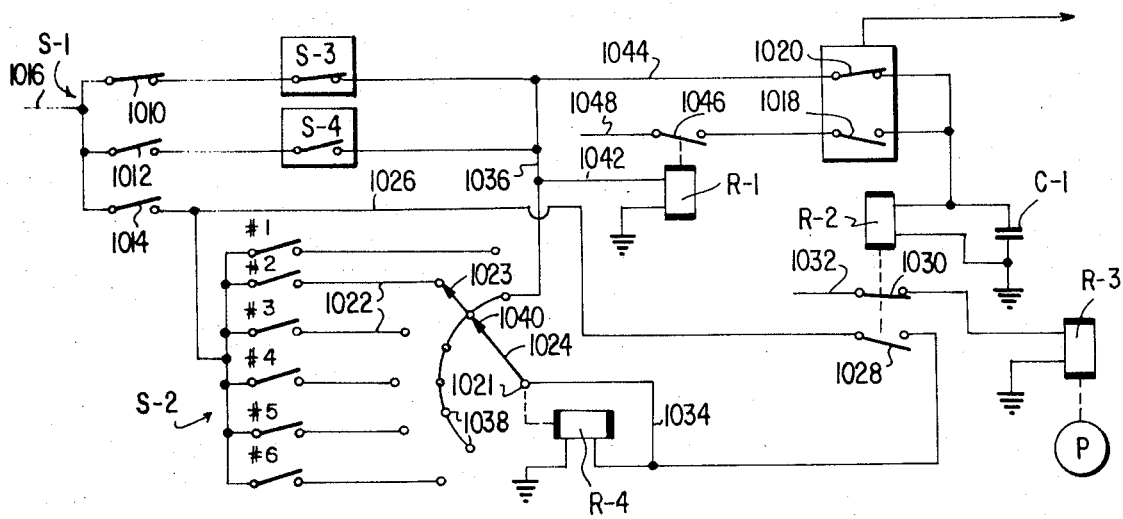
FIG. 45 illustrates the circuit of FIG. 41 as used for the pressure responsive control of the magnitude and duration of line pressure variations in time clock or radio controlled operations.

For time clock or radio control switch operation, and with reference to the initial circuit condition of FIG. 40, the appropriate switch 1010 or 1012 is closed to energize latching relay R-2 from source 1016 via the closed low pressure switch 1020 as the switch S-3, for example, is closed. This interconnects pump relay R-3 with source 1032. Simultaneously, source 1016 is brought into circuit with the input buss 1036 and relay R-4 via No. 1 wiper contact 1038, wiper arm 1024 and branch 1034 to advance the wiper arm one step. Relay R-1 is also energized to open switch 1046. This is the circuit condition of FIG. 45. As system pressure rises, high pressure switch 1018 closes and low pressure switch 1020 opens thus deenergizing relay R-2. Since switch 1046 is open while clock switch S-3 is closed, the latching relay is not again energized by the closing of the high pressure switch and the pump continues to run until the clock switch S-3 opens. At this time, relay R-1 is deenergized and source 1048 is in circuit with relay R-2 through the closed high pressure switch 1018 which opens switch 1030 to stop the pump. This sequence of events is repeated as either the time or radio controlled switches are opened and closed and the particular sprinkler section on line at any one time is readily observable by reference to the position of wiper arm 1024 or appropriately arranged illuminable indicators associated therewith.

In connection with the time clock and radio controlled switch operation, the control circuit insures that once the pump is turned on it cannot be turned off until system pressure has risen to close the high pressure switch. Similarly, on the next cycle the pump cannot be turned on until the low pressure contacts close.

While various exemplary voltage levels have been indicated in the FIG. 40 circuit it will be understood that the same are purely for illustrative purposes and may be widely varied and that each indicated voltage "source" may be derived from a single high voltage input with electrical taps of desired level comprising the various "sources."

ELECTRICAL CONTROL SYSTEM FOR PRESSURE ACTUATED AND SEQUENCED VALVES INCLUDING PRESSURE CYCLING AND RESET

Figure 46B:
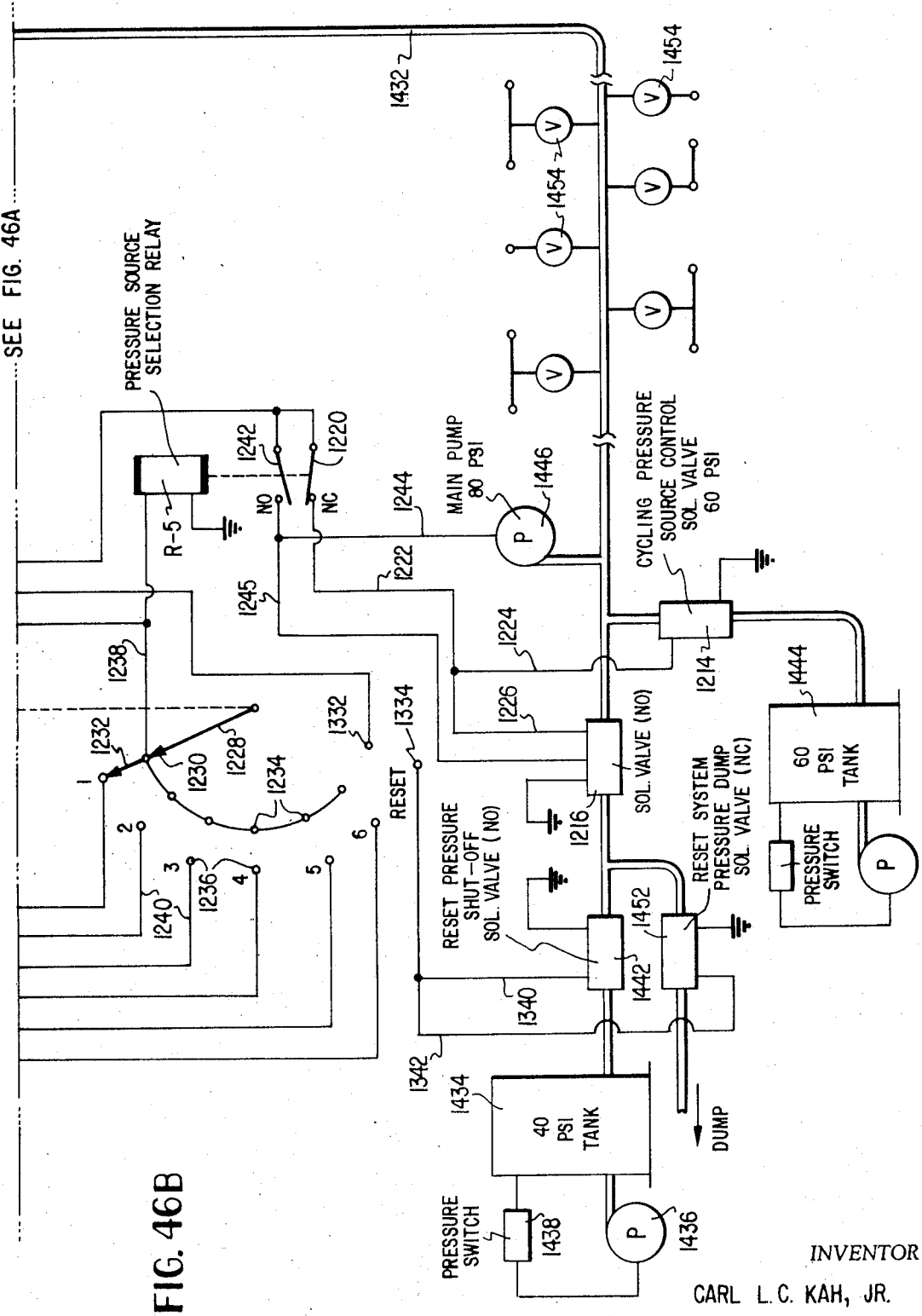

The expanded electrical control system shown in FIG. 46 comprising FIGS. 46A and 46B includes the basic circuitry shown in FIG. 40 for the control of either conventional pressure actuated and sequenced valves of the type shown in U. S. Pat. No. 3,460,560 or for the control of any of the valve assemblies herein described as regards their basic sequential actuation. In order to take advantage of the expanded capabilities of the valve assemblies introduced herein it is desirable that a single control system include not only the basic control features for any pressure actuated and sequenced valve assembly but, also, those necessary for pressure cycling and reset.

The following brief review of previously discussed control systems as they relate to both conventional valves and those valve assemblies herein disclosed will provide a sufficient orientation for the ensuing discussion.

All pressure actuated and sequenced valves are, by definition, cycled by line pressure changes. Such cycling has been conventionally effected by the intermittent control of a line pressure pump or valve such as shown at 10, 16, respectively, in FIG. 1. Such cyclic pressure variations have conventionally been between two fairly well defined levels, e.g., an upper level which will index a sequencing cam and open a main flow valve to provide sprinkling pressure for one of the line connected sprinkler sections and a lower level which allows a main flow valve to close and a sequencing cam to be indexed by return spring bias. All of the pressure actuated and sequenced valves herein disclosed may be operated by such a basic system if the pressure cycling and reset features are not desired.

One of the simplest hydraulic arrangements which will provide the basic functions of pressure actuation and sequence control just described, as well as the pressure cycling and reset function is that shown in FIG. 30 which includes three distinct hydraulic line pressure controls which may take the form of two distinct pumps, for example, and a source of residual line pressure which may involve a third pump, or an accumulator or the like. In this arrangement, so long as residual line pressure is maintained pressure cycling may be achieved by the intermittent operation of an intermediate range pump while main valve opening is controlled by a higher range pump and reset may be effected by venting residual line pressure.

A simple electrical control arrangement which may be used, for example, to control the high pressure pump of FIG. 30 which will insure that either the high or low pressure side of a cyclic pressure variation will not be terminated prior to the time all line connected valve assemblies have sequenced is that shown in FIG. 40. The pressure cycling and reset may, of course, be controlled as described in connection with FIG. 30.

The expanded electrical control system shown in FIG. 46 is designed, basically, for the overall control of a hydraulic system of the type shown in FIG. 30 and exhibits a control relation to all three distinct pressure sources similar to the relation of the control system shown in FIG. 40 to that of the hydraulic system of FIG. 1.

In the control system of FIG. 46 the basic control system of FIG. 40 has been retained, with slight modifications, and the two additional control functions for pressure cycle and reset, added. Those circuit components in FIG. 46 which are identical to the FIG. 40 circuit are designated as 1100 series components and the last two digits correspond with the 1000 series components of FIG. 40. The pressure cycling control circuit components are indicated by 1200 series reference characters while the 1300 series has been used for the reset circuitry. Reference characters of the 1400 series have been used to designate hydraulic components and the last two digits of these 1400 series designations correspond, functionally, with those of FIG. 30.

The pressure cycle portion of the control circuit provides for pressure cycling the irrigation system at reduced pressure levels below that required to open the main flow control valves until the sequence controller associated with the desired section has been indexed to that position which will permit the main valve to open upon sufficient pressure application at which time a higher pressure source is automatically brought on line. This involves the addition and control of a pressure source selection relay R-5 to permit pressure cycling by a lower pressure source (60 p.s.i.) which is insufficient to open the main flow valve at any sprinkler section. This contrasts with the FIG. 40 system which utilized a high pressure source (80 p.s.i.) to effect indexing to the preselected sprinkler section with consequent momentary sprinkling or leakage at certain of the non-selected sections.

System reset is accomplished by a reduction in line pressure below the pressure cycling level. This involves a reset lock-out relay R-6 to lock-out other control functions during reset.

It will be noted that the mode selection switches S-1 and the section selection switches S-2 of FIG. 40 have been combined and ganged in FIG. 46 in a switch array S-5 whose time clock and radio control master switches 1110, 1112 are separated from the section selection switch arrays No. 1–No. 6 by a timer 1150 which may be preset to control the period during which a selected sprinkler section will operate following the opening of its associated valve assembly which, in turn, is determined by the depression of a particular selection switch as explained in connection with FIG. 40. Thus, in the case of the FIG. 40 example, the fourth sprinkler section would continue in operation until the contacts of timer 1150 opened at the expiration of the preset sprinkling time. The switch array S-5 is mechanically ganged as indicated at 1152 in such manner that only one of the S-5 switches will remain closed at one time by any conventional arrangement such as that exemplified by the commercially available "Switch Craft Stack Switches," series No. 211000, manufactured by Switch Craft Incorporated.

Each section selection switch array No. 1–No. 6 includes three separate switches. The uppermost switches 1154 in each selection switch array correspond in function to those of FIG. 40 while the second switches 1210 control pressure cycling to the selected section and the third switches 1156 replace the function of switch 1014 in FIG. 40.

The operation of the control circuit of FIG. 46 in the selection of a particular one of the illustrated six section sprinklers by the intermittent control of a cycling pressure source 1444 is substantially the same as that described in connection with the operation of a high pressure pump in FIG. 40 except that relay R-3 actuates a normally open switch 1210, rather than a pump motor relay. Assuming, again, the selection of the fourth sprinkler section, the closure of switch 1210 by the energization of relay R-3 (as described in FIG. 40) completes parallel circuits from power source 1212 to a normally closed solenoid valve 1214 and a normally open solenoid valve 1216 via conductor 1218, normally closed switch 1220, conductor 1222 and parallel branches 1224, 1226. The energization of solenoid valves 1214, 1216 result in the isolation of residual pressure tank 1434 from main line 1432 and the communication of the pressure cycling source 1444 therewith to initiate a line pressure increase to each line connection valve assembly 1454 the upper range of which is sufficient to index the valve assemblies but insufficient to open the main flow control valve. HIgh pressure switch 1118, upon sensing the attainment of the necessary pressure level to insure that all valve assemblies have been sequenced, closes and low pressure switch 1120 opens resulting in the same sequence of events among the 1100 series components as was previously described in connection with FIG. 40 except that the subsequent opening of switch 1130 and deenergization of relay R-3 results in the opening of switch 1210. Solenoid valves 1214, 1216 are thus deenergized blocking pressure cycling source 1444 and bringing residual pressure back on line to initiate the line pressure decrease which will allow each valve assembly to sequence under the influence of the return springs associated therewith. This condition obtains until low pressure switch 1120 again closes to initiate a repetition of the sequence of events just described which is continued until stepping relay wiper arm 1124 reaches the selected section switch array herein illustrated, in FIG. 47, as the fourth sprinkler section at which time the main high pressure pump 1446 is brought on line. The distinction afforded by the operation just described over that previously discussed in connection with FIG. 40 is that a cycling pressure source (60 p.s.i.) may be used to sequence the valve assemblies to the selected section prior to the time the sprinkling pressure source (80 p.s.i.) is brought on line whereas the earlier described arrangement utilized the high pressure pump for sequencing to the selected section.

Figure 43:
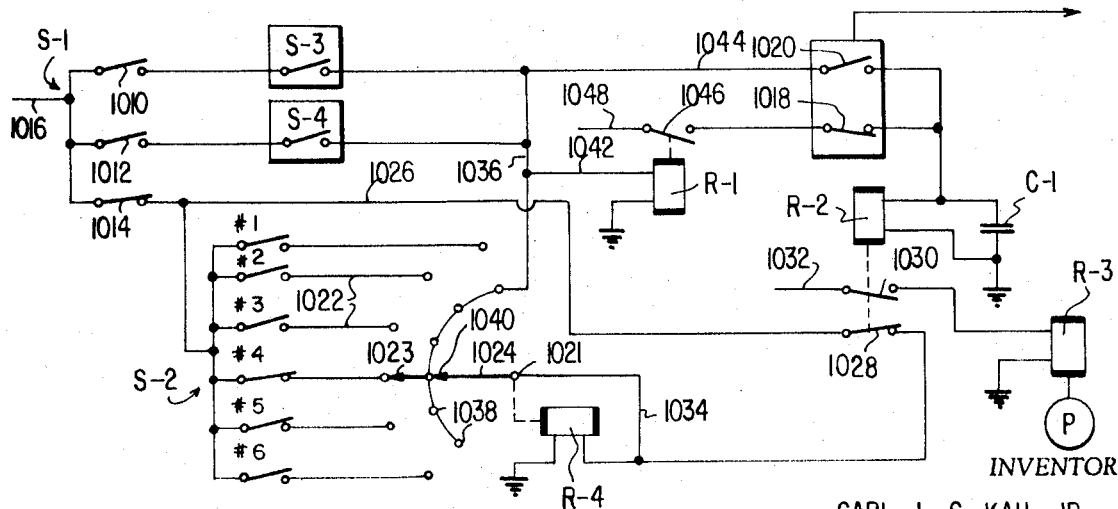
Figure 44:
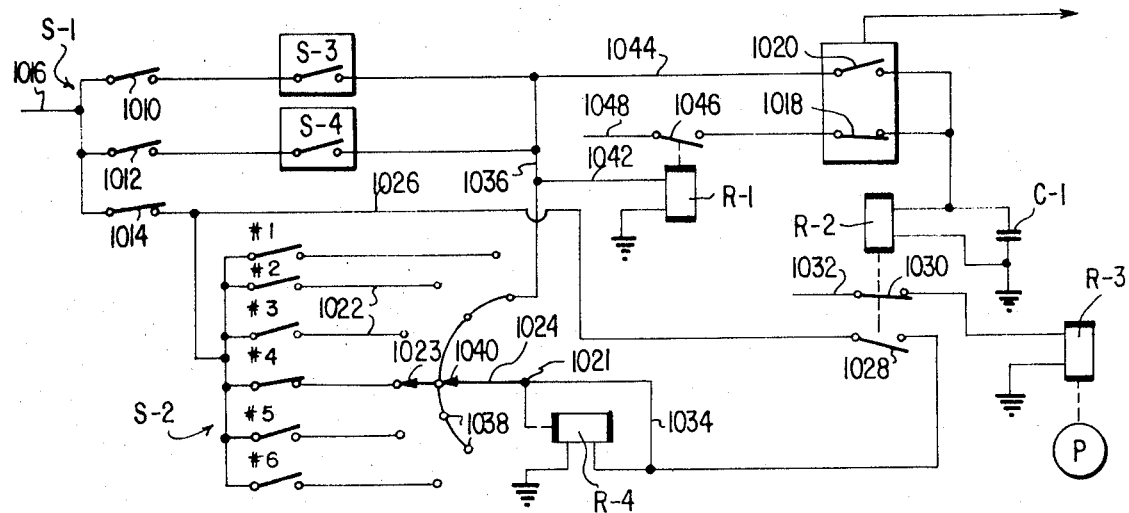

In the circuit condition of FIG. 47, the 1100 series components are in the equivalent position of FIG. 43 (the solenoid valve 1214 just having closed to initiate the pressure decrease portion of the cycle) and wiper arm 1124 has been brought into circuit with the closed No. 4 selection switch array. A second wiper arm 1228 includes intermediate and outer contact points 1230, 1232 arranged for wiping engagement with contacts 1234, 1236 on pressure source selection relay buss 1238 and parallel conductors 1240, respectively. Wiper arm 1228 is indexed by relay R-4 in the same manner as wiper arm 1124 and may be ganged therewith on the same shaft, if desired, so that wiper arm 1228, also, tracks the operational cycle of the valve assemblies.

As system pressure falls, high pressure switch 1118 opens from the closed position of FIG. 47 and low pressure switch 1120 closes to energize latching relay R-2 to close switch 1130 which, in turn, energizes relay R-3 through conductor 1131 to close switch 1210. Switch 1128 is simultaneously opened but the stepping relay R-4 is not deenergized since it is now in circuit with source 1116 through switch 1154 of the closed No. 4 section selection switch array, conductor 1122, wiper arm 1124 and branch 1134. Similarly, R-1 remains energized from source 1116 keeping switch 1146 open. The closure of switch 1210 does not, again, bring cycling pressure source 1444 on line because switch 1220 has been opened by the energization of relay R-5 through wiper arm 1228, No. 4 contacts 1234, 1236, branch line 1240, closed switch 1210 and source 1116. Simultaneously, relay R-5 closed switch 1242 to interconnect power source 1212 with the start relay of main pump 1446 via switch 1210, conductor 1218, switch 1242 and conductor 1244 while residual pressure source 1434 was taken off line by the energization of normally open solenoid 1216 through branch 1245. As pressure rises high pressure switch 1118 closes and low pressure switch 1120 opens to break the circuit to latching relay R-2 which maintains the switch 1130 closed position so that relay R-3 remains energized and pump 1446 continues to run thus causing sprinkling at the No. 4 section sprinklers. The closure of high pressure switch 1118 is ineffective to energize relay R-2 since switch 1146 is open. Pump 1446 will thus continue to run until timer 1150 opens its contacts or until another manual section selection is made. In the latter event, relay R-1 would be deenergized to bring source 1148 into circuit with the latching relay through closed high pressure switch 1118 to again, initiate the same cyclic control to the next selected section.

One convenient method of insuring that the high and low pressure switches 1118, 1120 are not actuated until a particular line pressure variation has sequenced all of the valves is to select the length and internal diameters of the branch line sensing pipes 1456 as a function of the switch pressure actuation levels and sequencing pressure requirements for all of the valves. It is thus unnecessary to take the pressure sensing taps downstream of the valve assemblies as illustrated.

In those cases where each line connected sprinkler section is to be sequentially operated, in turn, the section selection, pressure cycling and reset systems are not required and any of the valve assemblies herein disclosed as well as conventional pressure actuated and sequenced valves may be time clock or radio operated by a portion of the FIG. 46 circuitry to achieve the same simplified operation as was described in connection with FIG. 1. Inasmuch as the sprinkler sections are to be sequentially operated it is only the high pressure source 1446 that will be used to produce cyclic line pressure increases.

Figure 48:
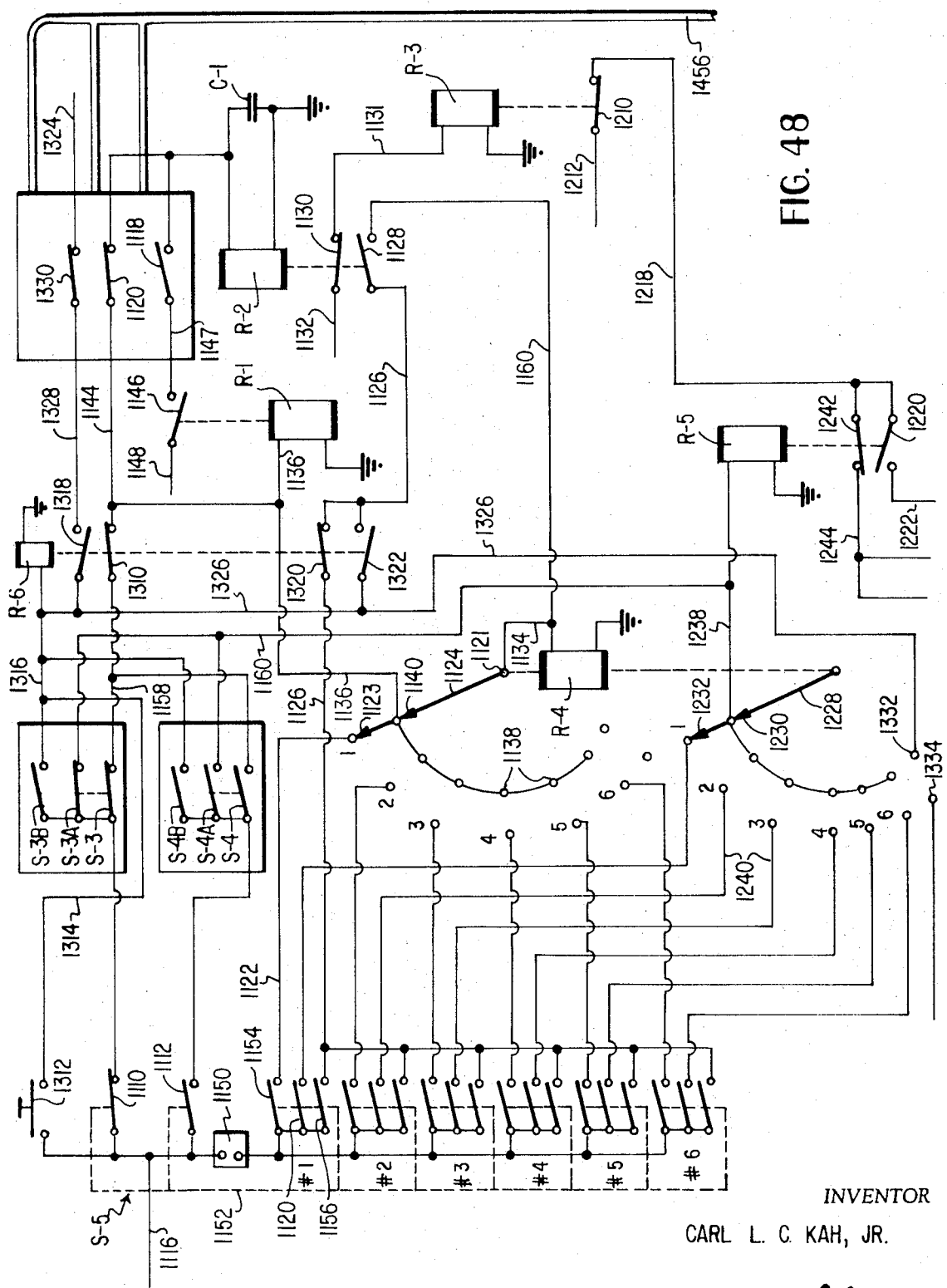

For time clock operation, and with reference to the initial circuit condition of FIG. 46; switch 1110 is closed to energize latching relay R-2 from source 116 via switch 1110, switch S-3 of the ganged time clock switches S-3, S-3A, line 1158, normally closed switch 1310, sequence start buss 1136 and branch 1144. It will be noted that the ganged radio controlled switches S-4, S-4A make the same circuits as do time clock switches S-3, S-3A so that a description of the latter will explain the operation of both systems. Energization of relay R-2 brings source 1132 in circuit with relay R-3 to close switch 1210 and actuate main pump 1446 through switch 1242 which is now closed since relay R-5 is energized by source 1116 via clock switch S-3A and conductor 1160. This is the circuit condition of FIG. 48. As system pressure rises, high pressure switch 1118 closes and low pressure switch 1120 opens thus deenergizing relay R-2. Since switch 1146 is open while clock switch S-3 is closed (relay R-1 energized by source 1116 via switch 1310 and sequence start buss 1136), the latching relay is not again energized by the closing of the high pressure switch and the pump continues to run until the ganged clock switches S-3, S-3A open. At this time, relay R-1 is deenergized and source 1148 is in circuit with relay R-2 through the closed high pressure switch 1118 which opens switch 1030 to deenergize relay R-3 thereby opening switch 1210 to stop pump 1446. This sequence of events is repeated as either the time or radio controlled switches are opened and closed and the particular sprinkler section in operation at any one time is readily observable by reference to the position of either wiper arm 1124 or 1228 since the stepping relay R-5 is energized by each closure of the ganged clock or radio switches via buss 1136, wiper arm 1124 and branch 1134.

In connection with time clock and radio controlled switch operation, the control circuit insures that once the pump is turned on it cannot be turned off until system pressure has risen to close the high pressure switch. Similarly, on the next cycle the pump cannot be turned on until the low pressure contacts close.

The reset portion of the circuit serves to reset all of the line connected valve assemblies to a predetermined position in their operational cycles as determined by the positionment of the reset pins on the rotary sequencing members as previously discussed. In those irrigation systems employing the control circuitry of FIG. 46 and line connected valve assemblies which include a reset feature, the same are desirably, though not necessarily, pressure stepped to a basic start position before residual pressure is reduced to recycle the valve assemblies. The purpose is to insure coincidence between the tracking wiper arms 1124, 1228 and the various valve assembly positions in their operational cycles. For example if the wiper arms were in the No. 3 position, indicating operation of the third sprinkler section, at the time the system was reset by an immediate reduction of residual pressure; all of the valves would be reset to a position wherein the No. 1 section, for example, would be the next on line while the wiper arms would give a false indication that the next section on line would be No. 4. Accordingly, it is desirable to pressure step all of the valve assemblies and the stepping relay to a particular reset position as indicated at the wiper arm tracking station before residual pressure is reduced to reset the valve assemblies. This pressure stepping of all valve assemblies to a basic position prior to reset is quite analogous to the pressure cycling operation previously described and will, hereinafter, be referred to as pressure stepping to indicate that automatic cycling of the valve assembly incident to a reset operation. The principal distinction between pressure cycling and pressure stepping insofar as the particular circuitry of FIG. 46 is concerned is that in the former, the pressure cycling operation is arrested when a preselected section comes on line at which time sprinkling occurs at the preselected section whereas, in the latter, the pressure stepping is not arrested for a sprinkling operation but only when it reaches a particular reset position at which time all valve assemblies are then automatically reset.

When the control circuit of FIG. 46 is used with valve assemblies which do not have a reset capability, the reset portion of the circuit serves to automatically pressure cycle all of the valve assemblies to a basic start position without initiating a sprinkling operation at any of the sections. The advantages in this connection are that a typical time clock or radio controlled operation may be commenced from a basic start position. It will be appreciated that a typical irrigation system may be programmed for certain of the sprinkler sections to be on longer than others for any of a variety of reasons which may include differences in irrigation requirements among the various sprinkler sections and/or the use of different type sprinklers. Accordingly, it is desirable to initiate each time clock or radio controlled operation from a basic start position to preclude any reprogramming requirement to achieve the desired sprinkling distribution.

Figure 49:
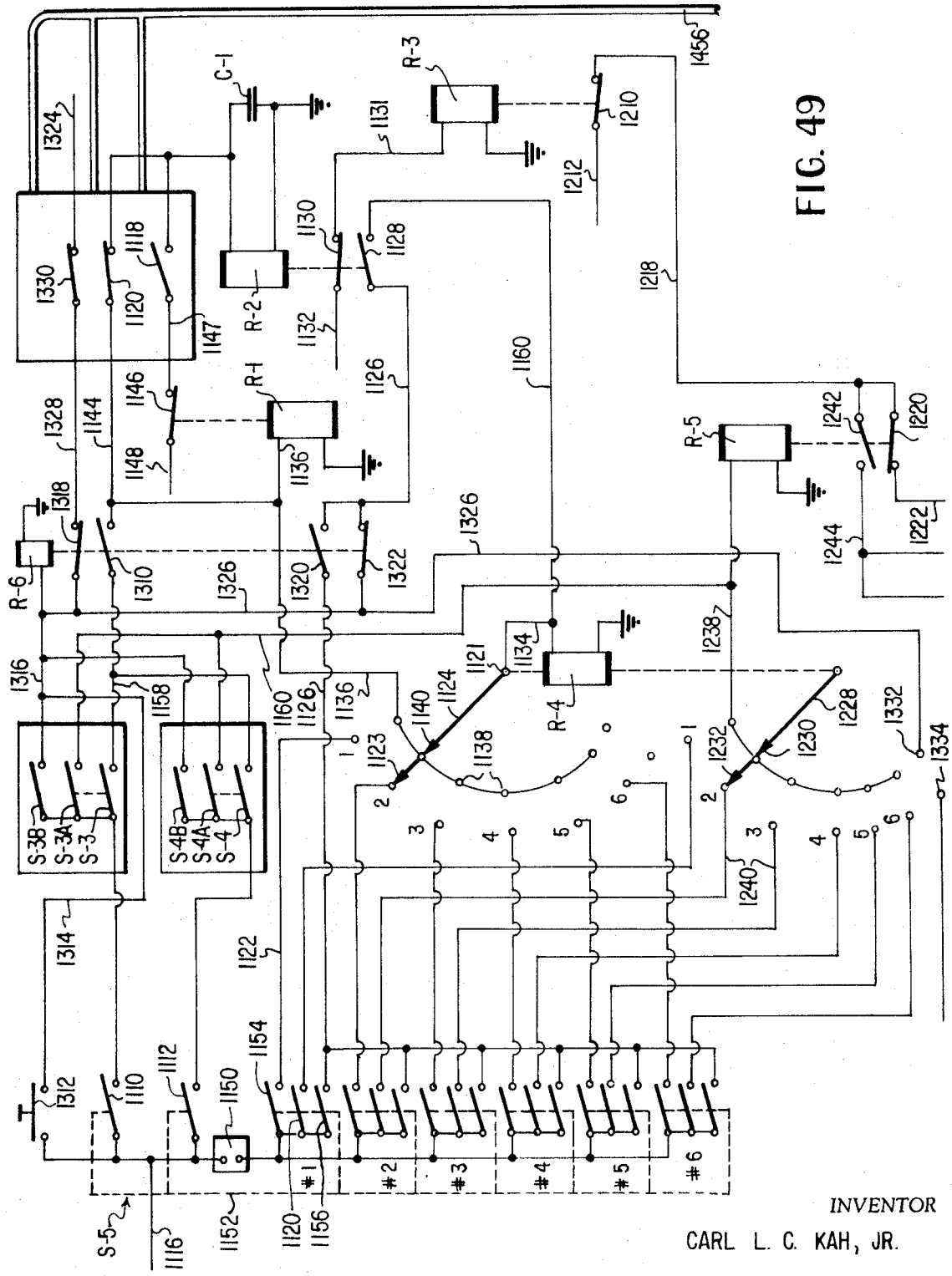

When it is desired to reset an irrigation system employing those valve assemblies including a reset capability, and assuming the circuit condition of FIG. 46, a spring loaded normally open manual reset switch 1312 is momentarily depressed. This completes a circuit from source 1116 to reset lock-up relay R-6 via conductors 1314 and 1316. The energization of relay R-6 reverses the FIG. 46 positions of its four ganged switches 1318, 1310, 1320, 1322. The closure of switch 1318 brings source 1324 into circuit with reset buss 1326 via conductor 1328 and the normally closed reset sensing switch 1330 to complete the electrical lock-up to relay R-6 whereby the same remains energized by source 1324. The simultaneous opening of switches 1310 and 1320 preclude any signal inputs from buss 1158 and buss 1126, respectively, to thus lock out all other control signals while the reset operation is in progress. The closure of switch 1322 initiates a pressure stepping of the valve assemblies as stepping relay R-4 is now energized from source 1324 via the closed switches 1330 and 1318, reset buss 1326, switch 1322, conductor 1126, switch 1128 and conductor 1160 to advance one step as relay R-1 is simultaneously energized through branch 1134, wiper arm 1124 and buss 1136 to open switch 1146. Relay R-2 is also energized through buss 1136, conductor 1144 and the closed low pressure switch 1120 which energizes relay R-3, to close switch 1210, by bringing source 1132 in circuit therewith via switch 1130 while, simultaneously, opening switch 1128 to terminate power to itself as well as to relays R-1 and R-4. Pressure cycling source 1444, having been energized through closed switch 1220, is now on line. Deenergization of relay R-1 allows switch 1146 to close again bringing auxiliary source 1148 into circuit with open high pressure switch 1118. This is the circuit condition of FIG. 49 with line pressure increasing. When system pressure has increased sufficiently to close high pressure switch 1118, source 1148 energizes latching relay R-2 via conductor 1147 bridging closed switches 1146, 1118 to open contacts 1130 thus deenergizing relay R-3 to terminate input line pressure from source 1444 and closes switch 1128. The simultaneous closure of R-2 relay switch 1128 again energizes relay R-4 to advance wiper arms 1124, 1228 another step and relay R-1 is energized to open switch 1146. When system pressure again falls, high pressure switch 1118 opens and low pressure switch 1120 closes and the cyclic operation just described is repeated until the various line connected valve assemblies have been pressure stepped to a base starting position as defined by the tracking wiper arms reaching the reset positions defined by the wiping engagement of wiper arm contacts 1230, 1232 with reset contacts 1332, 1334. A pair of dummy contacts 1336, 1338 are similarly positioned relative to wiper arm 1124 so that visual reference need be made only to the tracking station defined by the latter wiper arm. Since contact 1338 is not connected to buss 1136, relay R-2 will not be switched to energize relay R-3 when the low pressure switch 1120 subsequently closes so that source 1444 is not again brought on line until the reset operation is completed.

The foregoing explanation has assumed an initial start position of FIG. 46 with relay R-3 deenergized at the time reset operation was initiated. If relay R-3 is energized (R-2 relay switch 1130 closed) when reset is initiated; the opening of switches 1310, 1320 by the energization of relay R-6 isolates buss 1136 from a voltage source which was energizing relay R-1 (switch 1146 open) which, in turn, had prevented the subsequent energization of relay R-2 by source 1148 so that it had remained latched up with switch 1130 closed and system pressure rising. In this connection it will be recalled that latching relay R-2 will change its position only upon a subsequent energization. Following the isolation of buss 1136 from a voltage source, relay R-1 allows switch 1146 to close thus energizing relay R-2 through the closed high pressure switch 1118 (system pressure up) and opening switch 1130 to deenergize relay R-3. The circuit through R-6 relay switch 1332 and the now closed R-2 relay switch 1128 is the same as that previously described to initiate the pressure stepping portion of the reset operation.

Continuing now with a discussion of the reset operation from that point in time when wiper arm 1228 bridges reset contacts 1332, 1334; source 1324 is now in circuit with normally open reset pressure solenoid valve 1442 and normally closed system pressure dump solenoid valve 1452 via switches 1330 and 1318, reset buss 1326, contact 1332, wiper arm 1228, contact 1334 and parallel branches 1340, 1342 to close the former and open the latter. The closing of valve 1442 isolates main line 1432 from residual pressure source 1434 and the opening of valve 1452 dumps the same resulting in a pressure decrease throughout the system to a value less than the residual pressure level whereby the reset mechanisms within the valve assemblies reset the same in the manner previously explained.

After system pressure has fallen to a sufficiently low level to insure that all valve assemblies have been reset as may be determined by the preselected constants chosen for the reset sensing tap 1456 and the reset sensing switch 1330; reset pressure switch 1330 opens breaking the circuit from source 1324 to relay R-6 and the R-6 relay ganged switches reassume their FIG. 46 positions. The opening of switch 1318 breaks the circuit through reset buss 1326 to solenoid valves 1442, 1452 thus closing the dump line and bringing residual pressure source 1434 back on line to repressurize the system.

Thus, at the end of the system reset cycle just described, system pressure has been pulsed to pressure step all valves to a known reference position in their operational cycle followed by a depressurization of the system for reset; the magnitude and length of which low reset pressure condition was maintained until all valves would normally have been reset as determined by the opening of reset switch 1330 and the reestablishment of residual line pressure with the stepping relay and all valve assembly indexers at a known reference position ready for sequencing on command from the time clock, radio controller or manual section selection switches.

The addition of timer actuated or radio controlled momentary depression switches S-3B, S-4B provide a convenient selective reset capability in combination with either of the time clock or radio controlled portions of the circuit. Thus, if time clock controlled operation is to be initiated and it is desired to first reset, or pressure step, all valve assemblies to a known starting position, switch S-3B is momentarily signalled closed at the appropriate timed controlled hour. The reset operation is then initiated (locking out the normal operation initiated by the closing of switches S-3, S-3A) through the energization of relay R-6 by source 1116 via the closed manual time clock control switch 1110. Upon completion of the reset operation, relay R-6 is deenergized in the manner previously explained and the ganged R-6 relay switches resume the FIG. 46 position whereupon the closed time clock switches S-3, S-3A control the sequential sprinkling at each section in the manner previously explained.

LINE PRESSURE VARIATION CONTROL SYSTEM FOR PRESSURE ACTUATED AND SEQUENCED VALVE ASSEMBLIES OPERABLE AS A FUNCTION OF TIME

Figure 50:
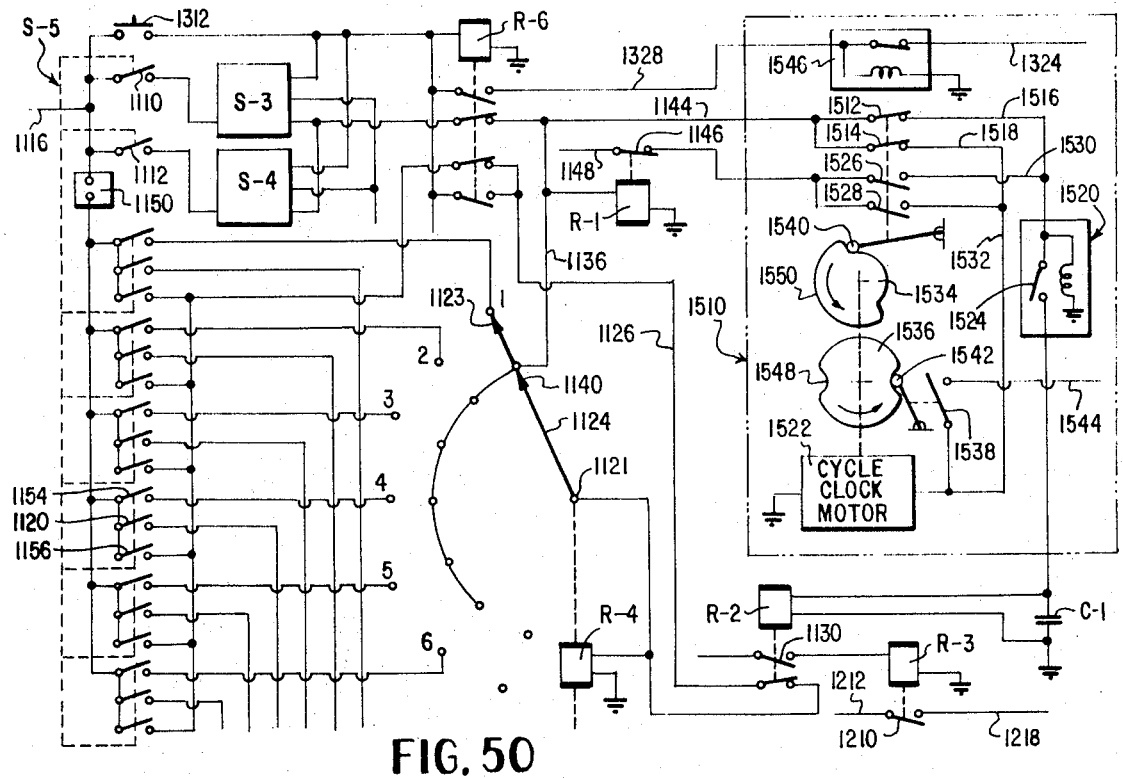
FIG. 50 is a partial schematic identical to the circuit arrangement of FIG. 46A except for the substitution of time controlled switches for the pressure responsive switches and adapted to cooperate with the remaining elements depicted in FIG. 46B in the same manner as does the circuit arrangement of FIG. 46A.

The control system shown in FIG. 50 differs from that of FIG. 46A in that a cycle timer 1510 has been substituted for the various pressure sensing switches 1330, 1120, 1118 and their associated line pressure taps 1456. The electrical and hydraulic circuit components necessary to complete the time controlled system of FIG. 50 are identical with those of FIG. 46B and reference may be had thereto in conjunction with FIG. 50 for the illustration of the complete system. The irrigation system depicted in FIGS. 50 and 46B does not sense line pressure conditions to insure that the magnitude and duration of a line pressure variation is sufficient to sequence all of the valve assemblies but achieves the same result in a different manner. For a particular irrigation system installation it is a simple matter to make an empirical determination of those time intervals during which all of the line connected valve assemblies must be subjected to a known pressure increase or decrease to insure that all of the valve assemblies will be sequenced. The cycle timer will then be programmed in accordance with these empirically determined parameters, which will normally be different for the increase and decrease portions of the pressure variations. One convenient method of timer programming involves the use of two rotary cams whose contours reflect the time requirements for the pressure variation intervals. Although the cycle timer control may be substituted for the high and low pressure sensing switches in the control system of FIG. 40, its incorporation into the more complex arrangement shown in FIG. 46 will be explained whereupon the manner in which the same may be substituted into the FIG. 40 arrangement will become obvious. It will be noted that the cycle timer also includes a time function reset control which may, of course, be eliminated if the particular system installation does not employ valve assemblies having a reset capability.

Cycle timer 1510 includes low pressure switches 1512, 1514 between buss 1144 and parallel branches 1516, 1518 respectively in circuit with a delay timer 1520 and a cycle clock motor 1522. Timer 1520 is of the heated filiament Amperite type and preferably involves a two second time delay before normally open switch 1524 closes to bring branch 1516 into circuit with latching relay R-2. High pressure switches 1526, 1528 control circuits between power source 1148 through normally closed switch 1146 and parallel branches 1530, 1532 respectively in circuit with delay timer 1520 and cycle clock motor 1522. Timing cams 1534, 1536 are driven by a common shaft from motor 1522 to control the opening and closing movements of switches 1512, 1514, 1526, 1528 and switch 1538 through ganged cam followers 1540, 1542, respectively engaging cams 1534, 1536. Switch 1538 is the cycle timer lock-in and, when closed, provides power from auxiliary source 1544 to the cycle clock motor. A time delay switch 1546 in circuit between reset branch 1328 and source 1324 is herein illustrated as being of the heated filiament type but a lock in cycle timer or a solid state time delay could be provided, if desired. In any case, the switch component is chosen to provide a time delay of approximately 20-30 seconds, depending upon the particular installation, which will normally be sufficient to dump system pressure and allow time for reset before pressure is restored.

In the operation of the control system shown in FIG. 50, employing cycle timer 1510, a voltage input at buss 1136, as in any of the manners previously explained, completes parallel circuits to cycle clock motor 1522 and the filiament of timer 1520 via conductor 1144, the closed low pressure switches 1512, 1514 and branches 1516, 1518. The cycle clock motor starts to run immediately upon its energization through switch 1514 to rotate cams 1534, 1536 counter-clockwise. Clock motor lock-in switch 1538 closes immediately thereafter as follower 1542 is moved outwardly from one of the cam indentations 1548 to bring auxiliary source 1544 into circuit with the clock motor. The rotational speed of motor 1522 and the profile of cam 1536 at indentations 1548 are so chosen in relation to the approximate two second time delay characteristic of delay timer 1520 that source 1544 is in circuit with motor 1522 before switch 1524 in timer 1520 closes to energize relay R-2 from source 1116 and buss 1136 via switch 1512. As the cycle clock motor continues to run and cams 1534, 1536 are rotated slightly less than 180° from the position of FIG. 50, follower 1540 rides up on major lobe 1550 to open low pressure switches 1512, 1514 and close the high pressure switches 1526, 1528. The opening of switch 1514 does not affect the operation of clock motor 1522 which is now energized from source 1544 through the closed lock-in switch 1538 and the cycle clock motor continues to rotate the cams through approximately 180° until follower 1542 engages the opposed indentation 1548 to, again, open switch 1538. If relay R-2 is energized (switch 1146 open) the cycle timer does not start again until relay R-1 is deenergized by the controller circuitry in the manner previously explained. When relay R-1 is subsequently deenergized, the foregoing cycle is repeated with the power to the cycle clock motor, timer 1520 and relay R-2 being derived from source 1148 via high pressure switches 1528, 1526. A subsequent approximate 180° rotation of the cams restores the condition of FIG. 50 with the low pressure switches closed, the high pressure switches open and lock-in switch 1538 open.

The overall operation of the control circuit employing the cycle timer control will now be described in connection with the selection of the fourth sprinkler section and assuming the initial circuit configuration shown in FIG. 50.

Figure 51:
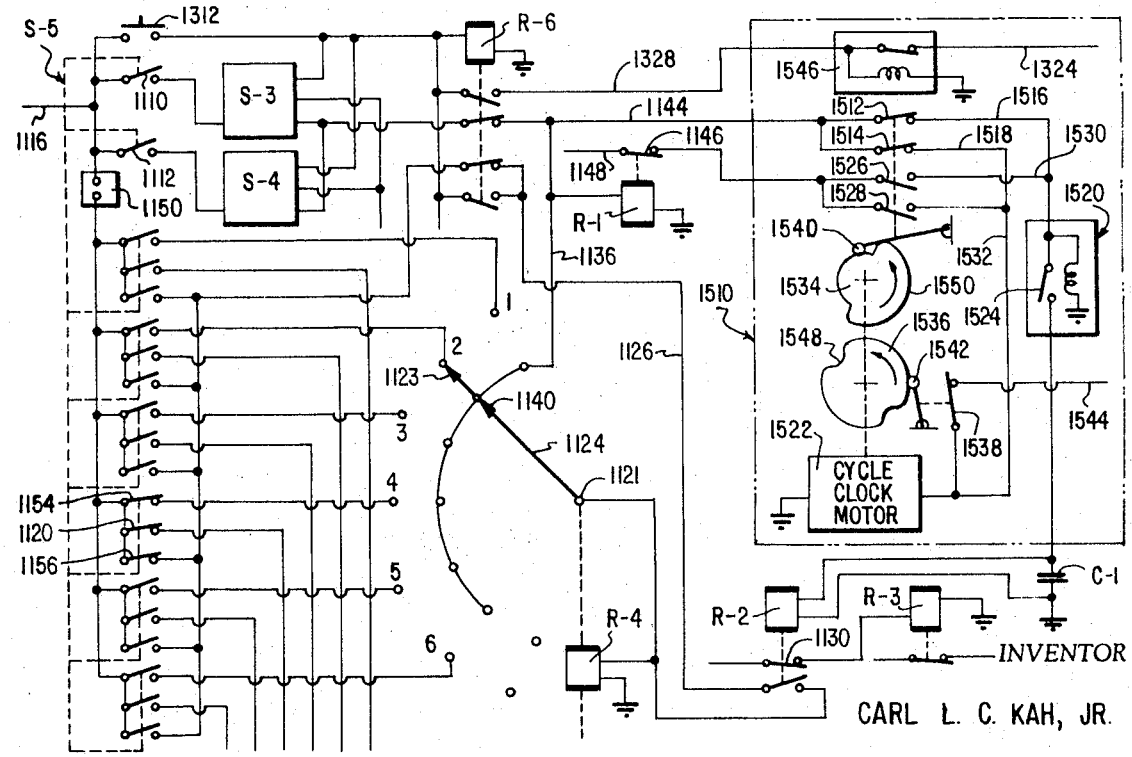
FIGS. 51-57 illustrate successive stages in the control system of FIG. 50 as the valve assemblies are pressure cycled to bring a preselected sprinkling section on line for extended operation.
Figure 52:
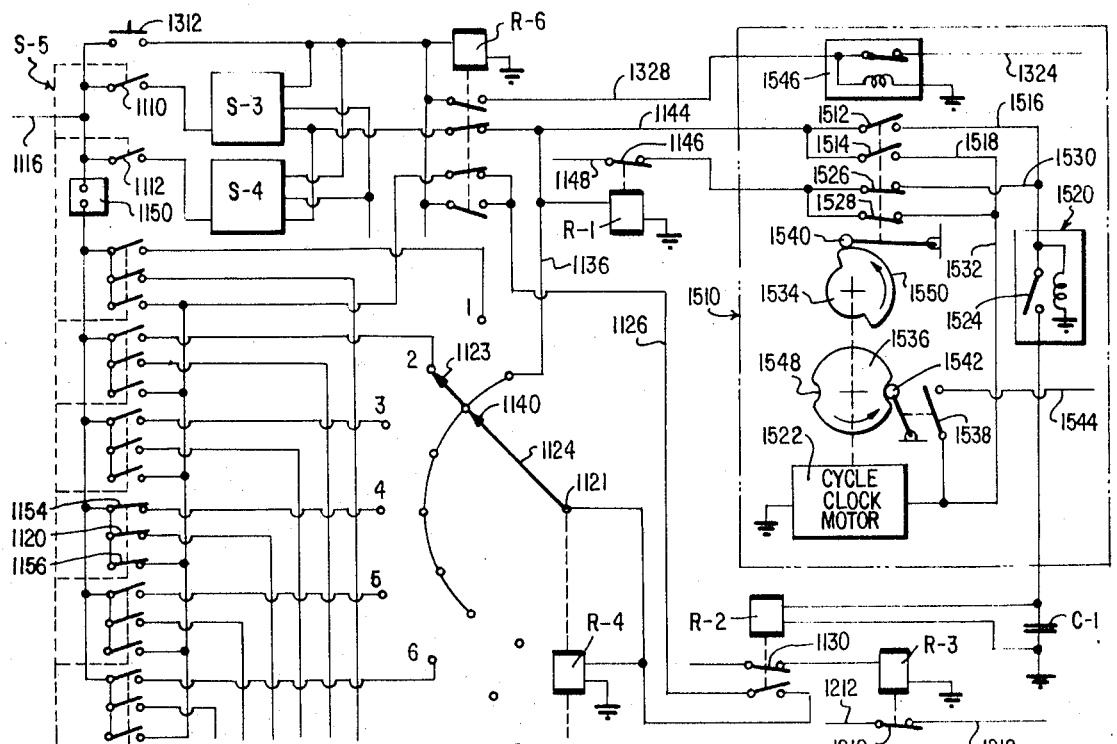
Figure 53:
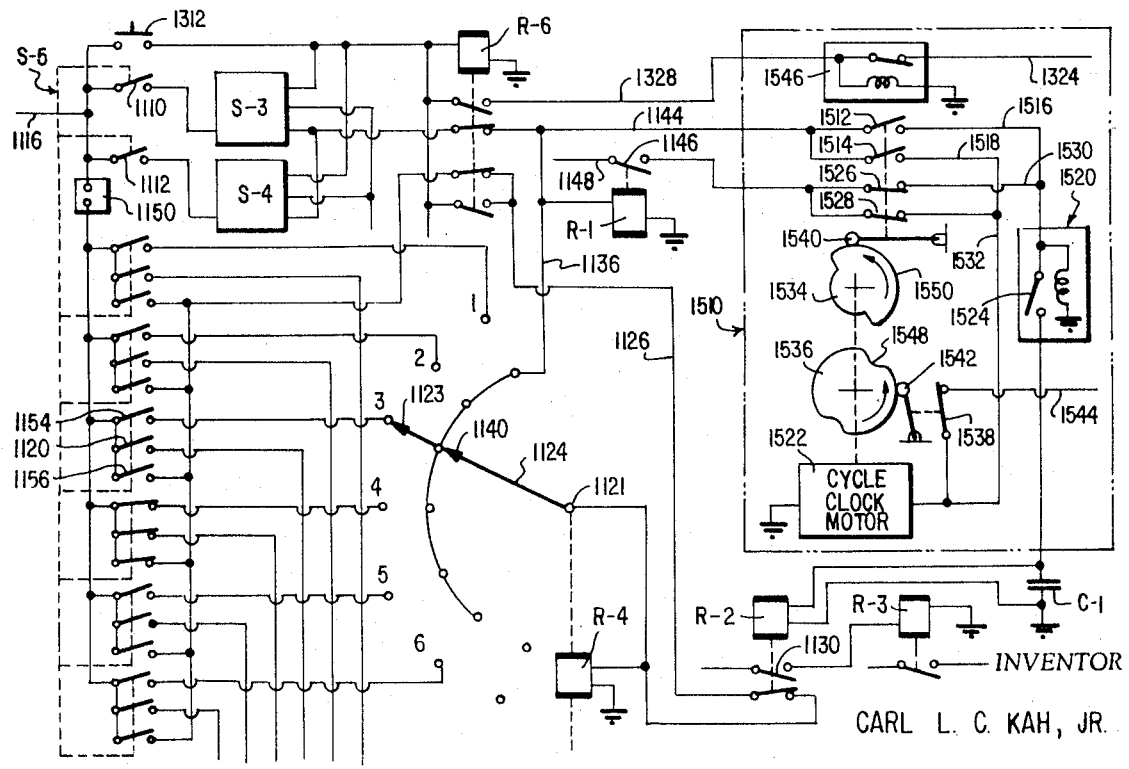
Figure 54:
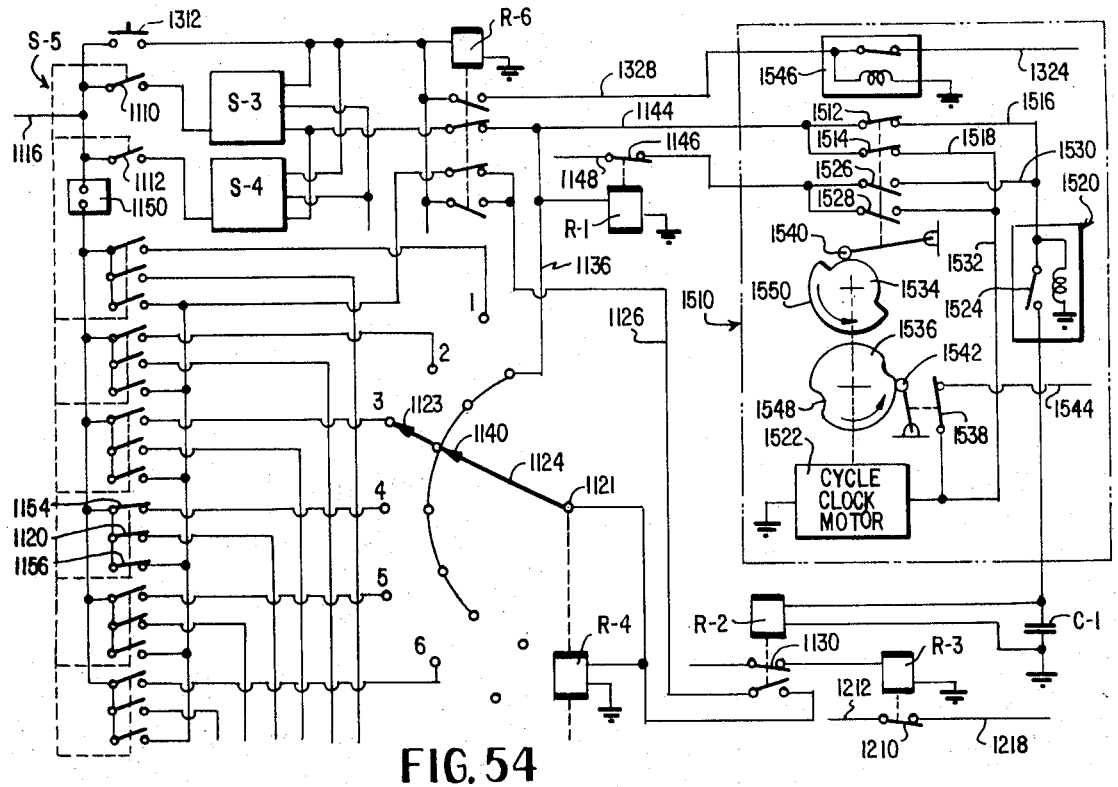
Figure 55:
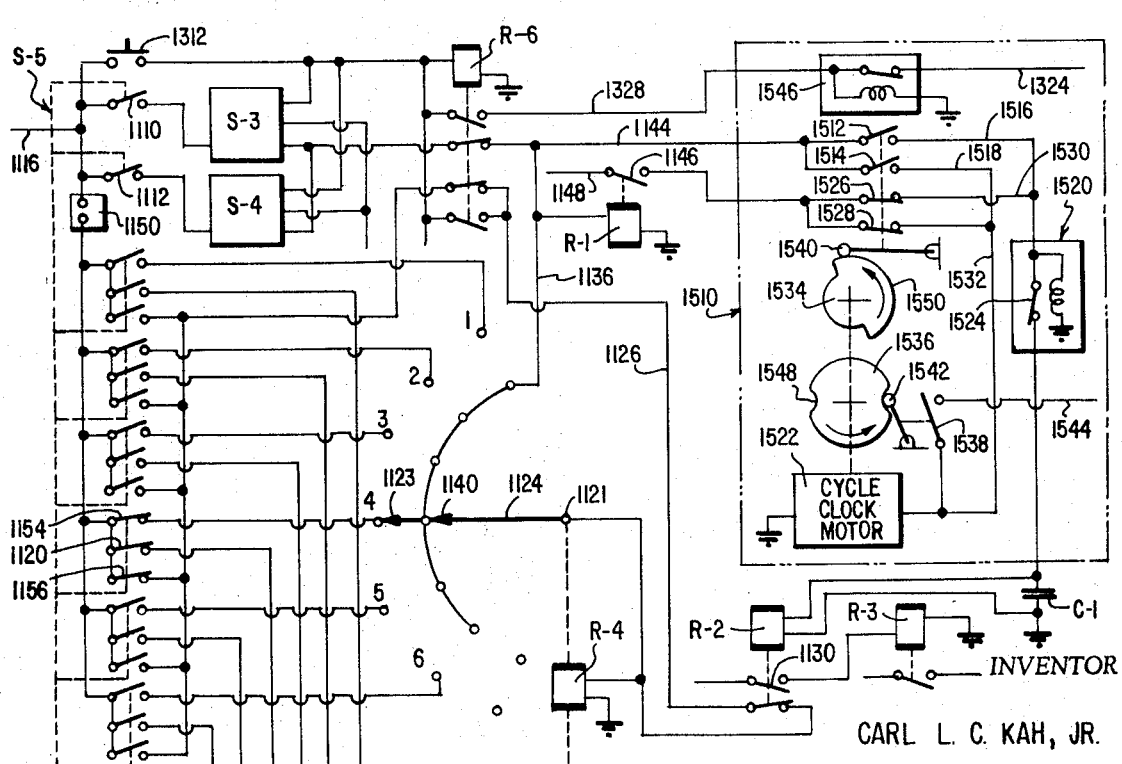
Figure 56:
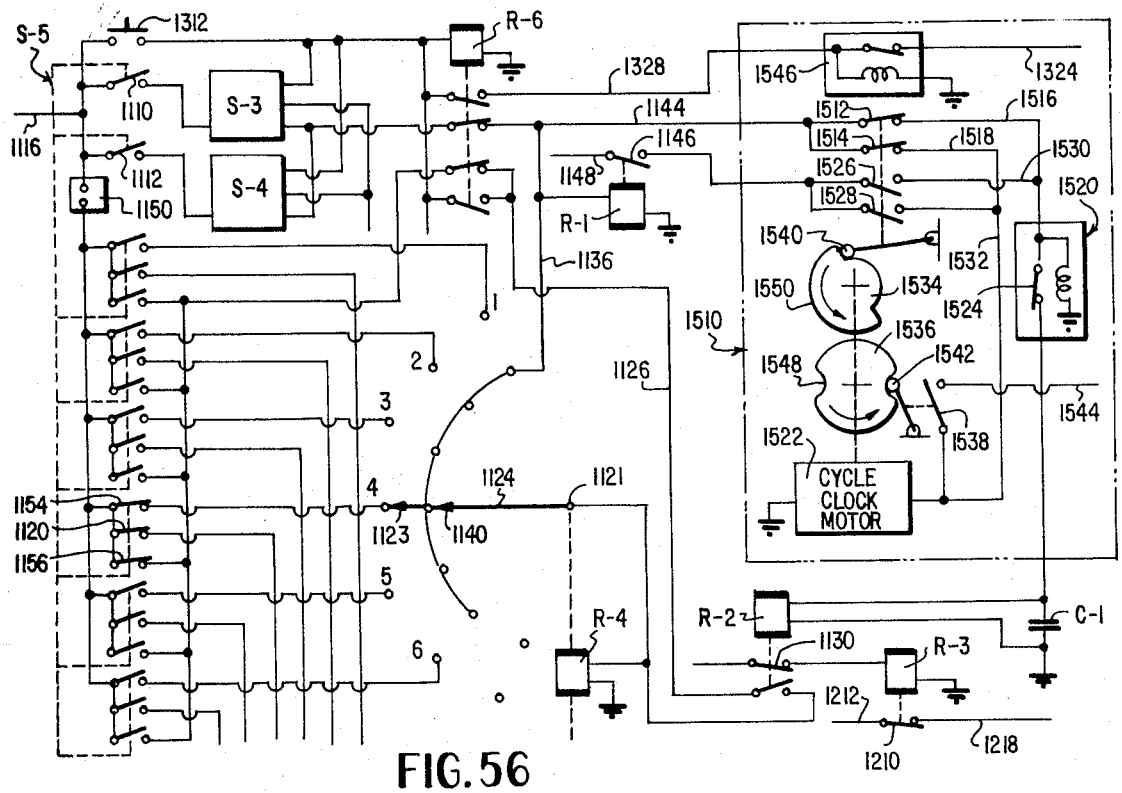
Figure 57:
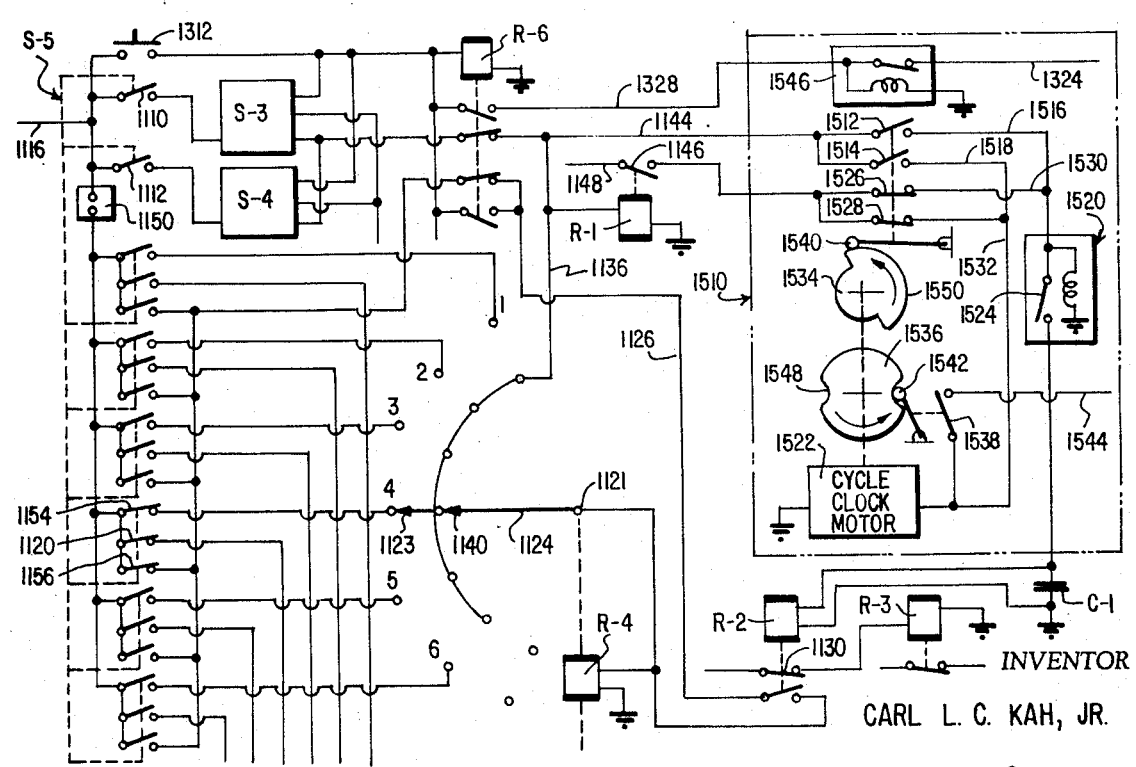

The fourth section selection switches 1154, 1120, 1156 are closed bringing source 1116 on line to energize relay R-4 to advance wiper arms 1124 and 1228 to the second section positions and, simultaneously, energizing relay R-1 to open switch 1146 and supplying power to buss 1136. Power from buss 1136 reaches the closed low pressure switches 1512, 1514 through line 1144 to start clock motor 1522 and, after a short delay to allow lock-up switch 1538 to bring source 1544 in circuit with clock motor 1522, energize relay R-2 through time delay 1520 to close switch 1130 and open switch 1128 thus bringing cycling pressure source 1444 on line in the manner previously explained through the energization of relay R-3. The opening of switch 1128 deenergizes relay R-2 and time delay switch 1524 opens. Relays R-4 and R-1 also deenergized permitting switch 1146 to close thus bringing source 1148 in circuit with open high pressure switches 1526, 1528 while line pressure is still rising and the clock motor is still running (switch 1538 closed). This is the circuit condition of FIG. 51. After the predetermined period of time for which the cycle timer cams have been programmed, the high pressure switches 1526, 1528 close and the low pressure switches open as roller 1540 engages major cam lobe 1550 following approximately 180° of cam rotation from the position of FIG. 50. Simultaneously, follower 1542 drops into the other indentation 1548 opening switch 1538 for the less than two second interval required for the rotation of cam 1536 to, again, close switch 1538. During this interval the clock motor is driven by source 1148. This is the circuit condition of FIG. 52. The closure of the high pressure switches results in relay R-2 being energized, after a two second delay at time delay 1520, by source 1148 through the deenergized R-1 relay switch 1146. This second energization of relay R-2 restores the R-2 switch condition of FIG. 50 with switch 1130 open, deenergizing relay R-3 thus blocking pressure cycling source at solenoid valve 1214 and initiating a line pressure decrease. The second energization of relay R-2 also closed switch 1128 to bring source 1116 back in circuit with relay R-4, to advance the wiper arms another step, and R-1 to open switch 1146. The opening of switch 1146 likewise deenergizes relay R-2 and switch 1524 opens. Line pressure is now falling, clock motor 1522 continues to run and relay R-2 is not again energized from buss 1136 because low pressure switch 1512 is open. This is the circuit condition of FIG. 53. The line pressure decrease continues until cam follower 1540 passes back onto the minor cam lobe (follower 1542 simultaneously engaging indentation 1548 and opening switch 1538 for less than a two second interval) at which time the low pressure switches (1512, 1514) close and the high pressure switches open. After a two second delay at time delay 1520 during which time clock motor 1522 is energized from buss 1136, relay R-2 is then again energized from buss 1136 to close switch 1130 to initiate another line pressure increase. Simultaneously, switch 1128 is opened to deenergize relays R-2, (switch 1524 opens) R-4 and R-1 allowing switch 1146 to close to bring source 1148 into circuit with the now open high pressure switches. This is the circuit condition of FIG. 54. This condition obtains while follower roller 1540 traverses the minor cam lobe (clock motor switch 1538 being closed). As follower 1540 again engages the major cam lobe 1550 (follower 1542 passing through indentation 1548 at this time), the low pressure switches open and the high pressure switches close thus supplying power to clock motor 1522 while switch 1538 is open and again closing switch 1524 to energize relay R-2 from source 1148 to open switch 1130 and initiate a line pressure decrease while closing switch 1128 to energize relay R-4 to step it to the No. 4 position and relay R-1 to open switch 1146. This is the circuit condition of FIG. 55. As follower 1540 again moves onto the lower cam lobe the low pressure switches close to energize relay R-2 from buss 1136 and initiate another line pressure increase. This line pressure increase will, however, derive from main pump 1446 since wiper arm 1228 supplies 1116 source voltage to the pressure source selection relay R-5 to close switch 1242 (FIG. 46B). Since buss 1136 is now supplied with a direct source of power from 1116 through wiper arm 1124 and the closed No. 4 selection switch, the R-4 stepping relay is not deenergized by the opening of switch 1128 since it is now in circuit with source 1116 through closed switch 1154. Similarly, R-1 remains energized from source 1116 keeping switch 1146 open. This is the circuit condition of FIG. 56. As pressure rises and follower 1540 reaches the major cam lobe, the high pressure switches close and the low pressure switches open. The opening of the low pressure switches broke the circuit to relay R-2 from buss 1136 and it cannot be reenergized by source 1148 since the closed manual selection switch 1154 keeps R-1 energized from source 1116. Consequently, R-2 relay switch 1130 remains closed and main pump 1446 continues to run to operate the fourth sprinkler section until another S-5 selection is made. This is the circuit condition of FIG. 57.

For time clock (or radio control) operation employing the cycle timer, and assuming the initial circuit condition of FIG. 50, switches 1110, S-3 and S-3A are closed to initiate sprinkling at the first section as the cycle clock motor starts to run. Shortly thereafter relay R-2 is energized as time delay 1520 closes to energize relay R-3 which, in turn, energizes main pump 1446 through the energized R-5 relay switch 1242. Closure of switches 1110 and S-3 also energized relay R-1 and advanced relay R-4 one step. Following the two second delay after which switch 1128 opened, R-2 deenergizes as does R-4 and R-1 allowing switch 1146 to close. Following the predetermined period of time for which the cycle cams are contoured, the high pressure switches close to reenergize relay R-2 from source 1148 and initiate a line pressure decrease. Source 1116 is now again in circuit with the low pressure switch to again energize relay R-2 when the low pressure switches close.

Figure 58:
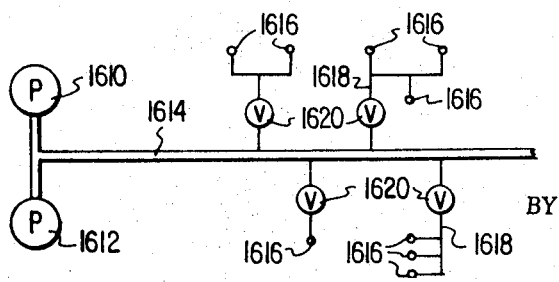
FIG. 58 is a schematic illustration of an alternate, relatively simple, hydraulic circuit that may be employed with the circuit arrangement of FIG. 46.

A schematic illustration of a somewhat simpler hydraulic system that may be employed with the circuit arrangement of FIG. 46 to cycle the valve assemblies to a particular section selection and then bring on high pressure is shown in FIG. 58 wherein pressure cycling and main pumps 1610, 1612 have their respective start relays connected to the normally closed and normally open contacts of pressure source selection relay R-5. Both of these pumps are connected in main line 1614 which supplies the various sprinkler sections 1616 via branches 1618 controlled by pressure actuated and sequenced valve assemblies 1620 having a pressure cycling feature.

I claim:

1. A pressure actuated and sequenced valve assembly comprising; a main valve for controlling fluid flow therethrough, a main valve actuator for opening and closing said main valve; first passage means for constantly imposing pressure forces on one side of said main valve actuator, second passage means for imposing pressure forces on the other side of said main valve actuator, third passage means for venting the other side of the main valve actuator, a pilot valve biased to close said third passage means, means responsive to pressure variations for opening and closing said pilot valve, the last named means including a sequencing means for controlling the opening movement of said pilot valve and fluid pressure actuating means for indexing said sequencing means and opening said pilot valve, fourth passage means for communicating a pressure to said fluid pressure actuating means, said sequencing means including a plurality of indexing elements, ratcheting means mounted for intermittent driving engagement with said indexing elements and drivingly interrelated with said fluid pressure actuating means for translating pressure changes into indexing movement of said sequencing means.

2. A valve assembly as set forth in claim 1 wherein said fluid pressure actuating means includes two separate pressure responsive means, one pressure responsive means being connected to said sequencing means and the other pressure responsive means being connected to said pilot valve.

3. A valve assembly as set forth in claim 1 wherein the flow passage area of said second passage means is small in comparison to that of said first passage means.

4. A valve assembly as set forth in claim 1 including a lost motion connection between said pilot valve and said fluid pressure actuating means whereby said sequencing means may be actuated by said fluid pressure actuating means without opening said pilot valve for pressure indexing the sequencing means.

5. A valve assembly as set forth in claim 1 including means for biasing said pilot valve to a closed position and means interacting between the biasing means and said sequencing means for automatically varying said bias as a function of the indexed position of said sequencing means whereby the pilot valve may be pressure operated to an open position.

6. A valve assembly as set forth in claim 1 wherein said pilot valve is a double acting pilot valve mounted for movement between the position closing said third passage means and a position closing said second passage means.

7. A valve assembly as set forth in claim 6 including means engageable by said sequencing means for engaging said pilot valve to open said third passage means and close said second passage means.

8. A valve assembly as set forth in claim 1 including means for resetting said sequencing means to a selected reference position.

9. A valve assembly as set forth in claim 8 wherein said resetting means is responsive to a pressure outside of said pressure variations.

10. A valve assembly as set forth in claim 9 wherein said resetting means is responsive to a reduced pressure from said pressure variations.

11. A valve assembly as set forth in claim 9 wherein said resetting means is also responsive to a time delay means so that said outside pressure will not reset said sequencing means for a predetermined time period.

12. A valve assembly as set forth in claim 8 wherein said resetting means includes means biasing said sequencing means in opposition to the direction of said indexing movement, and means for selectively restraining said resetting movement.

13. A valve assembly as set forth in claim 12 including means responsive to a pressure outside of said pressure variations for selectively restraining said resetting movement.

14. A valve assembly as set forth in claim 12 including means responsive to time and a pressure outside of said pressure variations for selectively restraining said resetting movement.

15. A valve assembly as set forth in claim 8 wherein said main valve is connected in line with at least two distinct pressure sources for selectively supplying line pressure variations for pressure indexing the sequencing means and for opening the main valve, and means for reducing pressure for resetting said sequencing means.

16. A valve assembly as set forth in claim 1 wherein said main valve is connected in line with at least two distinct pressure sources for selectively supplying pressure variations for pressure indexing the sequencing means and for opening the main valve.

17. A valve assembly as set forth in claim 1 wherein said third passage means terminates within the fluid flow line downstream of said main valve.

18. A valve assembly as set forth in claim 17 wherein said third passage means terminates in a venturi throat for providing a greater pressure sink therefor upon opening of said main valve.

19. A valve assembly as set forth in claim 1 wherein said sequencing means includes reciprocal actuator rod means mounted for camming engagement with said ratcheting means for effecting the driving interrelation between said fluid pressure actuating means and said ratcheting means.

20. A pressure actuated and sequenced valve assembly comprising; a line connected main valve for controlling fluid flow therethrough, a main valve actuator for opening and closing said main valve, sequencing control means for controlling the movement of said actuator in response to pressure variations, means for directing pressure variations to said control means, said control means including a pilot valve and an indexable member mounted for indexing movement through a plurality of main valve closed positions and at least one main valve open position, and said control means further including means for indexing said indexable member through any or all of said positions without opening said valve.

21. A valve assembly as set forth in claim 20 wherein said pressure variations are formed in said line.

22. A pressure actuated and sequenced valve assembly, comprising; a valve for controlling fluid flow therethrough, sequencing control means including indexable means for controlling the opening and closing movement of said valve in response to pressure variations, and means for resetting said indexable means to a predetermined point in its indexing cycle as a function of a pressure level outside the range of said pressure variations.

23. A valve assembly as set forth in claim 22 wherein said resetting means resets as a function of time along with the pressure level.

24. A pressure actuated and sequenced valve assembly comprising; a valve, a valve actuator, first passage means for communicating actuating pressure forces to said valve actuator, an indexable member, means responsive to a first pressure range variation for indexing said member and to a higher pressure level for opening said valve, the last named means including fluid pressure actuating means, second passage means for communicating pressure variations to said actuating means, and sequencing selection means carried by said indexable member for controlling the opening movement of said valve.

25. A valve assembly as set forth in claim 24 including means for resetting said indexable member in response to pressure levels below said first pressure range.

26. The valve assembly of claim 24 wherein said fluid pressure actuating means comprises a single actuator for indexing said member and opening said valve.

27. The valve assembly of claim 26 including means for resetting said indexable member in response to pressure levels below said first pressure range.

28. The valve assembly of claim 24 including spring means opposing the actuating movement of said actuating means defining said first pressure range and further defining a second pressure range including said higher pressure level, and the bias of said spring means changing abruptly at the juncture of said pressure ranges.

29. The valve assembly of claim 28 wherein said spring means further define a third pressure range below said first pressure range, means for moving said indexable member for resetting movement in opposition to the indexing movement, means restraining said resetting movement, and means responsive to pressure levels within said third pressure range for releasing said restraining means whereby said indexable member may be reset.

30. The valve assembly of claim 29 wherein said indexable member includes means for selective positioning of reset stop means whereby the indexable member may be reset to a predetermined base position by reduced pressure levels within said third range.

31. The valve assembly of claim 29 wherein said spring means comprise three concentric springs.

32. The valve assembly of claim 24 wherein said indexable member includes a plurality of indexable positions and said sequencing selection means comprise pin means selectively positionable at any of said indexable positions.

33. A pressure actuated and sequenced valve assembly comprising; a main valve, a main valve actuator, first passage means for communicating actuating pressure forces to opposite sides of said main valve actuator, second passage means including a pilot valve for selectively venting one side of said main valve actuator, an indexable member, means responsive to a first pressure range variation for indexing said member and to a higher pressure level for opening said pilot valve, the last named means including fluid pressure actuating means, third passage means for communicating pressure variations to said actuating means, and sequencing selection means carried by said indexable member for controlling the opening movement of said pilot valve.

34. A valve assembly as set forth in claim 33 including means for resetting said indexable member in response to pressure levels below said first pressure range.

35. The valve assembly of claim 33 including means biasing said pilot valve to close said second passage means and said sequencing selection means being movable into engagement with said biasing means for reducing the bias on said pilot valve.

36. The valve assembly of claim 33 wherein said fluid pressure actuating means comprises a single actuator for indexing said member and opening said pilot valve.

37. The valve assembly of claim 36 including a pilot valve actuator assembly connected to said single actuator, a lost motion connection between the last named assembly and said pilot valve for taking up limited relative movement therebetween as induced therein by said first pressure range variations applied to said actuator whereby the valve assembly may be pressure cycled without opening the pilot valve.

38. The valve assembly of claim 37 wherein said sequencing selection means includes means for restraining or permitting movement of said pilot valve actuator assembly under the influence of said higher pressure level within or beyond the range of said limited relative movement.

39. A pressure actuated valve assembly comprising; a main valve, a main valve actuator, inlet passage means for communicating inlet line pressure forces to opposite sides of said main valve actuator, a dump passage including a pilot valve for selectively venting one side of said main valve actuator, means responsive to pressure variations for opening and closing said pilot valve, said last named means including actuating means, line connected venturi passage means, and said dump passage terminating in the throat area of said venturi passage means for inducing a greater pressure drop across said main valve actuator when said one side thereof is vented.

40. A pressure actuated and sequenced flow control valve, comprising; a valve, valve actuator means including a fluid pressure actuator for opening and closing said valve, passage means for communicating a pressure to one side of said fluid pressure actuator, an indexable member, sequencing means responsive to a first pressure range variation for indexing said member and to a higher pressure level for opening said valve, said sequencing means including driving ratchet means mounted for movement into and out of driving engagement with said member and a lost motion connection between said valve and valve actuator means for permitting limited relative movement therebetween in response to pressure variations within said first pressure range, and first and second distinct biasing means respectively opposing movement of said valve actuator means within said first pressure range and to said higher pressure level.

41. A line connected pressure actuated and sequenced valve assembly including a main valve, a main valve actuator, a sequencing control assembly, a pilot valve assembly, and actuator means for the last named assemblies, the improvement comprising; passage means for communicating operating pressure forces to opposite sides of said main valve actuator and to said actuator means; a passage for selectively venting one side of said main valve actuator; means mounting said pilot valve assembly for movement between first and second extreme positions respectively opening and closing said passage; said sequencing control assembly including an indexable member and ratchet means mounted for intermittent driving engagement with said member; sequence control means carried by said member for controlling the movement of said pilot valve assembly to said first extreme position; means biasing said pilot valve assembly in the direction of said second extreme position; and said actuator means for said sequencing control and pilot valve assemblies comprising fluid pressure actuator means in communication with operating pressure forces.

42. The line connected valve assembly of claim 41 wherein said sequencing control assembly includes biasing means restraining driving engagement between said ratchet means and said indexable member, said biasing means restraining driving engagement between said ratchet means and indexable member being yieldable under a first pressure level applied at said actuator means, and said means biasing said pilot valve assembly in the direction of said second extreme position being yieldable under a second higher pressure level applied at said actuator means, and means for selectively imposing said first and second pressure levels whereby the valve assembly may be pressure cycled and actuated, respectively.

43. The line connected valve assembly of claim 42 including means biasing said indexable member in a direction opposite to the driving engagement thereof by said ratchet means, holding means for restraining the movement of said indexable member in the last named direction, means responsive to a third pressure less than said first pressure for releasing said holding means, and means for reducing said pressure below said first pressure level whereby said indexable member may be reset.

44. A pressure actuated and sequenced valve assembly including distinct, differentially loaded biasing means for the establishment of a first distinct pressure range within which the valve assembly may be sequenced while precluding actuation of the same and a second distinct pressure range within which said valve assembly may be actuated, comprising; a valve; an indexable member for controlling the opening movement of said valve; means responsive to pressure variations for opening and closing said valve and sequencing said member; the last named means comprising fluid pressure actuating means, passage means for communicating pressure to said actuating means, and drive means responsive to movement of said actuating means for sequencing said member and opening said valve; said drive means being responsive to first pressure level variations within a first pressure range for sequencing said member and second pressure level variations within a second pressure range for sequencing said member and opening said valve; first biasing means opposing the sequencing of said member within said first pressure range; and second biasing means opposing the opening of said valve within said second pressure range whereby selective pressure variations within said first range will sequence said member without opening said valve.

45. The valve assembly of claim 44 wherein said first and second biasing means comprise first and second differentially biased spring assemblies, and said second spring assembly having a greater bias than said first spring assembly.

46. The valve assembly of claim 44 wherein said drive means includes an actuator having a first range of movement in response to pressure variations within said first pressure range applied at said actuating means and a second range of movement in response to pressure variations within said second pressure range, means for withholding the bias of said second biasing means from said actuator during said first range of movement thereof; and means for applying the bias of said second biasing means to said actuator during said second range of movement whereby the additive biasing forces of the two biasing means must be overcome to open the valve.

47. The valve assembly of claim 44 including reset biasing means opposing the sequencing movement of said member; means for blocking reset movement of said member; reset stop means for arresting movement of said member in the reset direction; and means responsive to a reduced line pressure level below said first pressure range for releasing the reset blocking means whereby said member may be reset to a predetermined base portion.

48. The valve assembly of claim 47 wherein said means responsive to a reduced line pressure level includes a third biasing means.

49. A unit controller adapted to be connected between a main flow line and a main valve having a main valve actuator for converting the same into a pressure actuated and sequenced valve assembly comprising; a unit housing, flow passage means including a dump line in said housing for selective communication of one side of the main valve actuator with inlet line pressure or said dump line, a pilot valve having a lost motion connection with a pilot valve actuator means for controlling said selective communication, sequencing control means including an indexable member and driving ratchet means therefor for moving said pilot valve actuator means, said indexable member including a plurality of indexable positions limiting the movement of said ratchet means to a stroke length less than the lost motion connection and at least one position permitting a stroke length travel of said ratchet means exceeding that of the lost motion connection, and means for limiting said stroke length when said indexable member is in said one position whereby the same may be pressure cycled without opening the main valve.

50. A unit controller adapted to be connected to a main valve actuator for converting the same into a pressure actuated and sequenced valve assembly comprising; a unit housing, a valve for controlling fluid pressure on one side of the main valve actuator, a sequencing control means including an indexable member for controlling the movement of said valve in response to pressure variations, said indexable member being mounted for indexing movement through a plurality of valve closed positions and at least one valve open position; and said control means further including means for indexing said indexable member through any or all of said positions without opening said valve.

51. A unit controller as set forth in claim 50 including means for resetting said indexable member in response to pressure levels below said pressure variations.

52. A unit controller as set forth in claim 51 wherein the last named means includes reset spring means for biasing the indexable member in one direction; said sequencing control means further including drive means for indexing said member in the other direction in response to cyclic pressure variations, holding means restraining movement of said member in said one direction; and means for releasing said holding means.

53. A unit controller adapted to be connected between a main flow line and a main valve having a main valve actuator for converting the same into a pressure actuated and sequenced valve assembly, comprising; a unit housing, flow passage means including a dump line in said housing for selective communication of one side of the main valve actuator with inlet line pressure or said dump line, a pilot valve for controlling said selective communication, sequencing control means including a reciprocal fluid pressure actuator for opening said pilot valve and biasing means for closing the same, a lost motion connection between said last named actuator and pilot valve defining a range of limited relative movement therebetween, said sequencing control means further including means for selectively limiting the reciprocal movement of said last named actuator to a stroke length less than said range of limited movement, said last named means including an indexable member having a plurality of indexable positions for limiting said stroke length and at least one indexable position permitting an actuator stroke length exceeding that of the lost motion connection, and means for indexing said member in response to reciprocal movement of said last named actuator.

54. In combination with line connected pressure actuated and sequenced valve assembly means; a control system for controlling line system pressure to said valve assembly means; said control system comprising; a selectively energizable line pressure controller; a power source for energizing said controller; a control circuit for controlling the energization of said controller by said power source in response to line system pressure changes; said control circuit including energizable switch means in circuit between said power source and controller; power means for energizing said switch means; and line pressure responsive switching means in circuit between said power means and said energizable switch means.

55. The combination of claim 54 wherein said line pressure controller comprises a pressurization control relay and said energizable switch means includes a latching circuit.

56. The combination of claim 55 wherein said line pressure responsive switching means includes separate high and low pressure switches; and said power means comprises a first electrical source in circuit with said high pressure switch and a second electrical source in circuit with said low pressure switch.

57. The combination of claim 56 wherein said control circuit includes first and second circuit means for alternately energizing said latching circuit by said first and second electrical sources; a relay operated switch series connected in said first circuit means with the high pressure switch; and means responsive to current flow in said second circuit means for actuating said relay operated switch in said first circuit means.

58. The combination of claim 57 including switch means operated by said latching circuit for opening and closing said second circuit means in response to the alternate energization of said latching circuit by said first and second electrical sources.

59. The combination of claim 58 including electrical means for tracking the line pressure changes induced by said line pressure controller.

60. The combination of claim 58 including remote control switch means for making and breaking said second circuit means.

61. In combination with line connected pressure actuated and sequenced valve assembly means; a control system for controlling line system pressure to said valve assembly means; said control system comprising; electrically operated line pressure source control means; first control circuit means Including first and second energizable switch means for controlling the energization of said source control means; second control circuit means including energizable switch means for controlling the energization of said first switch means; third control circuit means for controlling the energization of said second switch means; electrical power means for said circuit means; and fluid pressure responsive switching means in said second control circuit means.

62. The combination of claim 62 wherein said second control circuit means includes a first subcircuit responsive to the energization of one energizable switch means in said second control circuit means for energizing said first energizable switch means.

63. The combination of claim 63 wherein said fluid pressure responsive switching means includes separate high and low pressure switches; said second control circuit means including a second subcircuit responsive to the energization of another energizable switch means in said second circuit for energizing said one energizable switch means.

64. The combination of claim 63 including a stepping relay intermittently energizable by said power means as a function of the energization of said one energizable switch means.

65. The combination of claim 62 wherein said second control circuit includes parallel subcircuits; and said pressure responsive switching means including separate high and low pressure switches controlling respective ones of said subcircuits.

66. The combination of claim 66 including second electrically operated line pressure source control means and fourth control circuit means for controlling the same; reset pressure responsive switching means in circuit with said fourth control circuit means; and electrical power means for said fourth control circuit means.

67. In combination with line connected pressure actuated and sequenced valve assembly means; a control system for controlling line system pressure to said valve assembly means; Said control system comprising; a selectively energizable line pressure controller; a power source for energizing said controller; a control circuit for controlling the energization of said controller by said power source as a function of time; said control circuit including energizable switch means in circuit between said power source and controller; power means for energizing said switch means; and time responsive switching means in circuit between said power means and said energizable switch means.

68. The combination of claim 68 wherein said line pressure controller comprises a pressurization control relay and said energizable switch means includes a latching circuit.

69. The combination of claim 69 wherein said time responsive switching means includes separate high and low pressure switches; and said power means comprising a first electrical source in circuit with said high pressure switch and a second electrical source in circuit with said low pressure switch.

70. The combination of claim 70 wherein said control circuit includes first and second circuit means for alternately energizing said latching circuit by said first and second electrical sources, a relay operated switch series connected in said first circuit means with the high pressure switch; and means responsive to current flow in said second circuit means for actuating said relay operated switch in said first circuit means.

71. The combination of claim 71 including switch means operated by said latching circuit for opening and closing said second circuit means in response to the alternate energization of said latching circuit by said first and second electrical sources.

72. The combination of claim 67 including electrical means for tracking the line pressure changes induced by said line pressure source control means.

73. In combination with line connected pressure actuated and sequenced valve assembly means; a control system for controlling line system pressure to said valve assembly means; said control system comprising; electrically operated line pressure source control means; first control circuit means including first and second energizable switch means for controlling the energization of said source control means; second control circuit means including energizable switch means for controlling the energization of said first switch means; third control circuit means for controlling the energization of said second switch means; electrical power means for said circuit means; and time responsive switching means in said second control circuit means.

74. The combination of claim 74 wherein said second control circuit means includes a first sub-circuit responsive to the energization of one energizable switch means in said second control circuit means for energizing said first energizable switch means.

75. The combination of claim 75 wherein said time responsive switching means includes separate high and low pressure switches; said second control circuit means including second sub-circuit responsive to the energization of another energizable switch means in said second circuit means for energizing said one energizable switch means.

76. The combination of claim 75 including a stepping relay intermittently energizable by said power means as a function of the energization of said one energizable switch means.

77. The combination of claim 74 wherein said second control circuit means includes parallel sub-circuits; and said time responsive switching means including separate high and low pressure switches controlling respective ones of said sub-circuits.

78. The combination of claim 78 including second electrically operated line pressure source control means and fourth control circuit means for controlling the same; reset time responsive switching means in circuit with said fourth control circuit means; and electrical power means for said fourth control circuit means.

79. An irrigation system, comprising a plurality of line connected fluid distributors; line connected fluid pressure means for supplying said distributors; a plurality of line connected pressure actuated and sequenced valve assemblies for controlling fluid flow to said distributors as a function of line pressure variations; each said valve assembly including; a main flow control valve for controlling flow between said line and at least one of said distributors and an indexable member for controlling the opening movement of said main valve, line pressure actuated means for indexing said member and opening said main valve, biasing means defining distinct line pressure ranges for pressure cycling said valve assembly and for opening the main valve, said biasing means comprising first biasing means opposing the line pressure actuated means for indexing said member and second biasing means opposing the line pressure actuated means for opening the main valve; and means controlling said fluid pressure means for selectively transmitting line pressure variations within one of said pressure ranges to each said valve assembly for sequencing the same and within another of said pressure ranges for opening the main valve of at least one of said valve assemblies.

80. The irrigation system of claim 80 wherein each said valve assembly further includes; reset stop means associated with the indexable member for defining a basic start position, reset biasing means opposing the indexing of said member and biasing the same toward said start position, holding means responsive to pressure levels within said pressure ranges for restraining movement of said member toward the start position; and line connected means for reducing line pressure below said pressure ranges for releasing the holding means in each said valve assembly and resetting the same to a basic start position.

81. An irrigation system, comprising; a plurality of line connected fluid distributors; a line connected fluid pressure source for supplying said distributors; a plurality of line connected pressure actuated and sequenced valve assemblies for controlling fluid flow to said distributors as a function of pressure variations; each said valve assembly including; a main flow control valve for controlling flow between said line and at least one of said distributors and an indexable member for controlling the opening movement of said main valve, pressure actuated means for indexing said member and opening said main valve, return biasing means opposing the pressure actuated means for indexing said member and opening said main valve; means including electrical control means for initiating cyclic pressure variations at said fluid pressure source for alternately increasing and decreasing pressure to index said member of each valve assembly under the alternate influence of increasing pressure and the return biasing means; said electrical control means including first circuit means for initiating pressure increases and second circuit means for initiating pressure decreases; and means for alternately making and breaking said circuits as a function of irrigation system parameters whereby an alternate pressure variation may not be initiated until all the line connected valve assemblies have been sequenced under the influence of the previous pressure variation.

82. An irrigation system as set forth in claim 82 wherein the pressure variations are line pressure variations.

83. An irrigation system as defined in claim 82 wherein said electrical control means include additional circuit means for precluding the making of said second circuit means; and manual switch means in said additional circuit means for activating the same.

84. An irrigation system as defined in claim 84 wherein said manual switch means includes a manual selection switch for at least one of each said valve assembly; and said additional circuit means including a stepping circuit for stepping circuit closures into and out of circuit with each manual selection switch whereby the fluid distributors associated with each valve assembly may be manually selected for extended irrigation.

85. An irrigation system as defined in claim 82 wherein said last named means include line connected pressure responsive switching means.

86. An irrigation system as defined in claim 82 wherein said last named means include timing means.

87. An irrigation system as defined in claim 82 including a second fluid pressure source for alternately increasing and decreasing line pressure within a line pressure range distinct from a range of fluid pressure variations derived from the first named fluid pressure source; said biasing means including distinct spring assemblies; and one of said spring assemblies being preloaded to yield within one of said pressure ranges and another being preloaded to yield within the other pressure range.

* * * * *

UNITED STATES PATENT OFFICE
CERTIFICATE OF CORRECTION

Patent No. 3,747,620　　　　　Dated July 24, 1973

Inventor(s)　　CARL L. C. KAH, JR.

It is certified that error appears in the above-identified patent and that said Letters Patent are hereby corrected as shown below:

Claim 84, line 1, after "claim" change "84" to -- 83 --

Claim 85, line 1, change "82" to -- 81 --

Claim 86, line 1, change "82" to -- 81 --

Claim 87, line 1, change "82" to -- 81 --

Signed and sealed this 16th day of April 1974.

(SEAL)
Attest:

EDWARD M. FLETCHER, JR.　　　　　C. MARSHALL DANN
Attesting Officer　　　　　　　　　Commissioner of Patents // REEXAMINATION CERTIFICATE (120th)
United States Patent [19]

Kah, Jr.

[11] B1 3,747,620

[45] Certificate Issued Aug. 30, 1983

[54] IRRIGATION SPRINKLER SYSTEM CONTROL EMPLOYING PILOT OPERATED, PRESSURE ACTUATED AND SEQUENCED VALVE ASSEMBLIES

[75] Inventor: Carl L. C. Kah, Jr., North Palm Beach, Fla.

[73] Assignee: The Toro Co., Minneapolis, Minn.

Reexamination Request:
No. 90/000,249, Aug. 30, 1982

Reexamination Certificate for:
Patent No.: 3,747,620
Issued: Jul. 24, 1973
Appl. No.: 222,600
Filed: Feb. 1, 1972

Certificate of Correction issued Apr. 16, 1974.

Related U.S. Application Data

[63] Continuation of Ser. No. 90,732, Nov. 18, 1970, abandoned.

[51] Int. Cl.³ .................. G05D 11/00; A01G 25/02; F17D 3/00
[52] U.S. Cl. ..................... 137/119; 137/624.12; 137/624.18; 137/624.20; 239/66; 251/230; 307/41; 307/141
[58] Field of Search ............... 251/31, 46, 61.5, 24, 251/28; 137/119, 624.12, 624.13, 624.15, 137/624.18, 624.19, 624.20

[56] References Cited
U.S. PATENT DOCUMENTS

| | | | |
|---|---|---|---|
| 1,034,826 | 8/1912 | Payne | 251/24 |
| 1,646,640 | 10/1927 | Daniel | 251/24 |
| 2,304,323 | 12/1942 | Wiegers | 251/28 |
| 2,877,791 | 3/1959 | Rich | 251/61.1 X |
| 3,544,061 | 12/1970 | Moy | 251/24 |

*Primary Examiner*—Robert G. Nilson

[57] ABSTRACT

The disclosure introduces a number of new concepts in the operation and control of pressure actuated and sequenced valve assemblies which include pressure cycling, selective reset, tracking of sprinkler section operation and cyclic pressure level control. Each of the pressure actuated and sequenced valve assemblies herein disclosed includes pressure cycling and/or reset capabilities operable as a direct function of line pressure changes and as an indirect function of a remote electrical control system which may be selectively employed to control such pressure changes. Alternatively, the direct function control may be based on time.

One aspect of the invention is concerned with the constructional details of various pressure actuated and sequenced valve assembly configurations employing pilot valves and sequencing control elements for controlling the opening and closing movement of a main flow control valve while a second aspect of the invention relates to the control of those line pressure variations to which the pilot valves and sequencing control elements are responsive.

The sequencing control elements in each of the line connected valve assemblies may be pressure cycled without opening the main valve by varying inlet line pressure at a level below that required to open the main valves and the sequencing control elements may be reset to a predetermined position by a further selective reduction in line pressure level.

The remote electrical control system has a primary function of insuring that each cyclic line pressure change is of such magnitude and/or duration as to insure that each line connected valve assembly will be sequenced. The electrical control system further includes the capability of an automatic selection of a manually chosen one of the plurality of line connected sprinkler sections for individual and/or prolonged sprinkling as well as the additional features of pressure cycling and reset of all the line connected sequencing control elements which latter two functions may also be performed by a conventional hydraulic control adjacent the line pressure source when valve assemblies of the type herein disclosed, possessing these capabilities, are used.

REEXAMINATION CERTIFICATE ISSUED UNDER 35 U.S.C. 307.

IRRIGATION SPRINKLER SYSTEM CONTROL EMPLOYING PILOT OPERATED, PRESSURE ACTUATED AND SEQUENCED VALVE ASSEMBLIES

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 54–78 and 81–87 is confirmed.

Claims 1, 3, 4, 6–9, 11–17, 19–28, 34, 39, 41–44, 46, 47, and 49–53, having been finally determined to be unpatentable, are cancelled.

Claims 2, 5, 10, 18, 29, 32, 33, 35, 36, 40, 45, 48, and 79 are determined to be patentable as amended:

Claims 30, 31, 37, 38, and 80, dependent on amended claims, are determined to be patentable.

New claims 88–95 are added and determined to be patentable.

2. [A valve assembly as set forth in claim 1 wherein] *A pressure actuated and sequenced valve assembly comprising; a main valve for controlling fluid flow therethrough, a main valve actuator for opening and closing said main valve; first passage means for constantly imposing pressure forces on one side of said main valve actuator, second passage means for imposing pressure forces on the other side of said main valve actuator, third passage means for venting the other side of the main valve actuator, a pilot valve biased to close said third passage means, means responsive to pressure variations for opening and closing said pilot valve, the last named means including a sequencing means for controlling the opening movement of said pilot valve and fluid pressure actuating means for indexing said sequencing means and opening said pilot valve, fourth passage means for communicating a pressure to said fluid pressure actuating means, said sequencing means including a plurality of indexing elements, ratcheting means mounted for intermittent driving engagement with said indexing elements and drivingly interrelated with said fluid pressure actuating means for translating pressure changes into indexing movement of said sequencing means,* said fluid pressure actuating means [includes] *including* two separate pressure responsive means, one pressure responsive means being connected to said sequencing means and the other pressure responsive means being connected to said pilot valve.

5. [A valve assembly as set forth in claim 1 including] *A pressure actuated and sequenced valve assembly comprising; a main valve for controlling fluid flow therethrough, a main valve actuator for opening and closing said main valve; first passage means for constantly imposing pressure forces on one side of said main valve actuator, second passage means for imposing pressure forces on the other side of said main valve actuator, third passage means for venting the other side of the main valve actuator, a pilot valve biased to close said third passage means, means responsive to pressure variations for opening and closing said pilot valve, the last named means including a sequencing means for controlling the opening movement of said pilot valve and fluid pressure actuating means for indexing said sequencing means and opening said pilot valve, fourth passage means for communicating a pressure to said fluid pressure actuating means, said sequencing means including a plurality of indexing elements, ratcheting means mounted for intermittent driving engagement with said indexing elements and drivingly interrelated with said fluid pressure actuating means for translating pressure changes into indexing movement of said sequencing means,* means for biasing said pilot valve to a closed position and means interacting between the biasing means and said sequencing means for automatically varying said bias as a function of the indexed position of said sequencing means whereby the pilot valve may be pressure operated to an open position.

10. [A valve assembly as set forth in claim 9 wherein] *A pressure actuated and sequenced valve assembly comprising; a main valve for controlling fluid flow therethrough, a main valve actuator for opening and closing said main valve; first passage means for constantly imposing pressure forces on one side of said main valve actuator, second passage means for imposing pressure forces on the other side of said main valve actuator, third passage means for venting the other side of the main valve actuator, a pilot valve biased to close said third passage means, means responsive to pressure variations for opening and closing said pilot valve, the last named means including a sequencing means for controlling the opening movement of said pilot valve and fluid pressure actuating means for indexing said sequencing means and opening said pilot valve, fourth passage means for communicating a pressure to said fluid pressure actuating means, said sequencing means including a plurality of indexing elements, ratcheting means mounted for intermittent driving engagement with said indexing elements and drivingly interrelated with said fluid pressure actuating means for translating pressure changes into indexing movement of said sequencing means, means for resetting said sequencing means to a selected reference position,* said resetting means [is] *being* responsive to a reduced pressure from said pressure variations, said means responsive to pressure variations having biased means for opposing said fluid pressure actuating means, said biasing means comprising two spring means, one of said spring means opposing said fluid pressure actuating means when said sequencing means is being reset, and both of said spring means opposing said fluid pressure actuating means when said sequencing means is being indexed.

18. [A valve assembly as set forth in claim 17 wherein] *A pressure actuated and sequenced valve assembly comprising; a main valve for controlling fluid flow therethrough, a main valve actuator for opening and closing said main valve; first passage means for constantly imposing pressure forces on one side of said main valve actuator, second passage means for imposing pressure forces on the other side of said main valve actuator, third passage means for venting the other side of the main valve actuator, a pilot valve biased to close said third passage*

*means, means responsive to pressure variations for opening and closing said pilot valve, the last named means including a sequencing means for controlling the opening movement of said pilot valve and fluid pressure actuating means for indexing said sequencing means and opening said pilot valve, fourth passage means for communicating a pressure to said fluid pressure actuating means, said sequencing means including a plurality of indexing elements, ratcheting means mounted for intermittent driving engagement with said indexing elements and drivingly interrelated with said fluid pressure actuating means for translating pressure changes into indexing movement of said sequencing means, said third passage means terminating within the fluid flow line downstream of said main valve,* said third passage means [terminates] *terminating* in a venturi throat for providing a greater pressure sink therefor upon opening of said main valve.

29. [The valve assembly of claim 28 wherein] *A pressure actuated and sequenced valve assembly comprising; a valve, a valve actuator, first passage means for communicating actuating pressure forces to said valve actuator, an indexable member, means responsive to a first pressure range variation for indexing said member and to a higher pressure level for opening said valve, the last named means including fluid pressure actuating means, second passage means for communicating pressure variations to said actuating means, and sequencing selection means carried by said indexable member for controlling the opening movement of said valve, spring means opposing the actuating movement of said actuating means defining said first pressure range and further defining a second pressure range including said higher pressure level,* said spring means further [define] *defining* a third pressure range below said first pressure range, means for moving said indexable member for resetting movement in opposition to the indexing movement, means restraining said resetting movement, and means responsive to pressure levels within said third pressure range for releasing said restraining means whereby said indexable member may be reset, *the bias of said spring means changing abruptly at the juncture of said pressure ranges.*

32. [The valve assembly of claim 24 wherein] *A pressure actuated and sequenced valve assembly comprising; a valve, a valve actuator, first passage means for communicating actuating pressure forces to said valve actuator, an indexable member, means responsive to a first pressure range variation for indexing said member and to a higher pressure level for opening said valve, the last named means including fluid pressure actuating means, second passage means for communicating pressure variations to said actuating means, and sequencing selection means carried by said indexable member for controlling the opening movement of said valve,* said indexable member [includes] *including* a plurality of indexable positions and said sequencing selection means comprise pin means selectively positionable at any of said indexable positions.

33. A pressure actuated and sequenced valve assembly comprising; a main valve, a main valve actuator, first passage means for communicating actuating pressure forces to opposite sides of said main valve actuator, second passage means including a pilot valve for selectively venting one side of said main valve actuator, an indexable member *having a reference position*, means responsive to a first pressure range variation for indexing said member and to a higher pressure level for opening said pilot valve *and to pressure levels below said first pressure range for resetting said indexable member to its reference position*, the last named means including fluid pressure actuating means *having a drive means and biasing means therefor*, third passage means for communicating pressure variations to said actuating means *for moving said drive means in one direction*, and sequencing selection means carried by said indexable member for controlling the opening movement of said pilot valve, *said biasing means opposing movement of said drive means by said pressure variations, said biasing means having a first and second spring means, said first spring means biasing said drive means at said pressure levels below said first pressure range for resetting said indexable member, said second spring means biasing said drive means during the pressure range variation, said first spring means and said second spring means providing a resistance step therebetween.*

35. [The valve assembly of claim 33 including] *A pressure actuated and sequenced valve assembly comprising; a main valve, a main valve actuator, first passage means for communicating actuating pressure forces to opposite sides of said main valve actuator, second passage means including a pilot valve for selectively venting one side of said main valve actuator, an indexable member, means responsive to a first pressure range variation for indexing said member and to a higher pressure level for opening said pilot valve, the last named means including fluid pressure actuating means, third passage means for communicating pressure variations to said actuating means, and sequencing selection means carried by said indexable member for controlling the opening movement of said pilot valve,* means biasing said pilot valve to close said second passage means and said sequencing selection means being movable into engagement with said biasing means for reducing the bias on said pilot valve.

36. The valve assembly of claim 33 wherein said *drive means of said* fluid pressure actuating means comprises a single actuator for indexing said member and opening said pilot valve.

40. A pressure actuated and sequenced flow control valve, comprising; a valve, valve actuator means including a fluid pressure actuator for opening and closing said valve, passage means for communicating a pressure to one side of said fluid pressure actuator, an indexable member *having a reference position*, sequencing means responsive to a first pressure range variation for indexing said member and to a higher pressure level for opening said valve *and to a lower pressure level for resetting said indexable member to its reference position*, said sequencing means including driving ratchet means mounted for movement into and out of driving engagement with said member and a lost motion connection between said valve and valve actuator means for permitting limited relative movement therebetween in response to pressure variations within said first pressure range, and first, [and] second *and third* distinct biasing means respectively opposing movement of said valve actuator means *at said lower pressure level*, within said first pressure range, and to said higher pressure level.

45. *A pressure actuated and sequenced valve assembly including distinct, differentially loaded biasing means for the establishment of a first distinct pressure range within which the valve assembly may be sequenced while precluding actuation of the same and a second distinct pressure range within which said valve assembly may be actuated, comprising; a valve; an indexable member for controlling the opening movement of said valve; means responsive to pressure variations for opening and closing said valve and sequencing said member; the last named means comprising fluid pressure actuating means, passage means for commu-* nicating pressure to said actuating means, and drive means responsive to movement of said actuating means for sequencing said member and opening said valve; said drive means being responsive to first pressure level variations within a first pressure range for sequencing said member and second pressure level variations within a second pressure range for sequencing said member and opening said valve; first biasing means opposing the sequencing of said member within said first pressure range; and second biasing means opposing the opening of said valve within said second pressure range whereby selective pressure variations within said first range will sequence said member without opening said valve; [The valve assembly of claim 44 wherein] said first and second biasing means [comprise] *comprising* first and second differentially biased spring assemblies, [and] said second spring assembly having a greater bias than said first spring assembly.

48. A pressure actuated and sequenced valve assembly including distinct, differentially loaded biasing means for the establishment of a first distinct pressure range within which the valve assembly may be sequenced while precluding actuation of the same and a second distinct pressure range within which said valve assembly may be actuated, comprising; a valve; an indexable member for controlling the opening movement of said valve; means responsive to pressure variations for opening and closing said valve and sequencing said member; the last named means comprising fluid pressure actuating means, passage means for communicating pressure to said actuating means, and drive means responsive to movement of said actuating means for sequencing said member and opening said valve; said drive means being responsive to first pressure level variations within a first pressure range for sequencing said member and second pressure level variations within a second pressure range for sequencing said member and opening said valve; first biasing means opposing the sequencing of said member within said first pressure range; second biasing means opposing the opening of said valve within said second pressure range whereby selective pressure variations within said first range will sequence said member without opening said valve; reset biasing means opposing the sequencing movement of said member; means for blocking reset movement of said member; reset stop means for arresting movement of said member in the reset direction; and means responsive to a reduced line pressure level below said first pressure range for releasing the reset blocking means whereby said member may be reset to a predetermined base portion, [The valve assembly of claim 47 wherein] said means responsive to a reduced line pressure level [includes] *including* a third biasing means.

79. An irrigation system, comprising a plurality of line connected fluid distributors; line connected fluid pressure means for supplying said distributors; a plurality of line connected pressure actuated and sequenced valve assemblies for controlling fluid flow to said distributors as a function of line pressure variations; each said valve assembly including; a main flow control valve for controlling flow between said line and at least one of said distributors and an indexable member for controlling the opening movment of said main valve, line pressure actuated means for indexing said member and opening said main valve, biasing means defining distinct line pressure ranges for pressure cycling said valve assembly and for opening the main valve, said biasing means comprising first biasing means opposing the line pressure actuated means for indexing said member and second biasing means opposing the line pressure actuated means for opening the main valve; and means controlling said fluid pressure means for selectively transmitting line pressure variations within one of said pressure ranges to each said valve assembly for sequencing the same and within another of said pressure ranges for opening the main valve of at least one of said valve assemblies, *said last named controlling means having means for sensing pressure in said line and insuring that a second line pressure variation is not called for until the first line pressure variation has been reached.*

88. A combination as set forth in claim 33 wherein said biasing means has a third spring means, said third spring means biasing said drive means at said higher pressure level for opening said pilot valve.

89. A combination as set forth in claim 33 wherein said first spring means comprises a first spring, and said second spring means comprises said first spring and a second spring.

90. A combination as set forth in claim 33 wherein the resistance step resists the movement of said drive means by said fluid pressure actuating means in an additive manner at a discrete point at the low pressure of said pressure range variation for indexing said member.

91. A combination as set forth in claim 89 wherein said first and second springs are concentric.

92. A combination as set forth in claim 89 wherein said second spring is preloaded between relatively fixed stop means, said drive means contacting said second spring when said drive means is moved by said pressure actuating means at the low pressure of said pressure range variation, said second spring providing the resistance step.

93. A combination as set forth in claim 88 wherein said third spring means comprises a third spring with the first and second springs.

94. A combination as set forth in claim 93 wherein said third spring is preloaded between relatively fixed stop means, said drive means contacting said third spring when said drive means is moved by said pressure actuating means above the high pressure of said pressure range variation, said third spring providing a resistance step.

95. A combination as set forth in claim 93 wherein said first, second and third springs are concentric.

* * * * *